(12) United States Patent
Sasai et al.

(10) Patent No.: US 7,564,902 B2
(45) Date of Patent: Jul. 21, 2009

(54) DEVICE, METHOD AND PROGRAM FOR GENERATING INTERPOLATION FRAME

(75) Inventors: Hisao Sasai, Osaka (JP); Satoshi Kondo, Yawata (JP); Shinya Kadono, Nishinomiya (JP)

(73) Assignee: Panasonic Corporation, Osaka (JP)

( * ) Notice: Subject to any disclaimer, the term of this patent is extended or adjusted under 35 U.S.C. 154(b) by 697 days.

(21) Appl. No.: 10/716,038

(22) Filed: Nov. 19, 2003

(65) Prior Publication Data

US 2004/0101058 A1 May 27, 2004

(30) Foreign Application Priority Data

Nov. 22, 2002 (JP) ............................ 2002-339903
May 21, 2003 (JP) ............................ 2003-143664

(51) Int. Cl.
*H04N 7/12* (2006.01)
(52) U.S. Cl. .................................. 375/240.26; 348/411
(58) Field of Classification Search ................ 348/416, 348/415, 411, 410, 409, 413, 699, 441, 473, 348/571, 443, 451, 452, 420, 390, 384; 382/232, 382/234, 236, 240, 248, 250, 268, 264, 166; 375/240.26, 240.16, 240.29, 240.02, 240.27, 375/240.28, 240.25, 240.12
See application file for complete search history.

(56) References Cited

U.S. PATENT DOCUMENTS

| | | | |
|---|---|---|---|
| 4,383,272 A | | 5/1983 | Netravali et al. |
| 5,151,784 A | | 9/1992 | Lavagetto et al. |
| 5,204,740 A | * | 4/1993 | Ishii ...................... 375/240.12 |
| 6,104,753 A | * | 8/2000 | Kim et al. .................... 375/240 |
| 6,192,079 B1 | * | 2/2001 | Sharma et al. ......... 375/240.16 |
| 6,192,080 B1 | * | 2/2001 | Sun et al. ............... 375/240.16 |
| 6,205,177 B1 | | 3/2001 | Girod et al. |
| 6,208,760 B1 | | 3/2001 | De Haan et al. |
| 6,359,929 B1 | * | 3/2002 | Boon .................... 375/240.16 |
| 6,704,358 B1 | * | 3/2004 | Li et al. ................. 375/240.02 |
| 2003/0086498 A1 | | 5/2003 | Lee et al. |
| 2004/0005004 A1 | * | 1/2004 | Demos .................. 375/240.08 |

FOREIGN PATENT DOCUMENTS

CA          2 279 797        2/2001

(Continued)

OTHER PUBLICATIONS

Soo-Chul Han et al., "Frame-rate Up-conversion Using Transmitted Motion and Segmentation Fields for Very Low Bit-rate Video Coding", ECSE Department and Center for Image Processing Research (CIPR), Troy, New York 12180-3590, 1997 IEEE, pp. 747-750.

(Continued)

*Primary Examiner*—Behrooz Senfi
(74) *Attorney, Agent, or Firm*—Wenderoth, Lind & Ponack, L.L.P.

(57) ABSTRACT

An interpolation frame generation device that generates an interpolation frame that interpolates image frames that are obtained by decoding a coded image signal that is coded by motion compensation, includes a motion vector deriving unit and an interpolation frame generating unit. The motion vector deriving unit acquires a motion compensation vector of a coded block that forms the coded image signal. The interpolation frame generating unit generates the interpolation frame in accordance with the motion vector of the image block that forms an image frame by using the motion compensation vector of the coded block as the motion vector of the image block.

28 Claims, 53 Drawing Sheets

FOREIGN PATENT DOCUMENTS

| | | |
|---|---|---|
| EP | 0 395 271 | 10/1990 |
| EP | 1 006 723 | 6/2000 |
| EP | 1 006 732 | 6/2000 |
| EP | 1 233 618 | 8/2002 |
| GB | 2 249 899 | 5/1992 |
| GB | 2 265 065 | 9/1993 |
| JP | 6-178270 | 6/1994 |
| JP | 8-98210 | 4/1996 |
| JP | 2000-134585 | 5/2000 |
| WO | 00/11863 | 3/2000 |
| WO | 00/38423 | 6/2000 |

OTHER PUBLICATIONS

Yen-Kuang Chen et al., "Frame-Rate Up-Conversion Using Transmitted True Motion Vectors", 6 pages.

R. Thoma et al., "Motion Compensating Interpolation Considering Covered and Uncovered Background", Signal Processing, Image Communication, Elsevier Science Publishers, Amsterdam, NL, vol. 1, No. 2, Oct. 1, 1989, pp. 191-212.

European Search Report issued Feb. 9, 2009 in connection with EP 03 02 6519 corresponding to the present U.S. application.

Choi, B-T. et al., *New Frame Rate Up-Conversion Using Bi-Directional Motion Estimation, IEEE Transactions on Consumer Electronics*, vol. 46, No. 3 (Aug. 2000), pp. 603-609, XP001142884.

Huang, C-L. et al., *Motion-Compensated Interpolation for Scan Rate Up-Conversion, Optical Engineering*, vol. 35, No. 1 (Jan. 1996), pp. 166-176, XP000631424.

Ojo, O.A. et al., *Robust Motion-Compensated Video Upconversion, IEEE Transactions on Consumer Electronics*, vol. 43, No. 4 (Nov. 1997), pp. 1045-1056.

\* cited by examiner

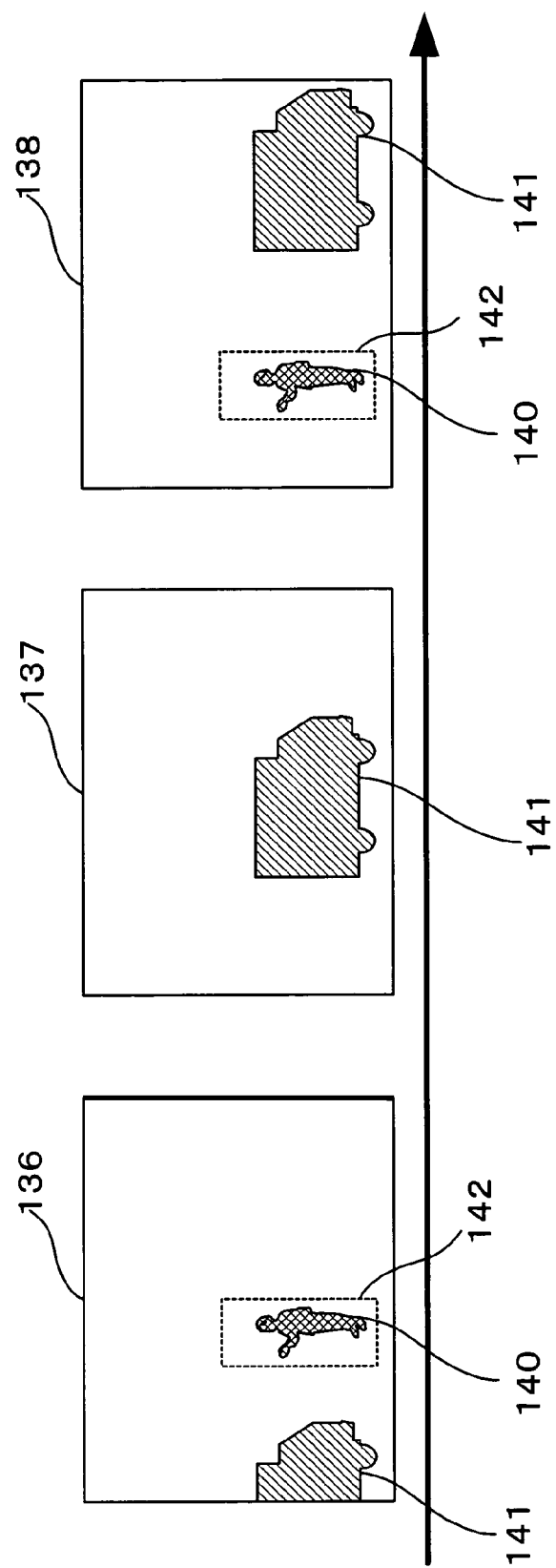

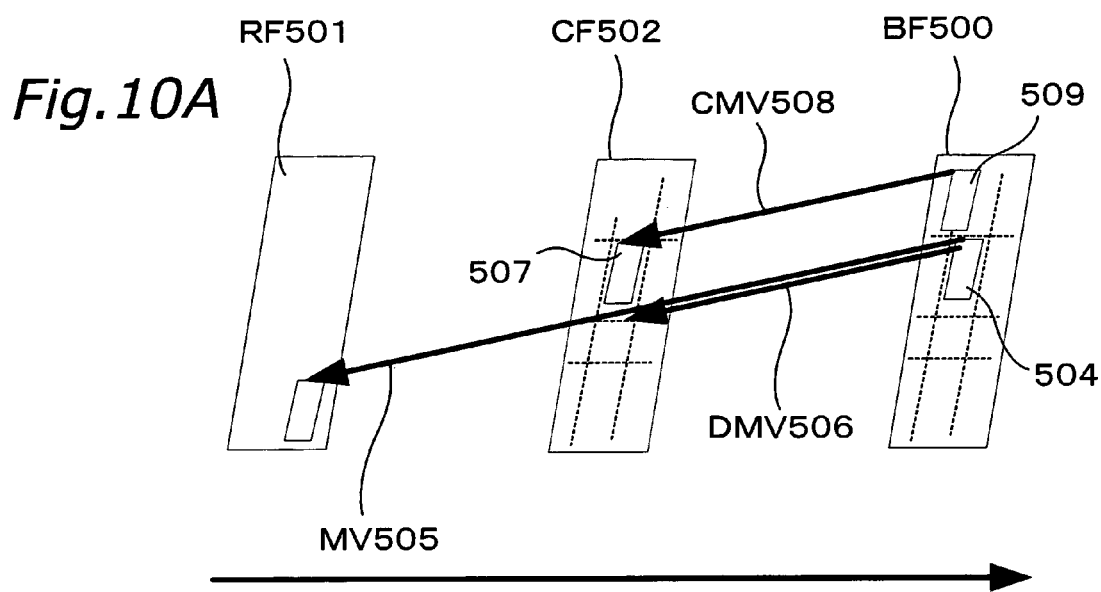
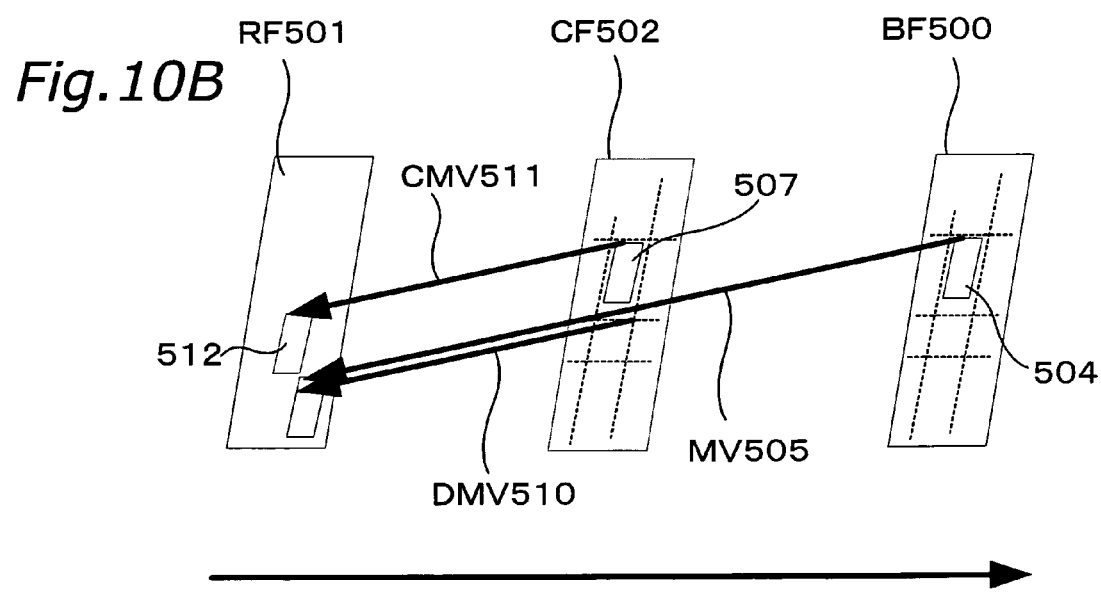

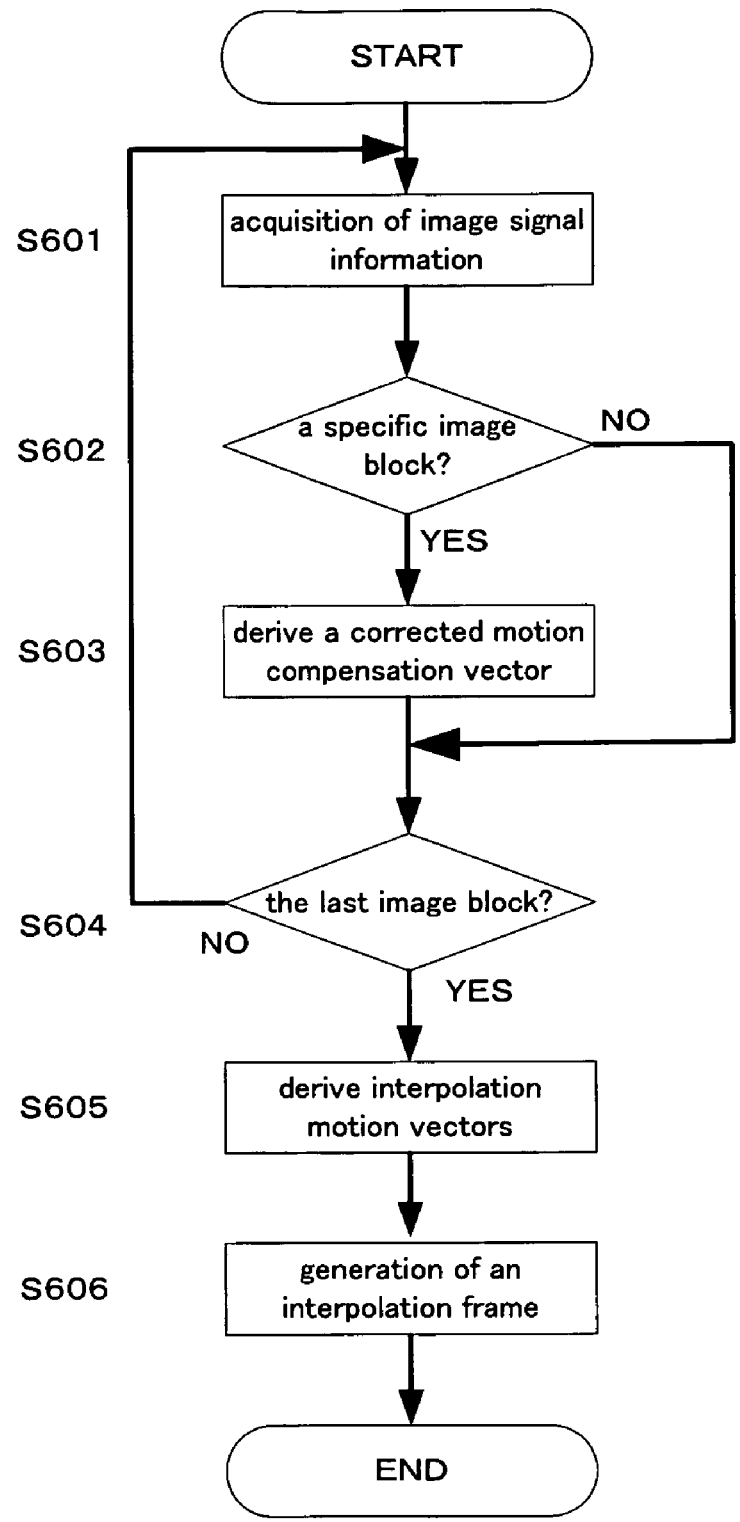

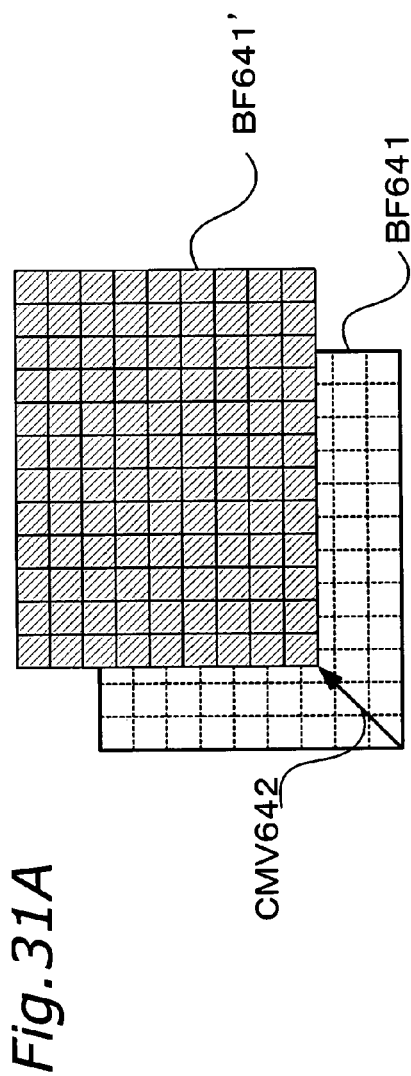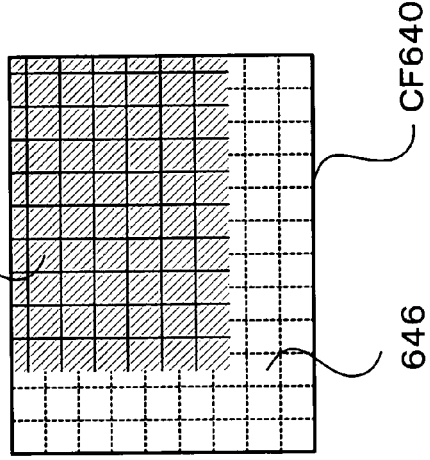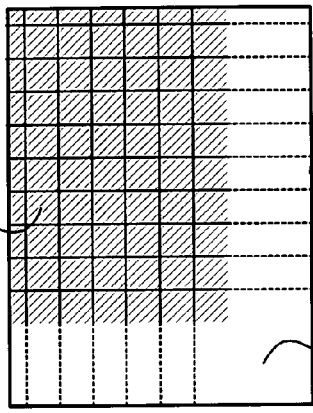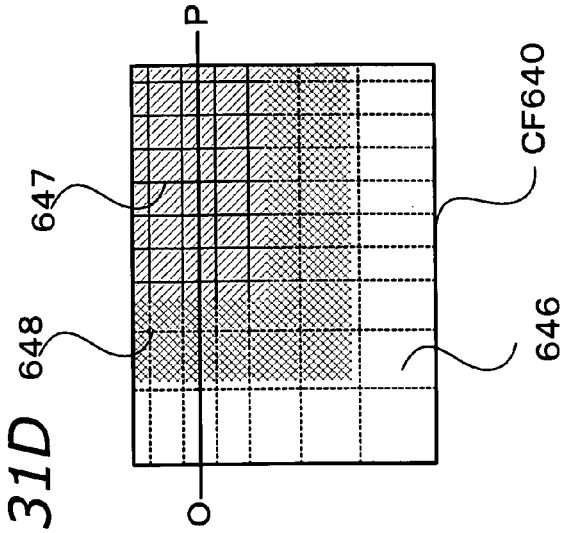
Fig.31A
Fig.31B
Fig.31C
Fig.31D

Fig.45
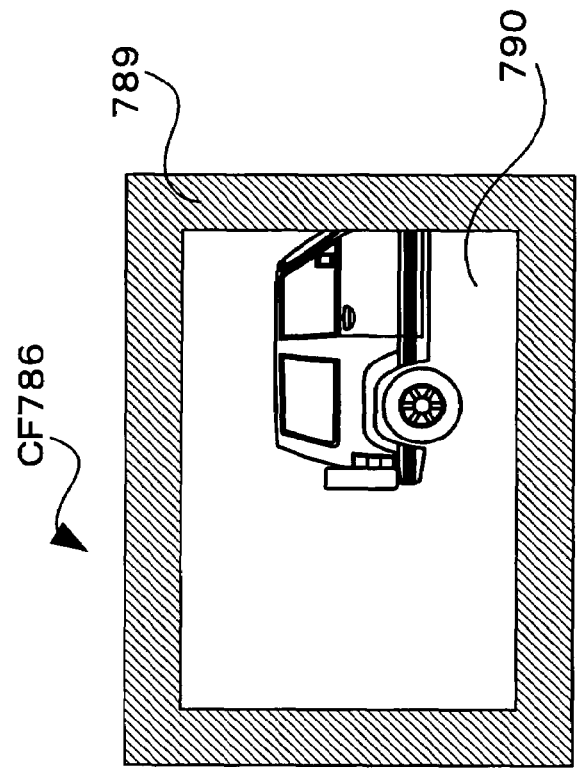
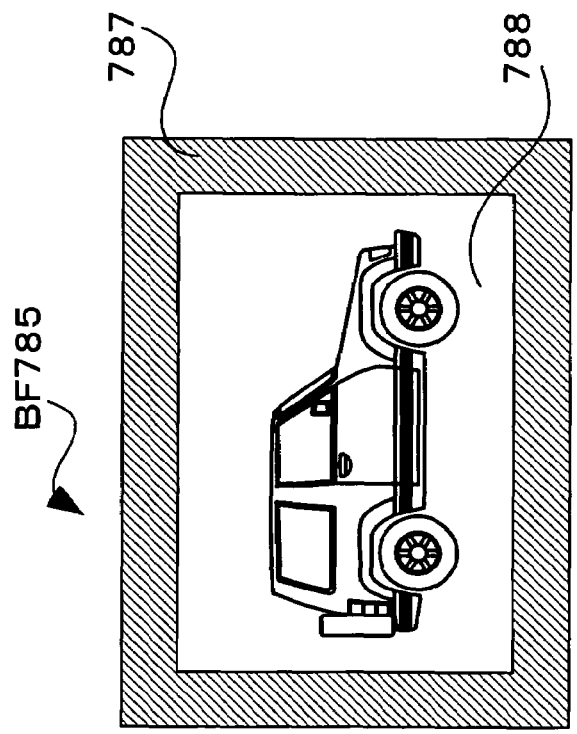

DEVICE, METHOD AND PROGRAM FOR GENERATING INTERPOLATION FRAME

BACKGROUND OF THE INVENTION

1. Field of the Invention

The present invention-relates to an interpolation frame generation device, and more particularly to an interpolation frame generation device for generating an interpolation frame for interpolating image frames. The present invention further relates to a method for generating an interpolation frame and a program for generating an interpolation frame.

2. Description of the Prior Art

An interpolation technique for a television set, a personal computer (PC), a cellular phone or other devices that display an image signal, in which an interpolation frame for interpolating image frames is generated from image frames that form the image signal, and the generated interpolation frame is inserted between the image frames to be displayed, is well known in the prior art. This technique is used to smoothly display an image signal that is transmitted at a low frame rate in order to reduce the volume of the data, for example.

FIG. 52 shows an interpolation frame generation device 401 for effectuating the above-mentioned conventional technique. The interpolation frame generation device 401 comprises a frame memory 402, a motion vector detecting unit 403, an interpolation frame generating unit 404, a signal switching unit 405 and a control unit 406. The frame memory 402 stores an input image signal 410 for each image frame. The motion vector detecting unit 403 detects a motion vector between a base frame and a reference frame that are two image frames stored in the frame memory 402. More specifically, the motion vectors of image blocks forming the base frame are detected by matching the image blocks of the base frame with a pixel area of the reference frame. The interpolation frame generating unit 404 generates an interpolation frame from the base frame and detected motion vectors of the image blocks of the base frame. The signal switching unit 405 switches between the image frame stored in the frame memory 402 and the interpolation frame generated by the interpolation frame generating unit 404 so as to provide an output image signal 411. The control unit 406 provides control signals necessary for operating the motion vector detecting unit 403, the interpolation frame generating unit 404 and the signal switching unit 405.

Here, with reference to FIG. 53, the operation of the motion vector detecting unit 403 and the interpolation frame generating unit 404 will be described in more detail. FIG. 53A shows a base frame BF415 and a reference frame RF416 stored in the frame memory 402. Here, a situation will be described in which one interpolation frame CF417 is inserted between the base frame BF415 and the reference frame RF416 (see FIG. 53B). The motion vector detecting unit 403 divides the base frame BF415 into image blocks each of which includes a predetermined number of pixels. In addition, each of the divided image blocks is matched with a pixel area that forms the reference frame RF416 in order to detect a motion vector MV420. The interpolation frame generating unit 404 performs internal division of the detected motion vector MV420 in accordance with the number of interpolation frames. Here, one interpolation frame CF417 is inserted between the base frame BF415 and the reference frame RF416, so the size of the motion vector MV420 is transformed into half without changing the direction of the same so as to derive an interpolation motion vector CMV421. The derived interpolation motion vector CMV421 and the image block of the base frame BF415 are used for generating the interpolation frame CF417.

Furthermore, another technique well known in the prior art is one in which not only the motion vector for the reference frame RF416 of the image block of the base frame BF415, but also the motion vector for the base frame BF415 of the image block forming the reference frame RF416 is detected, in order to generate the interpolation frame CF417 (see Japanese unexamined patent publication No. 6-178270) or to improve the accuracy with which the motion vector is detected (see Japanese unexamined patent publication No. 2000-134585).

On the other hand, there are demands to further improve the accuracy of interpolation frame generation so that an image signal transmitted at a low frame rate in order to reduce data volume will be displayed smoothly. There are also demands to decrease the volume of calculation or the size of the circuit when enabling the technique for generating an interpolation frame in a device.

SUMMARY OF THE INVENTION

An object of the present invention is to provide an interpolation frame generation device, an interpolation frame generating method and an interpolation frame generating program that can improve the accuracy in which an interpolation is generated.

Another object of the present invention is to provide an interpolation frame generating method and an interpolation frame generating program that may be suitably enabled in a device.

Still another object of the present invention is to provide an interpolation frame generation device in which a technique for generating an interpolation frame according to the present invention is enabled.

According to a first aspect of the present invention, there is provided an interpolation frame generation device for generating an interpolation frame that interpolates image frames that are obtained by decoding a coded image signal that is coded by motion compensation. The device comprises a motion compensation vector acquisition unit and an interpolation frame generation unit. The motion compensation vector acquisition unit acquires a motion compensation vector of a coded block that forms the coded image signal by decoding the coded image signal. The interpolation frame generation unit generates the interpolation frame in accordance with at least a motion vector of an image block that forms an image frame by using the motion compensation vector of the coded block as the motion vector of the image block.

As used herein, the term "frame" may be defined interchangeably as a frame in a progressive scanning image or a frame or a field in an interlaced scanning image.

In this interpolation frame generation device, a motion compensation vector in a coded image signal that is coded by motion compensation is utilized. Therefore, the interpolation frame can be generated without detecting motion vectors from decoded image frames, so that the volume of calculation for generating an interpolation frame can be decreased.

According to a second aspect of the present invention, there is provided an interpolation frame generation device for generating an interpolation frame that serves to interpolate image frames that are obtained by decoding a coded image signal that is coded by motion compensation. The device comprises motion compensation vector acquisition unit, motion vector detection unit and interpolation frame generation unit. The motion compensation vector acquisition unit acquires motion compensation vectors of coded blocks that form the coded image signal by decoding the coded image signal. The motion vector detection unit detects at least a motion vector between a base frame and a reference frame and detects the motion vector of an image block forming the base frame in a certain area of the reference frame that is determined in accordance with the motion compensation vectors. The interpolation frame generation unit generates the interpolation frame in accordance with the detected motion vector.

In this interpolation frame generation device, motion compensation vectors in an image signal that are coded by motion compensation are utilized. The motion vector detection unit performs detection in a certain area of a reference frame that is determined in accordance with the motion compensation vectors when detecting motion vectors. Therefore, the volume of calculation necessary for detecting motion vectors can be decreased.

According to a third aspect of the present invention, there is provided an interpolation frame generation device for generating an interpolation frame that interpolates image frames that are obtained by decoding a coded image signal that is coded by motion compensation. The device comprises image signal information acquisition unit, motion vector detection unit and interpolation frame generation unit. The image signal information acquisition unit acquires image signal information of the coded image signal. The motion vector detection unit selects at least an image block partially among the entire image blocks that form a base frame and detects a motion vector of the partially selected image block between the base frame and a reference frame. The interpolation frame generation unit generates the interpolation frame in accordance with the image signal information and the motion vector.

Here, the image signal information is defined as information about a coded image signal that is coded by motion compensation, which is motion compensation vectors of a coded block, a coding mode or a coding method for coding image signal, for example.

Image signal information is utilized in this interpolation frame generation device. The motion vector detection unit detects a motion vector for the partially selected image block among the entire image blocks that form an image frame when detecting motion vectors. As a result, compared with the case where motion vectors are detected for all image blocks, the volume of calculation necessary for detecting motion vectors is decreased.

According to a fourth aspect of the present invention, in the interpolation frame generation device according to the third aspect, the image signal information includes a motion compensation vector or a coding mode of a coded block that forms the coded image signal. The partially selected image block is an image block that is determined to be stationary from the image signal information or an image block that is determined to have a movement having low correlation with the adjacent image blocks from the image signal information.

In this interpolation frame generation device, motion vectors are detected for image blocks that are determined to be stationary from the acquired motion compensation vectors or coding mode. Alternatively, in this interpolation frame generation device, motion vectors are detected for image blocks that are determined to have movement having low correlation with the adjacent image blocks from the acquired motion compensation vectors or coding mode. In addition, when detecting motion vectors, an image frame that is different from that referred upon the motion compensation coding can be referred.

According to a fifth aspect of the present invention, in the interpolation frame generation device according to the third or fourth aspect, the image signal information includes a coding mode of a coded block that forms the coded image signal, and the partially selected image block is an intra block.

In this interpolation frame generation device, motion vectors are detected for image blocks that are decided to be intra coded with the image signal information. In addition, when detecting motion vectors, an image frame that is different from that referred upon the motion compensation coding can be referred.

According to a sixth aspect of the present invention, there is provided an interpolation frame generation device for generating an interpolation frame for interpolating image frames. The device comprises movement associated information acquisition unit, interpolation vector derivation unit and interpolation frame generation unit. The movement associated information acquisition unit acquires movement associated information about movements of image blocks that form an image frame. The interpolation vector derivation unit derives a global motion vector for generating an interpolation frame in accordance with movement associated information. The interpolation frame generation unit generates the interpolation frame in accordance with the global motion vector.

Here, the movement associated information is, for example, a motion compensation vector of a coded block that forms a coded image signal for decoding an image frame, or a detected motion vector for an image block that forms an image frame.

In this interpolation frame generation device, the interpolation frame is generated in accordance with the global motion vector for interpolation that is calculated in accordance with movement associated information. Since the interpolation frame is generated by the global motion vector, distortion of an image of the interpolation frame can be reduced, so that image quality of the interpolation frame can be improved.

According to a seventh aspect of the present invention, in the interpolation frame generation device according to the sixth aspect, the global motion vector is calculated from movement associated information of image blocks selected partially from the entire image blocks.

In this interpolation frame generation device, the global motion vector is calculated from movement associated information of image blocks selected partially from the entire image blocks. Thus, the volume of calculation needed for calculating the global motion vector can be decreased.

According to an eighth aspect of the present invention, in the interpolation frame generation device according to the sixth aspect, the movement associated information is motion compensation vectors of coded blocks that form a coded image signal for decoding the image frames. The interpolation frame generation unit generates the interpolation frame by utilizing the global motion vector calculated for an image frame that is located either before or after an intra coded image frame in the display order.

In this interpolation frame generation device, the interpolation frame can be generated by utilizing an image frame that is intra coded and does not have a motion compensation vector.

According to a ninth aspect of the present invention, there is provided an interpolation frame generation device for generating an interpolation frame for interpolating image frames. The device comprises movement associated information acquisition unit, image frame decision unit and interpolation frame generation unit. The movement associated information acquisition unit acquires movement associated information about movements of image blocks that form an image frame. The image frame decision unit decides whether or not the image frame is adequate for generating the interpolation frame. The interpolation frame generation unit generates the interpolation frame in accordance with the movement associated information by switching methods of generating the interpolation frame in accordance with the decision.

Here, the movement associated information is, for example, a motion compensation vector of a coded block that forms a coded image signal for decoding an image frame, or a detected motion vector for an image block that forms an image frame.

Here, the image frame decision unit decides that the image frame is not adequate for generating an interpolation frame in situations in which dispersion of the movement associated information of the image frame is large, in situations in which there are many image blocks in which a sum of DCT coefficients of coded blocks that form a coded image signal for decoding the image frame is larger than a certain threshold level, in situations in which there are many image blocks that are intra coded, in situations in which there are many image blocks in which a sum of absolute differences (SAD) of the image block that is calculated when detecting the motion vectors is larger than a certain threshold level, or in situations in which directions of the movement associated information expressed as a vector are changed in the number larger than a predetermined number, for example.

In this interpolation frame generation device, since it is decided whether or not the image frame is adequate for generating the interpolation frame, an appropriate interpolation frame can be generated so that image quality of the interpolation frame can be improved.

According to a tenth aspect of the present invention, in the interpolation frame generation device according to the ninth aspect, the interpolation frame generation unit can use at least a portion of image frames that are located before and/or after the interpolation frame in the display order as the interpolation frame when the decision is negative.

In this interpolation frame generation device, even if the image frame is not adequate for generating an interpolation frame, an appropriate interpolation frame can be generated so that image quality of the interpolation frame can be improved.

According to an eleventh aspect of the present invention, in the interpolation frame generation device according to the ninth aspect an interpolation vector derivation unit operable to derive a global motion vector for generating an interpolation frame in accordance with the movement associated information is further provided. The interpolation frame generation unit can generate the interpolation frame in accordance with the global motion vector when the decision is negative.

Here, the image frame decision unit can also decide that the image frame is not adequate for generating an interpolation frame if there are many image blocks in which a distance between the movement associated information expressed as a vector and the global motion vector is larger than a certain threshold level.

In this interpolation frame generation device, if the image frame is not adequate for generating an interpolation frame, the interpolation frame is generated in accordance with the global motion vector that is derived in accordance with the movement associated information. Since the interpolation frame is generated by the global motion vector, distortion of an image of the interpolation frame can be reduced so that image quality of the interpolation frame can be improved.

According to a twelfth aspect of the present invention, in the interpolation frame generation device according to the ninth aspect, the interpolation frame generation unit does not generate the interpolation frame when the decision is negative.

In this interpolation frame generation device, if the image frame is not adequate for generating an interpolation frame, the interpolation frame is not generated. Thus, the generation of an interpolation frame that is not adequate for interpolating image frames can be prevented.

According to a thirteenth aspect of the present invention, there is provided an interpolation frame generation device for generating an interpolation frame for interpolating image frames. The device comprises generation process ability decision unit and interpolation frame generation unit. The generation process ability decision unit decides generation process ability for generating the interpolation frame. The interpolation frame generation unit generates the interpolation frame in accordance with a decision of the generation process ability decision unit.

In this interpolation frame generation device, the generation process ability decision unit decides the generation process ability for generating the interpolation frame. Here, the generation process ability is a processing ability that can be used for generating the interpolation frame, which is decided in accordance with, for example, an image size of the image frame, a frame frequency of the image signal made of image frames or other attributions of the image signal, or a processing ability that is used for a process except the process of generating the interpolation frame. More specifically, the interpolation frame can be generated appropriately in accordance with the generation process ability.

According to a fourteenth aspect of the present invention, in the interpolation frame generation device according to the thirteenth aspect, the interpolation frame generation unit changes the number of interpolation frames in accordance with a decision of the generation process ability decision unit.

In this interpolation frame generation device, the interpolation frames are generated in the number that is decided to be adequate for the generation process ability by the generation process ability decision unit. For example, if the generation process ability has some margin, the number of interpolation frames to be generated is increased.

According to a fifteenth aspect of the present invention, in the interpolation frame generation device according to the thirteenth or fourteenth aspect, the interpolation frame generation unit changes the number of image blocks that form an image frame in which the motion vectors are detected in accordance with a decision of the generation process ability decision unit.

In this interpolation frame generation device, the motion vectors of image blocks are detected in the number that is decided to be adequate for the generation process ability by the generation process ability decision unit so as to generate the interpolation frame. For example, if the generation process ability has some margin, the number of image blocks in which the motion vector is detected is increased.

According to a sixteenth aspect of the present invention, in the interpolation frame generation device according to any one of the thirteenth through fifteenth aspects, the interpolation frame generation unit changes a range in which a motion vector of image block that forms an image frame is detected in accordance with a decision of the generation process ability decision unit.

In this interpolation frame generation device, the motion vector of the image block is detected in a range that is adequate for the generation process ability decided by the generation process ability decision unit so as to generate the interpolation frame. For example, if the generation process ability has some margin, the range in which the motion vector is detected is enlarged.

According to a seventeenth aspect of the present invention, in the interpolation frame generation device according to any one of the thirteenth through sixteenth aspect, the generation process ability decision unit decides an attribution of an image signal made of the image frame.

In this interpolation frame generation device, the generation process ability decision unit decides an image size of the image frame, a frame frequency of the image signal made of image frames or other attributions of the image signal so as to generate the interpolation frame in accordance with the decision. For example, if the image size of the image frame is small, the number of interpolation frames to be generated is increased.

According to an eighteenth aspect of the present invention, there is provided an interpolation frame generation device for generating an interpolation frame for interpolating image frames. The device comprises a motion vector detection unit and an interpolation frame generation unit. The motion vector detection unit detects at least a motion vector of an image block that forms an image frame via a motion detecting unit of a coding device for motion compensation coding. The interpolation frame generation unit generates the interpolation frame in accordance with the motion vector.

In this interpolation frame generation device, the motion detecting unit of the coding device for performing motion compensation coding is utilized. Therefore, the scale of a circuit or software code that generates an interpolation frame can be reduced.

According to a nineteenth aspect of the present invention, in the interpolation frame generation device according to the eighteenth aspect, operating state decision units operable to decide an operating state of the motion detecting unit of the coding device are further provided. In addition, the interpolation frame generation unit generates the interpolation frame in accordance with the decided operating state.

In this interpolation frame generation device, an operating state decision unit determines the operating state, such as whether or not the motion detecting unit is operating, or the quantity of information processing in the motion detecting unit. The interpolation frame generation unit can generate an interpolation frame appropriately in accordance with a margin of processing in the motion detecting unit.

According to a twentieth aspect of the present invention, in the interpolation frame generation device according to the nineteenth aspect, the interpolation frame generation unit does not generate the interpolation frame when the operating state decision unit decides that the motion detecting unit of the coding device is operating.

In this interpolation frame generation device, the interpolation frame is not generated when the motion detecting unit is used by the coding device, for example.

According to a twenty-first aspect of the present invention, in the interpolation frame generation device according to the nineteenth or twentieth aspect, the interpolation frame generation unit generates the interpolation frame in accordance with motion compensation vectors of coded blocks that are obtained by decoding the image frames when the operating state decision unit decides that the motion detecting unit of the coding device is operating.

In this interpolation frame generation device, the interpolation frame is generated in accordance with the motion compensation vectors when the motion detecting unit is used by the coding device, for example.

According to a twenty-second aspect of the present invention, an interpolation frame generation device for generating an interpolation frame that interpolates image frames is provided. The device comprises a motion vector detection unit and an interpolation frame generation unit. The motion vector detection unit detects motion vectors by utilizing a plurality of first image frames that are located either before or after the interpolation frame in the display order. The interpolation frame generation unit generates the interpolation frame in accordance with the motion vectors.

In this interpolation frame generation device, a motion vector can be detected for an image block that is not included in one image frame located before or after the interpolation frame in the display order, by using an image frame that is located temporally further from the one image frame. As a result, the accuracy with which an interpolation frame is generated will be improved.

According to a twenty-third aspect of the present invention, in the interpolation frame generation device according to the twenty-second aspect, the plurality of first image frames are located on one side of the interpolation frame in the display order and include a plurality of base frames that serve as bases for detecting the motion vectors, and one or a plurality of second image frames are located on another side of the interpolation frame in the display order and include a reference frame that serves as an object for detecting the motion vectors. In addition, the motion vector detection unit detects the motion vectors between the base frames and the reference frame.

In this interpolation frame generation device, a motion vector can be detected for an image block that is not included in one image frame located temporally before or after the interpolation frame, based upon a base frame that is temporally located further from the one image frame. As a result, the accuracy with which an interpolation frame is generated can be improved.

According to a twenty-fourth aspect of the present invention, in the interpolation frame generation device according to the twenty-second aspect, the plurality of first image frames are located on one side of the interpolation frame in the display order and include a plurality of reference frames that serve as references for detecting the motion vectors, and one or a plurality of second image frames are located on another side of the interpolation frame in the display order and include a base frame that serves as a base for detecting the motion vectors. In addition, the motion vector detection unit detects the motion vectors between the base frame and the reference frames.

In this interpolation frame generation device, motion vectors for image blocks that are not included in one image frame temporally located on one side of the interpolation frame can be detected by using a reference frame as an object that is temporally located further from the one image frame. As a result, the accuracy with which an interpolation frame is generated can be improved.

According to a twenty-fifth aspect of the present invention, in the interpolation frame generation device according to the twenty-second aspect, the plurality of image frames includes a base frame that serves as a base for detecting the motion vectors and a reference frame that serves as an object for detecting the motion vectors. In addition, the motion vector detection unit detects the motion vectors between the base frame and the reference frame.

In this interpolation frame generation device, even when the correlation of an interpolation frame in between image frames is low when, for example, a scene changes, the motion vectors can be detected from the base frame and the reference frame regardless of their temporal order with respect to the interpolation frame. As a result, the accuracy with which an interpolation frame is generated can be improved.

According to a twenty-sixth aspect of the present invention, in the interpolation frame generation device according to the twenty-second aspect, the motion vector detection unit detects a first motion vector between a first base frame that serves as a base for detecting the first motion vector and a first reference frame that is located before the first base frame in the display order, and detects a second motion vector between a second base frame that serves as a base for detecting the second motion vector and a second reference frame that is located after the second base frame in the display order. In addition, the interpolation frame generation unit can generate the interpolation frame in accordance with the first motion vector and the second motion vector.

In this interpolation frame generation device, it is possible to generate an interpolation frame by detecting motion vectors in two directions. As a result, the accuracy with which an interpolation frame will be generated can be further improved.

According to a twenty-seventh aspect of the present invention, in the interpolation frame generation device according to the twenty-second aspect, the motion vectors include a motion vector for generating an interpolation block that forms the interpolation frame, and is detected from a base pixel area that forms a base frame that serves as a base for detecting the motion vector and a reference pixel area that forms a reference frame that serves as an object for detecting the motion vector. In addition, the position of the reference pixel area in the reference frame is defined as a position indicated by a vector that is obtained by internal division or external division of the vector that is connected between the position of the base pixel area in the base frame and the position of the interpolation block in the interpolation frame.

Here, the base pixel area can be an image block that forms the base frame.

In this interpolation frame generation device, each of the interpolation blocks that form the interpolation frame is generated from the detected motion vector. Therefore, it is possible to generate the interpolation block so as to fill up the interpolation frame.

According to a twenty-eighth aspect of the present invention, there is provided an interpolation frame generation device for generating an interpolation frame for interpolating image frames. The device comprises an area determination unit and an interpolation frame generation unit. The area determination unit determines an interpolation inadequate area that is not adequate for generating the interpolation frame in an outer frame area of the image frame. The interpolation frame generation unit generates the interpolation frame in accordance with movement associated information about movements of image blocks that form the image frame and performs a special area compensation process for the decided interpolation inadequate area so as to generate the interpolation frame.

Here, the movement associated information is, for example, a motion compensation vector of a coded block that forms a coded image signal for decoding the image frames or a motion vector detected for an image block that forms the image frame.

In this interpolation frame generation device, a special area compensation process is performed for an interpolation inadequate area that is not adequate for generating an interpolation frame in an outer frame area of the image frame so as to generate an interpolation frame. Therefore, distortion of an image can be reduced that can be generated easily at an outer frame area of an interpolation frame when generating an interpolation frame using movement associated information. As a result, image quality of an interpolation frame can be improved.

According to a twenty-ninth aspect of the present invention, in the interpolation frame generation device according to the twenty-eighth aspect, the interpolation inadequate area is an area having a substantially constant pixel value in the outer frame area.

The area having a substantially constant pixel value is, for example, a band-like area that is displayed vertically or horizontally when the image frame is an image whose aspect ratio is converted in a manner such as a letter box or a side panel.

In this interpolation frame generation device, a special area compensation process is performed for an area having substantially a constant pixel value in the outer frame area of the image frame so as to generate an interpolation frame. This area is usually a static area, so that the volume of calculation for generating the interpolation frame can be decreased by performing the special area compensation process.

According to a thirtieth aspect of the present invention, in the interpolation frame generation device according to the twenty-eighth aspect, the interpolation inadequate area is a predetermined area for an image size of the image frame.

In this interpolation frame generation device, a special process is performed for a predetermined area in an outer frame area of the image frame. This area is an area that does not appear in a display screen of a display device that is an overscan display, for example. Therefore, the volume of calculation for generating an interpolation frame can be decreased by performing the special area compensation process for the area.

According to a thirty-first aspect of the present invention, in the interpolation frame generation device according to the twenty-eighth aspect, the area determination unit determines the interpolation inadequate area in accordance with obtained interpolation inadequate area information that indicates the interpolation inadequate area.

The interpolation inadequate area information is, for example, information that indicates a position, size or a range of the interpolation inadequate area, or information for deriving the interpolation inadequate area.

In this interpolation frame generation device, the interpolation inadequate area is determined in accordance with the interpolation inadequate area information. In addition, the special area compensation process is performed for the determined interpolation inadequate area, so that the interpolation frame can be generated.

According to a thirty-second aspect of the present invention, in the interpolation frame generation device according to the thirty-first aspect, the interpolation inadequate area information includes a display size of a display device for displaying an image signal made of a plurality of the image frames and a memory size of a memory for a display of the display device.

The memory size of a memory for a display corresponds to the image size of the image frame that can be displayed by the display device. The display size of the display device corresponds to the image size of the image frame that is actually displayed.

In this interpolation frame generation device, an interpolation inadequate area is determined from a difference between a display size of a display device and a memory size of a memory for a display, for example. In addition, a special area compensation process is performed for the determined interpolation inadequate area so that an interpolation frame can be generated.

According to a thirty-third aspect of the present invention, there is provided an interpolation frame generation method for generating an interpolation frame for interpolating image frames that are obtained by decoding a coded image signal that is coded by motion compensation. The method comprises an image signal information acquisition step, a motion vector detection step and an interpolation frame generation step. The image signal information acquisition step is for acquiring image signal information of the coded image signal. The motion vector detection step is for partially selecting at least an image block from amongst all image blocks that form a base frame and for detecting a motion vector of the partially selected image block between the base frame and a reference frame. The interpolation frame generation step is for generating the interpolation frame in accordance with the image signal information and the motion vector.

Here, the image signal information is defined as information about a coded image signal that is coded by motion compensation, which is a motion compensation vector of a coded block, a coding mode or a coding method of the coded image signal, for example.

In this interpolation frame generation method, image signal information is utilized. In the motion vector detection step, a motion vector is detected for the partially selected image block among the entire image blocks that form an image frame when detecting motion vectors. As a result, compared with a situation in which motion vectors are detected for all image blocks, the volume of calculation necessary for detecting motion vectors is decreased. More specifically, this interpolation frame generation method is adequate for implementation.

According to a thirty-fourth aspect of the present invention, there is provided an interpolation frame generation method for generating an interpolation frame for interpolating image frames. The method comprises a movement associated information acquisition step, an interpolation vector derivation step, and an interpolation frame generation step. The movement associated information acquisition step is for deriving movement associated information about movements of image blocks that form an image frame. The interpolation vector derivation step is for deriving a global motion vector for generating an interpolation frame in accordance with the movement associated information. The interpolation frame generation step is for generating the interpolation frame in accordance with the global motion vector.

In this interpolation frame generation method, the interpolation frame is generated in accordance with the global motion vector for interpolation that is derived in accordance with movement associated information. Since the interpolation frame is generated by the global motion vector, distortion of an image of the interpolation frame can be reduced, so that image quality of the interpolation frame can be improved.

According to a thirty-fifth aspect of the present invention, there is provided an interpolation frame generation method for generating an interpolation frame for interpolating image frames. The method comprises a movement associated information acquisition step, an image frame decision step, and an interpolation frame generation step. The movement associated information acquisition step is for acquiring movement associated information about movements of image blocks that form an image frame. The image frame decision step is for deciding whether or not the image frame is adequate for generating the interpolation frame. The interpolation frame generation step is for generating the interpolation frame in accordance with the movement associated information by switching a method of generating the interpolation frame in accordance with the decision.

Here, in the image frame decision step, it is decided that the image frame is not adequate for generating an interpolation frame in situations in which dispersion of the movement associated information of the image frame is large, and in situations in which there are many image blocks in which a sum of DCT coefficients of coded blocks that form a coded image signal for decoding the image frame is larger than a certain threshold level. Moreover, the image frame is not adequate in situations in which there are many image blocks that are intra coded, where there are many image blocks in which a sum of absolute differences (SAD) of the image block that is calculated when detecting the motion vector is larger than a certain threshold level, or where directions of the movement associated information expressed as a vector are changed in the number larger than a predetermined number, for example.

In this interpolation frame generation method, since it is decided whether or not the image frame is adequate for generating the interpolation frame, an appropriate interpolation frame can be generated so that image quality of the interpolation frame can be improved.

According to a thirty-sixth aspect of the present invention, there is provided an interpolation frame generation method for generating an interpolation frame for interpolating image frames. The method comprises generation process ability decision step and an interpolation frame generation step. The generation process ability decision step is for deciding generation process ability for generating the interpolation frame. The interpolation frame generation step is for generating the interpolation frame in accordance with a decision in the generation process ability decision step.

In this interpolation frame generation method, the generation process ability decision step is for deciding the generation process ability for generating the interpolation frame. Here, the generation process ability is a processing ability that can be used for generating the interpolation frame, which is decided in accordance with, for example, an image size of the image frame, a frame frequency of the image signal made of image frames or other attributions of the image signal, or a processing ability that is used for a process except the process of generating the interpolation frame. More specifically, an interpolation frame can be generated appropriately in accordance with the generation process ability.

According to a thirty-seventh aspect of the present invention, there is provided an interpolation frame generation method for generating an interpolation frame for interpolating image frames. The method comprises a motion vector detection step and an interpolation frame generation step. The motion vector detection step is for detecting at least a motion vector of an image block that forms an image frame via a motion detecting unit of a coding device for motion compensation coding. The interpolation frame generation step is for generating the interpolation frame in accordance with the motion vector.

In this interpolation frame generation method, the motion detecting unit of a coding device for performing motion compensation coding is utilized. Therefore, the scale of a circuit or software code that generates an interpolation frame can be reduced. More specifically, this interpolation frame generation method is adequate for implementation.

According to a thirty-eighth aspect of the present invention, there is provided an interpolation frame generation method for generating an interpolation frame for interpolating image frames. The method comprises a motion vector detection step and an interpolation frame generation step. The motion vector detection step is for detecting motion vectors by utilizing a plurality of image frames that are located either before or after interpolation frame in the display order. The interpolation frame generation step is for generating the interpolation frame in accordance with the motion vectors.

In this interpolation frame generation method, a motion vector can be detected for an image block that is not included in one image frame located after the interpolation frame in the display order, by using an image frame that is located temporally further from the one image frame. As a result, the accuracy with which an interpolation frame is generated can be improved.

According to a thirty-ninth aspect of the present invention, there is provided an interpolation frame generation method for generating an interpolation frame for interpolating image frames. The method comprises an area determination step and an interpolation frame generation step. The area determination step is for determining an interpolation inadequate area that is an outer frame area of an image frame and is not adequate for generating the interpolation frame. The interpolation frame generation step is for generating the interpolation frame in accordance with movement associated information about movements of image blocks that form the image frame and for performing a special area compensation process for the decided interpolation inadequate area so as to generate the interpolation frame.

Here, the movement associated information is, for example, a motion compensation vector of a coded block that forms a coded image signal for decoding the image frames or a motion vector detected for an image block that forms the image frame.

In this interpolation frame generation method, a special area compensation process is performed for an interpolation inadequate area that is an outer frame area of the image frame and is not adequate for generating an interpolation frame so as to generate an interpolation frame. Therefore, distortion of an image can be reduced that can be generated easily at an outer frame area of an interpolation frame when generating an interpolation frame using movement associated information. As a result, image quality of an interpolation frame can be improved.

According to a fortieth aspect of the present invention, there is provided an interpolation frame generation program for performing an interpolation frame generation method for generating an interpolation frame for interpolating image frames that are obtained by decoding a coded image signal that is coded by motion compensation by using a computer. The interpolation frame generation program makes the computer execute the interpolation frame generation method comprising an image signal information acquisition step, a motion vector detection step and an interpolation frame generation step. The image signal information acquisition step is for acquiring image signal information of the coded image signal. The motion vector detection step is for partially selecting at least an image block among the entire image blocks that form a base frame and for detecting a motion vector of the partially selected image block between the base frame and a reference frame. The interpolation frame generation step is for generating the interpolation frame in accordance with the image signal information and the motion vector.

Here, the image signal information is defined as information about a coded image signal that is coded by motion compensation, which is a motion compensation vector of a coded block, a coding mode or a coding method of the coded image signal, for example.

In this interpolation frame generation program, image signal information is utilized. In the motion vector detection step, a motion vector is detected for the partially selected image block among the entire image blocks that form an image frame when detecting motion vectors. As a result, compared with the case where motion vectors are detected for all image blocks, the volume of calculation necessary for detecting a motion vector is decreased. More specifically, this interpolation frame generation method is adequate for implementation.

According to a forty-first aspect of the present invention, there is provided an interpolation frame generation program for performing an interpolation frame generation method for generating an interpolation frame for interpolating image frames by using a computer. The interpolation frame generation program makes the computer execute the interpolation frame generation method comprising a movement associated information acquisition step, an interpolation vector derivation step, and an interpolation frame generation step. The movement associated information acquisition step is for deriving. The interpolation vector derivation step is for deriving a global motion vector for generating an interpolation frame in accordance with the movement associated information. The interpolation frame generation step is for generating the interpolation frame in accordance with the global motion vector.

In this interpolation frame generation program, the interpolation frame is generated in accordance with the global motion vector for interpolation that is derived in accordance with movement associated information. Since the interpolation frame is generated by the global motion vector, distortion of an image of the interpolation frame can be reduced, so that image quality of the interpolation frame can be improved.

According to a forty-second aspect of the present invention, there is provided an interpolation frame generation program for performing an interpolation frame generation method for generating an interpolation frame for interpolating image frames by using a computer. The interpolation frame generation program makes the computer execute the interpolation frame generation method comprising a movement associated information acquisition step, an image frame decision step and an interpolation frame generation step. The movement associated information acquisition step is for acquiring movement associated information about movements of image blocks that form an image frame. The image frame decision step is for deciding whether or not the image frame is adequate for generating the interpolation frame. The interpolation frame generation step is for generating the interpolation frame in accordance with the movement associated information by switching a method of generating the interpolation frame in accordance with the decision.

Here, in the image frame decision step, it is determined that the image frame is not adequate for generating an interpolation frame in situations in which dispersion of the movement associated information of the image frame is large, and in situations in which there are many image blocks in which a sum of DCT coefficients of coded blocks that form a coded image signal for decoding the image frame is larger than a certain threshold level. Moreover, the image frame is not adequate for generating an interpolation frame in situations in which there are many image blocks that are intra coded, where there are many image blocks in which a sum of absolute differences (SAD) of the image block that is calculated when detecting the motion vector is larger than a certain threshold level, or where directions of the movement associated information expressed as a vector are changed in the number larger than a predetermined number, for example.

In this interpolation frame generation program, since it is determined whether or not the image frame is adequate for generating the interpolation frame, an appropriate interpolation frame can be generated so that image quality of the interpolation frame can be improved.

According to a forty-third aspect of the present invention, there is provided an interpolation frame generation program for performing an interpolation frame generation method for generating an interpolation frame for interpolating image frames by using a computer. The interpolation frame generation program makes the computer execute the interpolation frame generation method comprising a generation process ability decision step and an interpolation frame generation step. The generation process ability decision step is a step for deciding generation process ability for generating the interpolation frame. The interpolation frame generation step is for generating the interpolation frame in accordance with a decision in the generation process ability decision step.

In this interpolation frame generation program, the generation process ability decision step is for deciding the generation process ability for generating the interpolation frame. Here, the generation process ability is a processing ability that can be used for generating the interpolation frame, which is decided in accordance with, for example, an image size of the image frame, a frame frequency of the image signal made of image frames or other attributes of the image signal, or a processing ability that is used for a process except the process of generating the interpolation frame. More specifically, an interpolation frame can be generated appropriately in accordance with the generation process ability.

According to a forty-fourth aspect of the present invention, there is provided an interpolation frame generation program for performing an interpolation frame generation method for generating an interpolation frame for interpolating image frames by using a computer. The interpolation frame generation program makes the computer execute the interpolation frame generation method comprising a motion vector detection step and an interpolation frame generation step. The motion vector detection step is for detecting at least a motion vector of an image block that forms an image frame via a motion detecting unit of a coding device for motion compensation coding. The interpolation frame generation step is for generating the interpolation frame in accordance with the motion vector.

In this interpolation frame generation program, the motion detecting unit of a coding device for performing motion compensation coding is utilized. Therefore, the scale of a circuit or software code that generates an interpolation frame can be reduced. More specifically, this interpolation frame generation method is adequate for implementation.

According to a forty-fifth aspect of the present invention, there is provided an interpolation frame generation program for performing an interpolation frame generation method for generating an interpolation frame for interpolating image frames by using a computer. The interpolation frame generation program makes the computer execute the interpolation frame generation method comprising a motion vector detection step and an interpolation frame generation step. The motion vector detection step is for detecting motion vectors by utilizing a plurality of image frames that are located either before or after the interpolation frame in the display order. The interpolation frame generation step is for generating the interpolation frame in accordance with the motion vectors.

In this interpolation frame generation program, a motion vector can be detected for an image block that is not included in one image frame located before or after the interpolation frame in the display order, by using an image frame that is located temporally further from the one image frame. As a result, the accuracy with which an interpolation frame is generated can be improved.

According to a forty-sixth aspect of the present invention, there is provided an interpolation frame generation program for performing an interpolation frame generation method for generating an interpolation frame for interpolating image frames by using a computer. The interpolation frame generation program makes the computer execute the interpolation frame generation method comprising an area determination step and an interpolation frame generation step. The area determination step is for determining an interpolation inadequate area that is an outer frame area of an image frame and is not adequate for generating the interpolation frame. The interpolation frame generation step is for generating the interpolation frame in accordance with movement associated information about movements of image blocks that form the image frame and for performing a special area compensation process for the decided interpolation inadequate area so as to generate the interpolation frame.

Here, the movement associated information is, for example, a motion compensation vector of a coded block that forms a coded image signal for decoding the image frames or a motion vector detected for an image block that forms the image frame.

In this interpolation frame generation program, a special area compensation process is performed for an interpolation inadequate area that is an outer frame area of the image frame and is not adequate for generating an interpolation frame so as to generate an interpolation frame. Therefore, distortion of an image can be reduced that can be generated easily at an outer frame area of an interpolation frame when generating an interpolation frame using movement associated information. As a result, image quality of an interpolation frame can be improved.

BRIEF DESCRIPTION OF THE DRAWINGS

FIG. 4 describes an effect of the first embodiment of the present invention;

FIGS. 10A and 10B show a modification of the first embodiment in which the interpolation motion vector is obtained for each interpolation block.

FIG. 23 is a flowchart showing a method for generating an interpolation frame according to the third embodiment of the present invention;

FIGS. 31A-31D describe area compensation for a pixel area on the interpolation frame;

FIG. 45 describes the operation of the interpolation frame generating unit as a modification of the seventh embodiment of the present invention;

DESCRIPTION OF THE PREFERRED EMBODIMENTS

Hereinafter, the present invention will be described in more detail with reference to the embodiments and drawings.

First Embodiment

A first embodiment of the present invention will be described with reference to FIGS. 1-14.

(1) Interpolation Frame Generation Device 101

Figure 1:
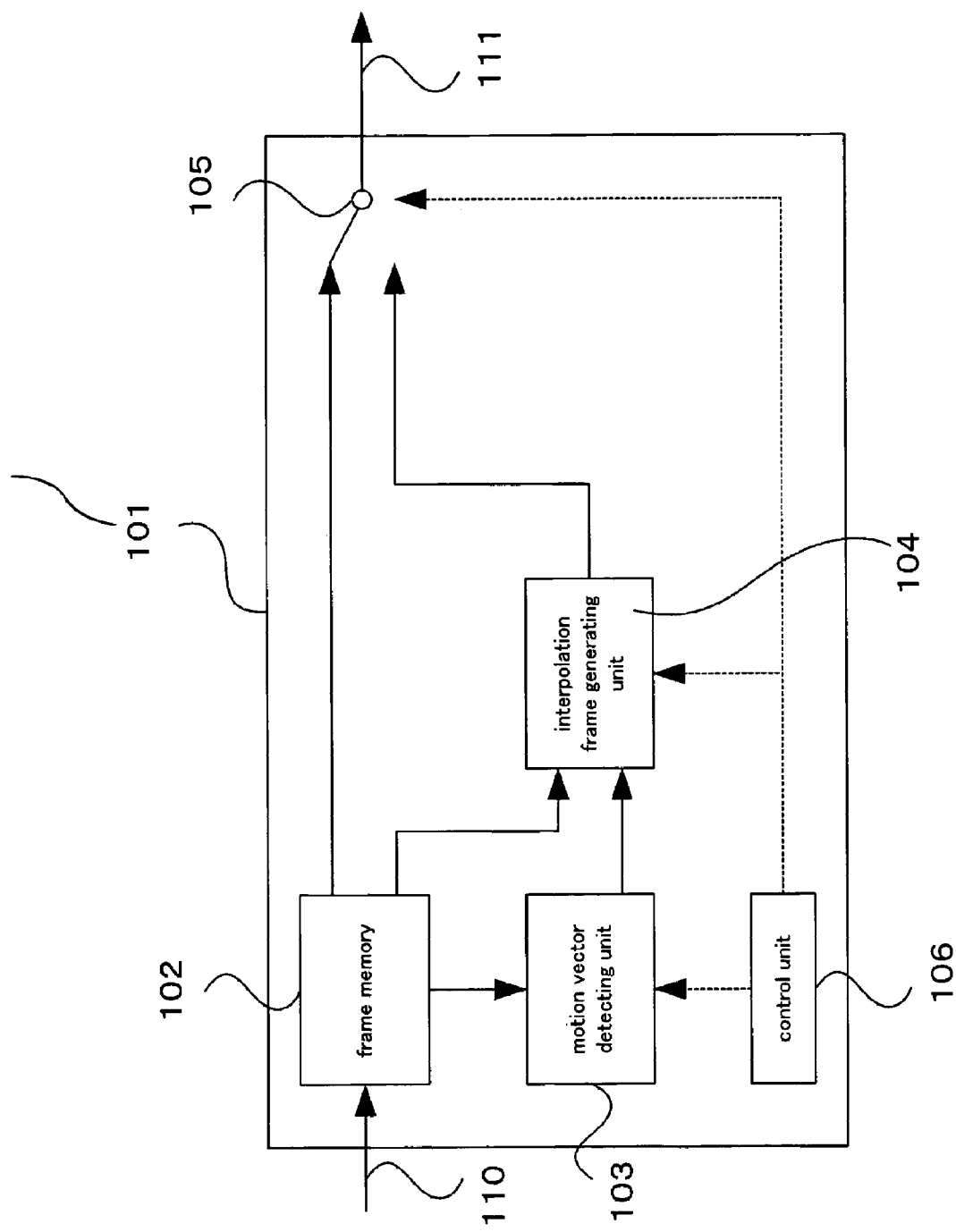
FIG. 1 is a block diagram showing the configuration of an interpolation frame generation device according to a first embodiment of the present invention.

FIG. 1 shows the structure of an interpolation frame generation device 101 in the first embodiment of the present invention. The interpolation frame generation device 101 is a device for generating interpolation frames in order to interpolate image frames that form an image signal in a television set, a personal computer (PC), a cellular phone or other devices that display image signals.

The interpolation frame generation device 101 includes a frame memory 102, a motion vector detecting unit 103, an interpolation frame generating unit 104, a signal switching unit 105 and a control unit 106. The frame memory 102 stores an input image signal 110 for each image frame. The motion vector detecting unit 103 detects motion vectors of image blocks that form an image frame based upon a plurality of image frames stored in the frame memory 102. Details of the operation of the motion vector detecting unit 103 will be described below. The interpolation frame generating unit 104 generates interpolation frames from the image frames and the detected motion vectors. Details of the operation of the interpolation frame generating unit 104 will be described below. The signal switching unit 105 switches between the image frames stored in the frame memory 102 and the interpolation frames generated by the interpolation frame generating unit 104 in order to form an output image signal 111. The control unit 106 supplies a control signal that is necessary for operating the motion vector detecting unit 103, the interpolation frame generating unit 104 and the signal switching unit 105.

Here, with reference to FIGS. 2A and 2B, the operation of the motion vector detecting unit 103 and the interpolation frame generating unit 104 will be described in greater detail. A situation will be described in which one interpolation frame is generated between two image frames so that the frame frequency of the input image signal 110 (see FIG. 1) is doubled. Hereinafter, in order to clarify the description, the image frames that are relevant to the generation of the interpolation frame will be respectively referred to as a base frame and a reference frame. The base frame is an image frame that serves as a base for detecting the motion vector, and is divided into image blocks so that a motion vector is detected for each of the image blocks. The reference frame is an image frame that serves as an object for detecting the motion vector, and also one in which matching with image blocks that form the base frame is performed.

The motion vector detecting unit 103 can use a forward frame that is located before and a backward frame that is located after the interpolation frame in the display order as in the conventional technique. In addition, the motion vector detecting unit 103 can use a plurality of base frames that are located after the interpolation frame in the display order. Hereinafter, the primary description will be directed toward the latter function of the motion vector detecting unit 103.

Figure 2A:
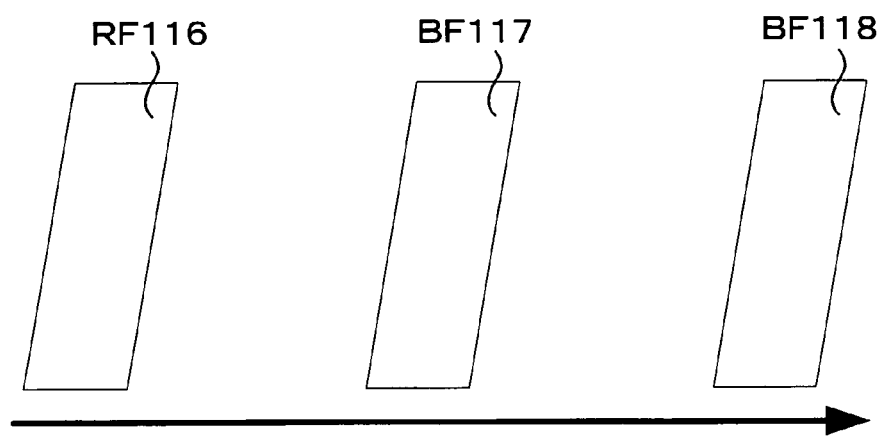
FIGS. 2A and 2B describe the operation of a motion vector detecting unit and an interpolation frame generating unit.

FIG. 2A shows a reference frame RF116, a base frame BF117 and a base frame BF118 stored in the frame memory 102. A situation will be described in which these three image frames are used for generating an interpolation frame CF121 (see FIG. 2B) for interpolating between the reference frame RF116 and the base frame BF117. The motion vector detecting unit 103 divides the base frames BF117 and BF118 stored in the frame memory 102 into image blocks having a predetermined size and detects a motion vector for each of the image blocks. More specifically, each of the divided image blocks is matched with a pixel area that forms the reference frame RF116 in order to detect a motion vector MV125 and a motion vector MV126. Here, an image block having a predetermined size is usually an 8×8 or 16×16 pixel image block, for example. However, the effects of the present invention do not depend on the size, shape or other factors of the image blocks.

The interpolation frame generating unit 104 generates an interpolation frame CF121 in accordance with the detected motion vector MV125 and motion vector MV126. More specifically, an interpolation motion vector CMV127 is first derived by internally dividing the motion vector MV125 by the ratio of the temporal distance between the base frame BF118 and the reference frame RF116 to the temporal distance between the base frame BF118 and the interpolation frame CF121. As shown in FIG. 2B, the size of the motion vector MV125 is transformed into three quarters without changing the direction of the same so as to derive the interpolation motion vector CMV127. Next, the derived interpolation motion vector CMV127 is used for moving the image block that forms the base frame BF118 so as to generate an interpolation pixel area that forms the interpolation frame CF121. In the same way, an interpolation motion vector CMV128 is derived from the motion vector MV126, so as to generate an interpolation pixel area that forms the interpolation frame CF121. As shown in FIG. 2B, the interpolation motion vector CMV128 is derived by transforming the size of the motion vector MV126 into half without changing the direction of the same. A frame that is filled with the interpolation pixel areas that are derived as described above is referred to as an interpolation frame CF121.

Here, if the interpolation pixel area that is generated in accordance with the interpolation motion vector CMV127 and the interpolation pixel area that is generated in accordance with the interpolation motion vector CMV128 form an overlapping area in the interpolation frame CF121, a predetermined procedure is used for dealing with this situation. For example, the interpolation pixel area that is generated in accordance with a base frame temporally close to the interpolation frame CF121 may have a priority, or the interpolation pixel area that is generated in accordance with a predetermined image frame may have a priority. Otherwise, pixel values of the overlapping portion may be averaged.

In addition, if the interpolation frame CF121 cannot be filled with interpolation pixel areas generated in accordance with the interpolation motion vector CMV127 and with interpolation pixel areas generated in accordance with the interpolation motion vector CMV128, a predetermined procedure is used for dealing with this situation. For example, pixel values of the reference frame RF116, the base frame BF117, the base frame BF118 or other image frames may be used in order to compensate for information missing in the interpolation frame CF121.

If the detected motion vector MV125 or MV126 is not appropriate for generating the interpolation frame CF121, eventually the base frame BF117 or the base frame BF118 may not be used for generating the interpolation frame CF121.

(2) Interpolation Frame Generation Method

Figure 3:
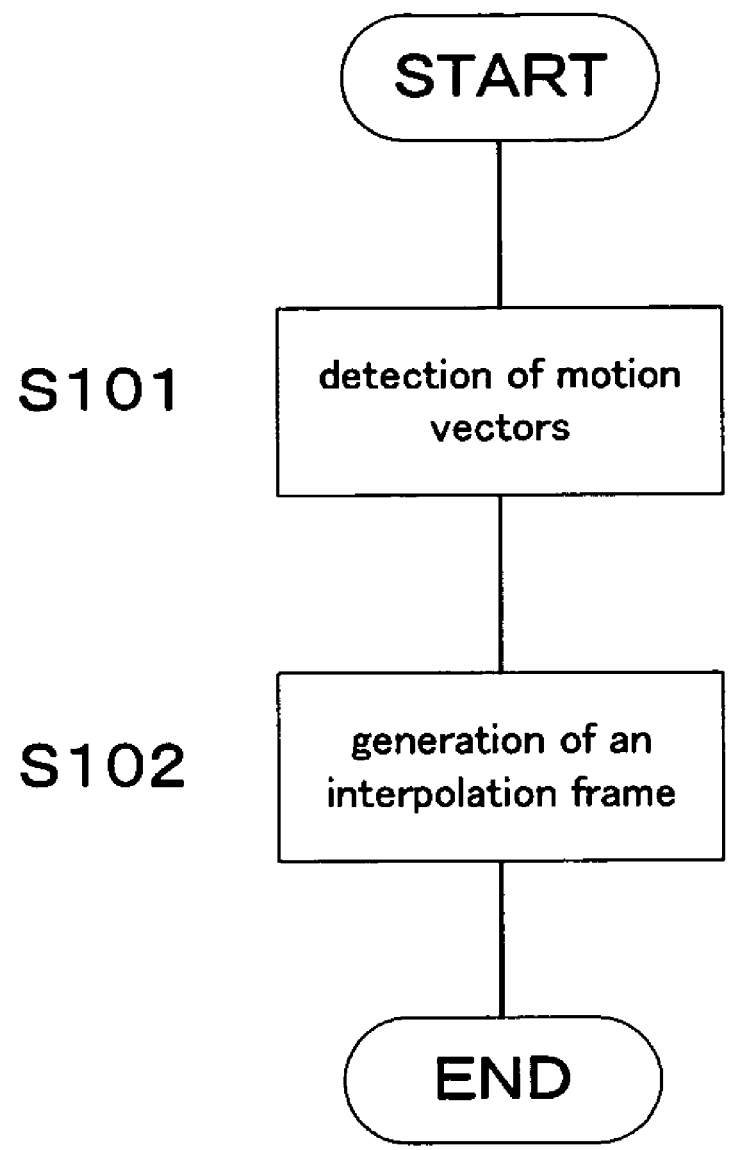
FIG. 3 is a flowchart showing an interpolation frame generation method according to the first embodiment of the present invention.

FIG. 3 shows a flowchart for describing the interpolation frame generation method in the interpolation frame generation device 101. Each step is the same as the above explanation (1), so a detailed description thereof will be omitted.

The motion vector detecting unit 103 detects motion vectors of the image blocks that form the base frame in accordance with a plurality of image frames stored in the frame memory 102 (Step S101). The interpolation frame generating unit 104 generates an interpolation frame from the plurality of image frames stored in the frame memory 102 and the detected motion vectors of the image blocks of the base frame (Step S102).

(3) Effects of the First Embodiment

According to the interpolation frame generation device and the interpolation frame generation method of the present invention, the following effects can be obtained.
(i) Since the motion vectors can be detected in accordance with a plurality of base frames that are located after the interpolation frame in the display order, a motion vector can be detected for an image block that is not included in the next image frame of the interpolation frame, based upon a base frame that is located temporally further from the next image frame. As a result, the interpolation frame can be generated with improved accuracy.
(ii) Since the base frame that serves as a base for each interpolation pixel area of the interpolation frame can be selected appropriately, the interpolation frame can be generated with improved accuracy.

With reference to FIG. 4, the effects of the first embodiment will be described in detail. It is assumed that image frames 136-138 are obtained from the input image signal. The image frames 136-138 are images in which a car 141 traverses in front of a person 140. Here, in the image frame 137, the person 140 is hidden behind the car 141. In the conventional technique for generating an interpolation frame (a technique for detecting a motion vector in accordance with each image frame that is located before and after the interpolation frame in the display order), when generating an interpolation frame between the image frame 136 and the image frame 137 for example, the image frame 137 does not have data on the person 140, and thus appropriate motion vectors cannot be detected for the image block 142 that includes the person 140. On the other hand, in the technique of generating an interpolation frame according to the present invention, when generating an interpolation frame between the image frame 136 and the image frame 137 for example, the motion vectors can be detected in accordance with the image frame 137 and the image frame 138 as base frames. As a result, the motion vector of the image block 142 including the person 140 can be detected by using the image frame 138 as a base frame and the image frame 136 as a reference frame.

(4) Modifications of the First Embodiment

The present invention is not limited to the embodiment described above but can be modified in a variety of ways within the scope thereof.

(4-1)

The interpolation frame generation device 101 includes the control unit 106 as shown in FIG. 1. However, the control unit 106 can control other devices in parallel with and outside of the interpolation frame generation device 101.

(4-2)

A situation in which the interpolation frame is generated such that the frame frequency of the input image signal 110 is doubled was described with reference to FIGS. 2A and 2B. However, the effect of the present invention is similar in a situation in which the interpolation frame is generated such that the frame frequency is changed by another degree of magnitude.

(4-3)

Figure 2B:
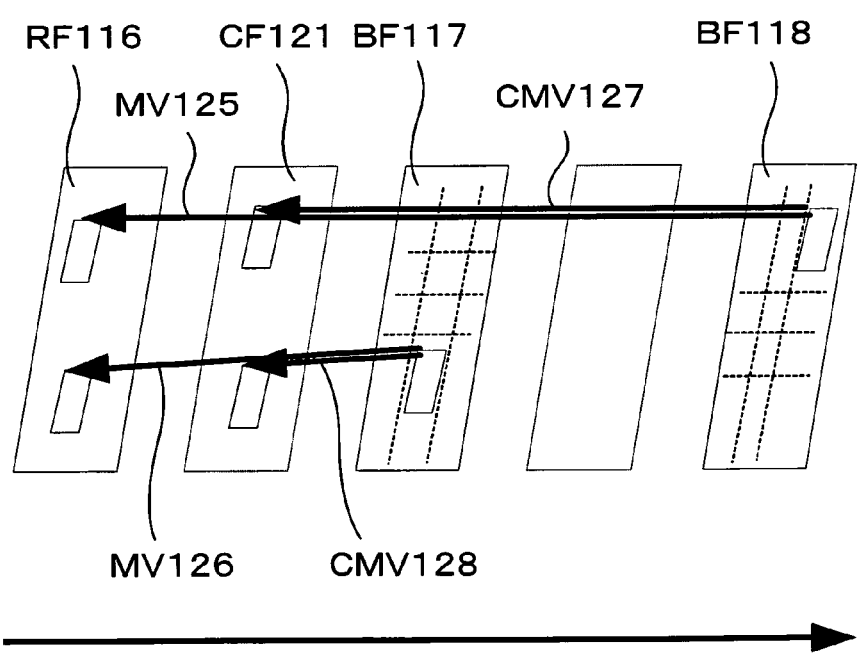

In this embodiment, when generating the interpolation frame CF121, the motion vectors of the image blocks that form the two base frames BF117 and BF118 located temporally after the interpolation frame CF121 are used (see FIG. 2B). Here, the number of base frames that are used for generating the interpolation frame is not limited to two. By increasing the number of base frames, the accuracy with which the interpolation frame is generated can be further improved.

(4-4)

In this embodiment, when generating the interpolation frame CF121, the motion vectors of the image blocks that form the two base frames BF117 and BF118 located temporally after the interpolation frame CF121 are used (see FIG. 2B). Here, motion vectors of plural base frames may be used that are located temporally before the interpolation frame. This will be described with reference to FIGS. 5A and 5B.

Figure 5A:
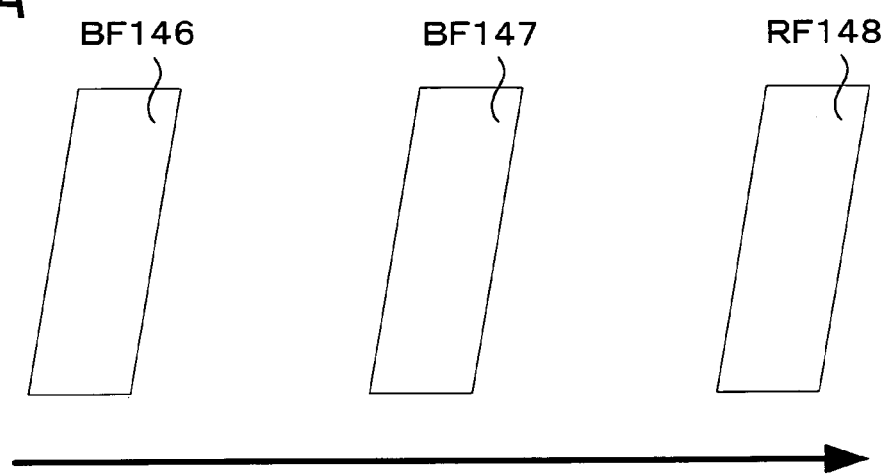
FIGS. 5A and 5B show a modification of the first embodiment in which a plurality of base frames are used.
Figure 5B:
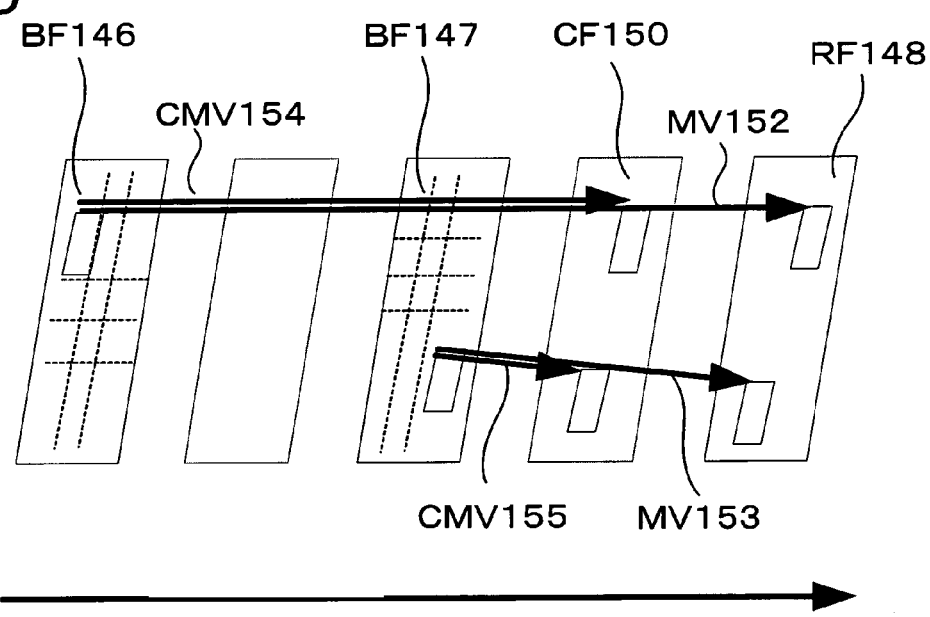

FIG. 5A shows a base frame BF146, a base frame BF147 and a reference frame RF148 stored in the frame memory 102 (see FIG. 1). Using the three image frames, an interpolation frame CF150 (see FIG. 5B) that interpolates between the base frame BF147 and the reference frame RF148 is generated. When this occurs, motion vectors MV152 and MV153 of image blocks which form the base frame BF146 and the base frame BF147 respectively are utilized for the reference frame RF148. More specifically, when generating the interpolation frame CF150, interpolation motion vectors CMV154 and CMV155 are used that are derived by internally dividing the motion vectors MV152 and MV153, respectively.

(4-5)

When generating the interpolation frame, a plurality of reference frames that are located temporally before or after the interpolation frame may be used. A situation in which a plurality of reference frames temporally before the interpolation frame are used will be described with reference to FIGS. 6A and 6B.

Figure 6A:
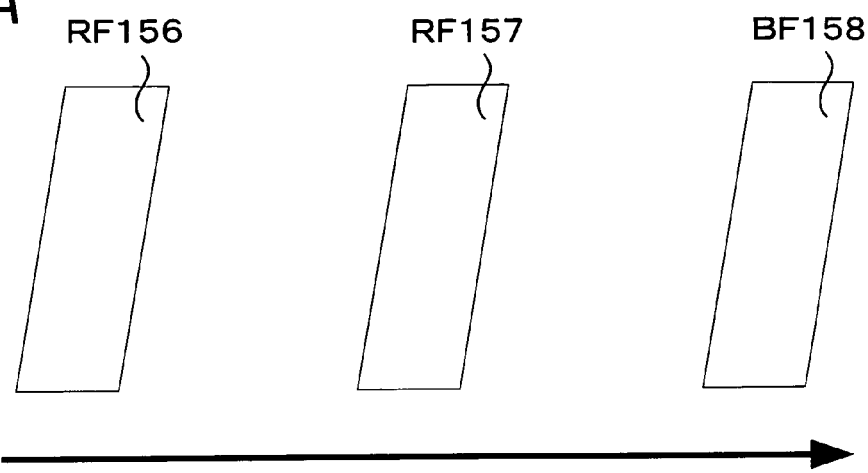
FIGS. 6A and 6B show a modification of the first embodiment in which a plurality of reference frames are used.

FIG. 6A shows the reference frame RF156, the reference frame RF157 and the base frame BF158 stored in the frame memory 102 (see FIG. 1). Using these three image frames, an interpolation frame CF159 (see FIG. 6B) that interpolates between the reference frame RF157 and the base frame BF158 is generated. When this occurs, motion vectors MV160 and MV161 of the image blocks that form the base frame BF158 are used for the reference frame RF156 and the reference frame RF157. More specifically, when generating the interpolation frame CF159, the interpolation motion vectors CMV162 and CMV163 that are derived respectively by internal division of the motion vectors MV160 and MV161 are used.

If the detected motion vector MV160 or MV161 is not appropriate for generating the interpolation frame CF159, eventually the reference frame RF156 or the reference frame RF157 may not be used for generating the interpolation frame CF159.

Furthermore, with respect to the situation in which a plurality of reference frames that are located temporally after the interpolation frame are used, a description thereof will be omitted because the interpolation frame is generated in the same procedure. In addition, the same is true with respect to Sections (4-2) and (4-3), and thus further improvement in the accuracy with which an interpolation frame is generated can be expected by increasing the number of reference frames that are used, for example.

Moreover, in situations in which a plurality of reference frames are used, a plurality of interpolation motion vectors are derived for the same image block in a base frame and the derived interpolation motion vectors are used for generating the interpolation frame. This situation will be described with reference to FIG. 7.

Figure 6B:
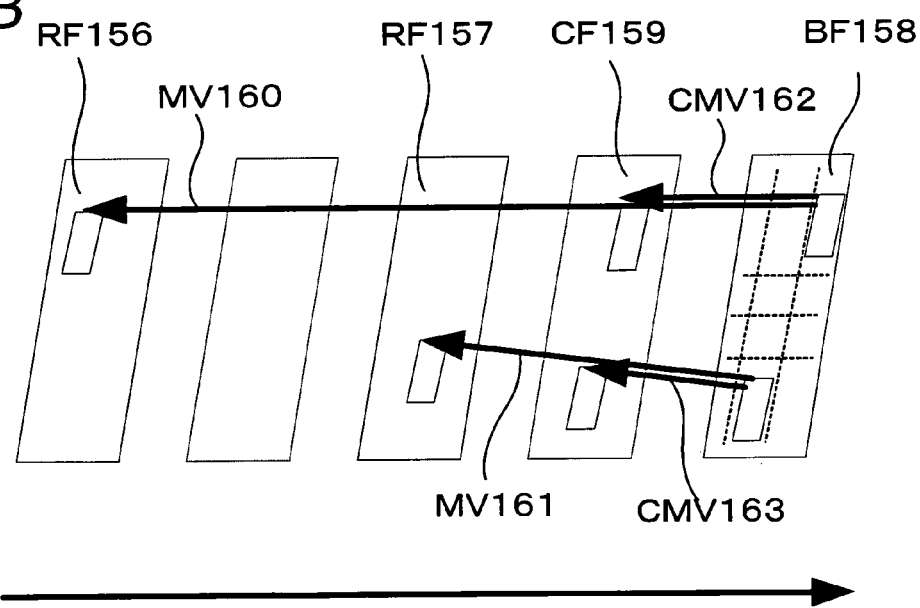
Figure 7:
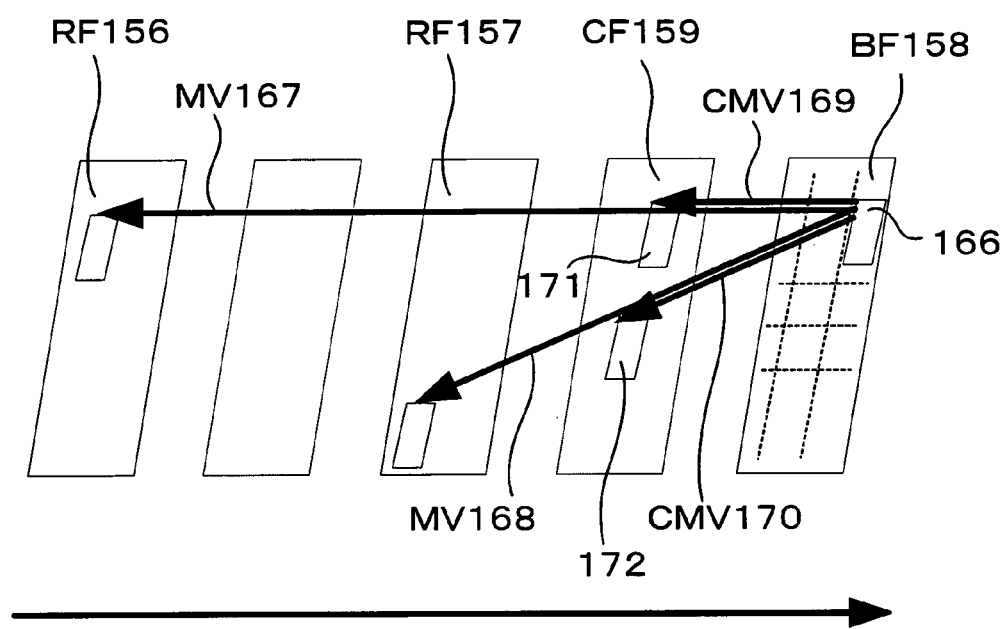
FIG. 7 show a modification of the first embodiment in which a plurality of interpolation motion vectors is derived from the same image block.

In FIG. 7, similar to the situation shown in FIGS. 6A and 6B, the reference frame RF156, the reference frame RF157 and the base frame BF158 are used for generating the interpolation frame CF159 that interpolates between the reference frame RF157 and the base frame BF158. When this occurs, interpolation motion vectors CMV169 and CMV170 are derived from detected motion vectors MV167 and MV168 respectively for the image block 166 that forms the base frame BF158. These interpolation motion vectors CMV169 and CMV170 are used to move the image block 166 in order to generate the interpolation pixel areas 171 and 172 that form the interpolation frame CF159.

(4-6)

When generating the interpolation frame, both a base frame and a reference frame that are located temporally before or after the interpolation frame may be used. A situation in which a base frame and a reference frame that are located temporally after the interpolation frame are used will be described with reference to FIGS. 8A-8C.

Figure 8A:
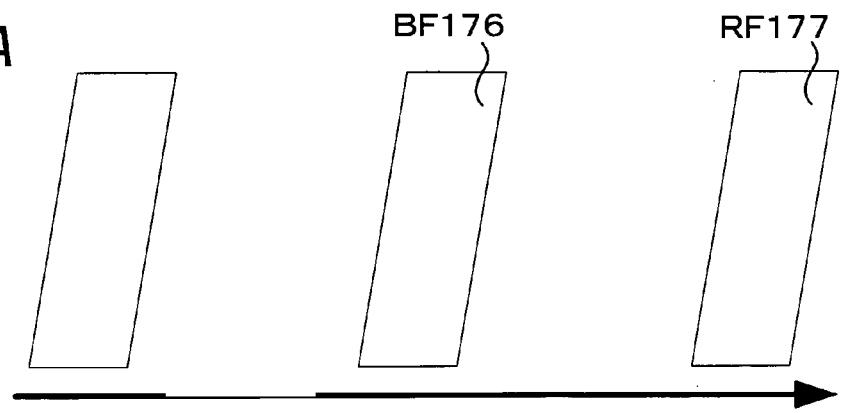
FIGS. 8A-8C show a modification of the first embodiment in which a motion vector is externally divided so as to obtain an interpolation motion vector.

FIG. 8A shows a base frame BF176 and a reference frame RF177 stored in the frame memory 102 (see FIG. 1). Using these two image frames, an interpolation frame CF178 (see FIG. 8B) is generated that is located temporally before the base frame BF176 and the reference frame RF177. When this occurs, a motion vector MV179 of the image block that forms the base frame BF176 is used for the reference frame RF177. More specifically, when generating the interpolation frame CF178, an interpolation motion vector CMV180 is derived by external division of the motion vector MV179.

Figure 8B:
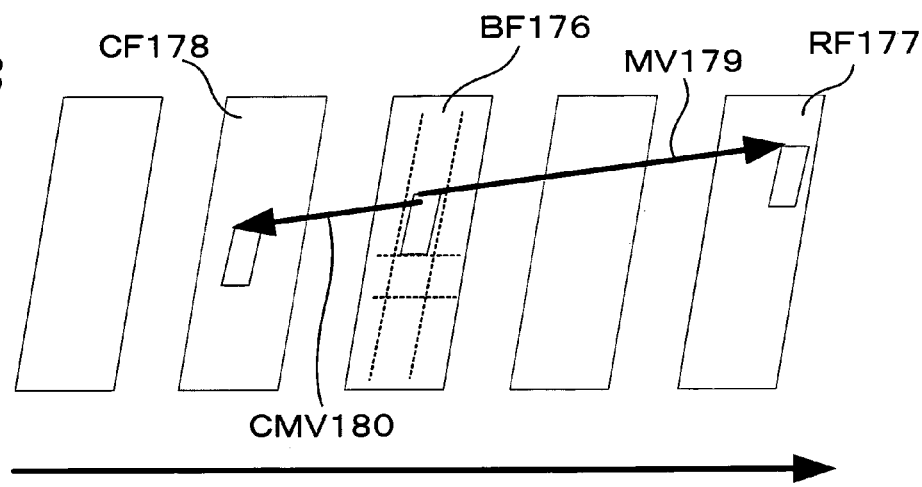
Figure 8C:
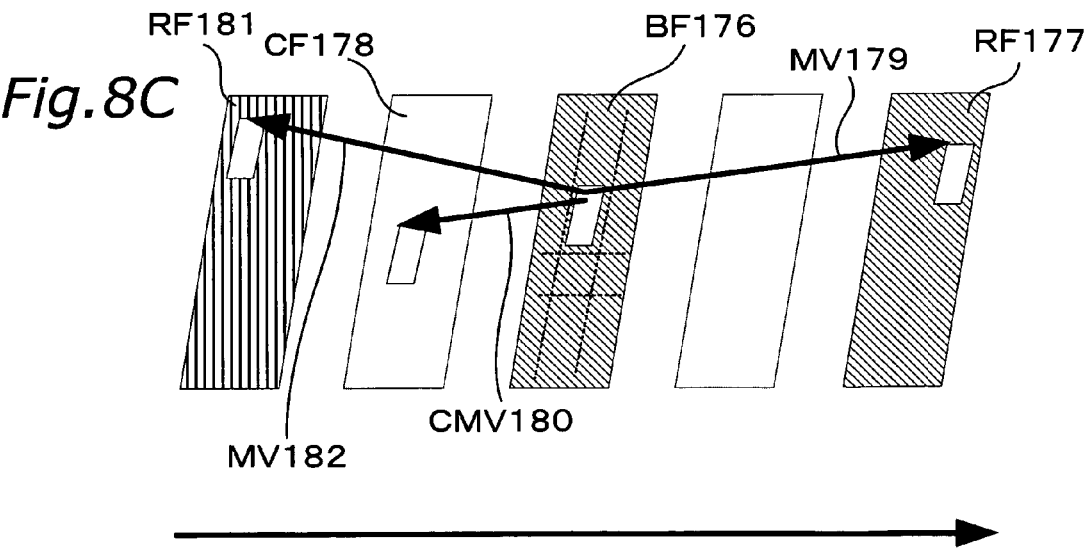

With reference to FIG. 8C, the effects of this will be described. When generating the interpolation frame CF178 that is located temporally before the base frame BF176 and the reference frame RF177, it is possible to detect a motion vector MV182 for the reference frame RF181 that is located temporally before the interpolation frame CF178. However, if there is a scene change between the reference frame RF181 and the base frame BF176, correlation between the reference frame RF181 and the base frame BF176 is low. For this reason, the detected motion vector MV182 is not an appropriate motion vector for representing true motion of the image block that forms the base frame BF176. Therefore, the interpolation motion vector CMV180 is derived from the detected motion vector MV179 for the reference frame RF177 that is in the same scene as the base frame BF176 for generating the interpolation frame. As a result, the accuracy of the interpolation frame can be improved.

Furthermore, a situation in which the base frame BF176 is located temporally before the reference frame RF177 was described with reference to FIGS. 8A-8C. However, the base frame BF176 may be located temporally after the reference frame RF177. In addition, the base frame BF176 and the reference frame RF177 may be located temporally before the interpolation frame CF178

(4-7)

With regard to the methods for generating an interpolation frame described above with reference to FIG. 2 and FIGS. 5A-8C, each of them may be used in an independent manner or in a combination that includes some or all of them. When they are used in combination, the accuracy with which the interpolation frame is generated can be further improved. This situation will be described with reference to FIGS. 9A and 9B.

Figure 9A:
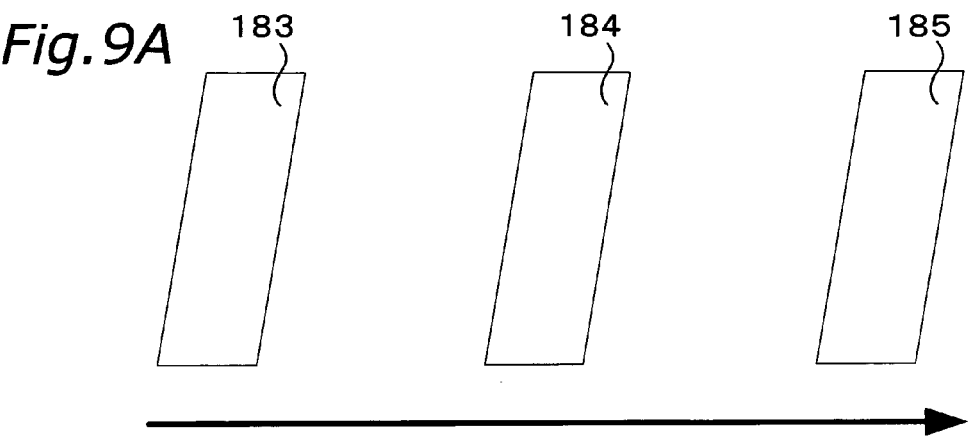
FIGS. 9A and 9B show a modification of the first embodiment in which a bi-directional motion vector is used for generating the interpolation frame.
Figure 9B:
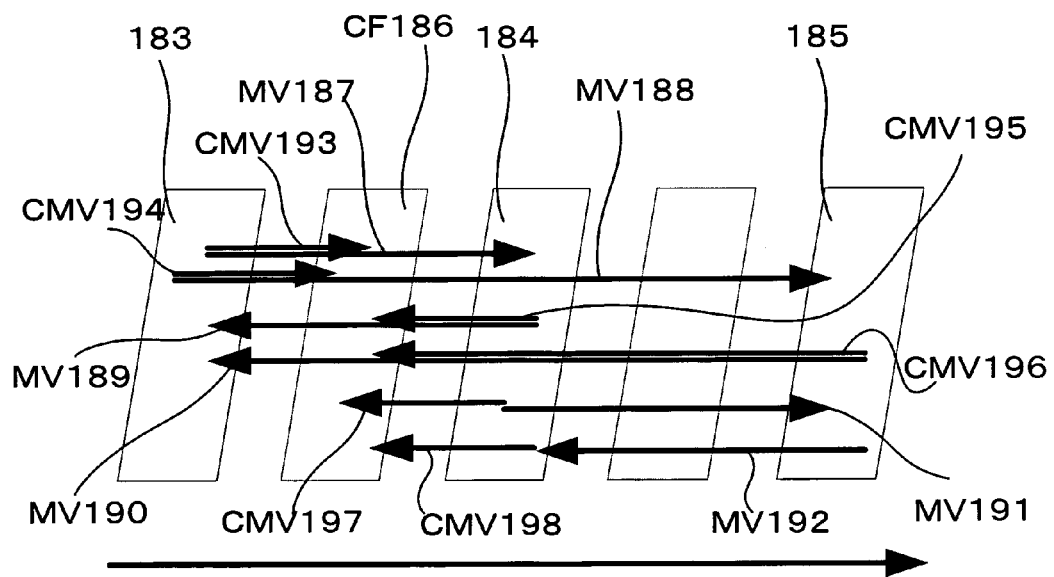
Figure 11A:
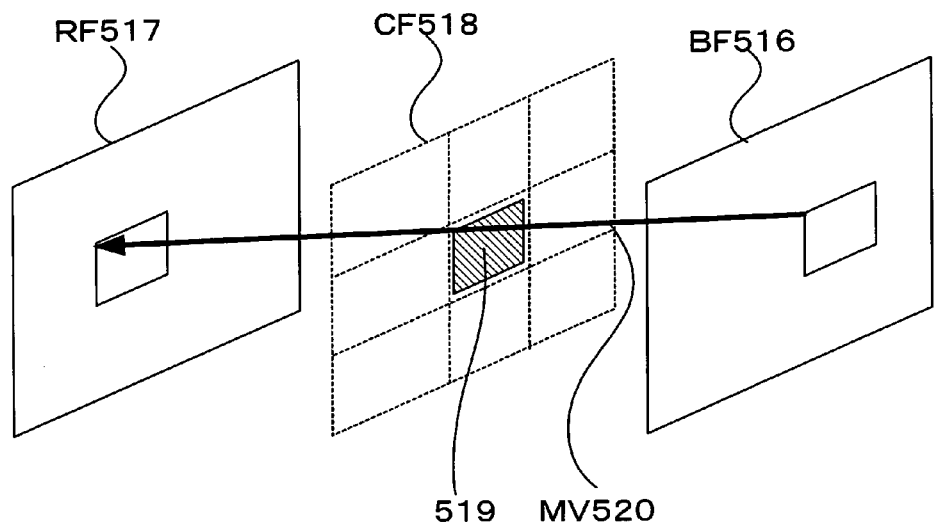
FIGS. 11A and 11B show a modification of the first embodiment in which a motion vector that passes the interpolation block is detected.
Figure 11B:
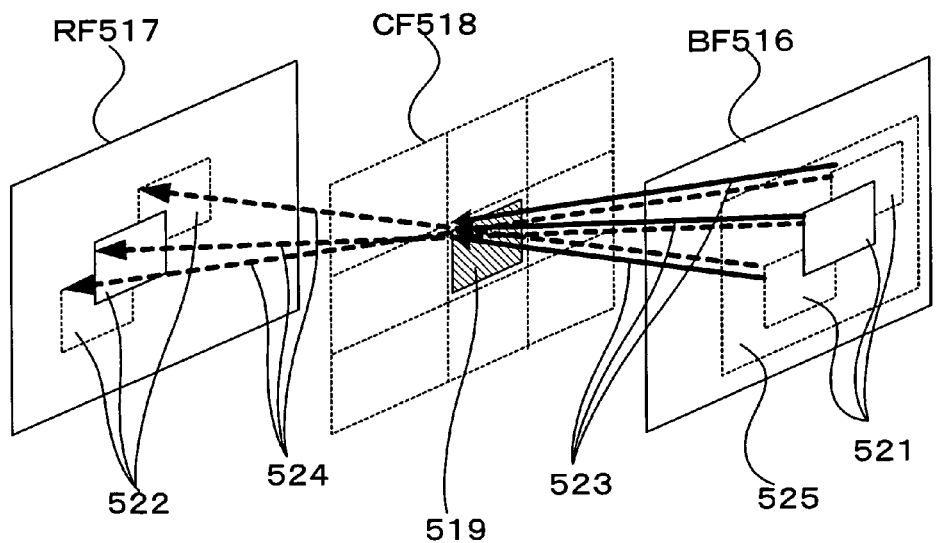

FIG. 9A shows image frames 183-185 stored in the frame memory 102 (see FIG. 1). An interpolation frame CF186 is generated between the image frame 183 and the image frame 184. When this occurs, motion vectors MV187-MV192 that are obtained by using two of the image frames 183-185 are used. More specifically, when generating the interpolation frame CF186, interpolation motion vectors CMV193-CMV196 that are derived by internal division of the motion vectors MV187-MV190 or interpolation motion vectors CMV197 and CMV198 that are derived by external division of the motion vectors MV191 and MV192 are used. Thus, the interpolation frame CF186 is generated by using bi-directional motion vectors.

Furthermore, in the generation of an interpolation frame, as described with reference to FIG. 2 and FIGS. 5A-9B, each of the interpolation pixel areas that forms the interpolation frame may be generated in accordance with motion vectors that are detected by combinations of different image frames.

(4-8)

In the generation of an interpolation frame, it is possible to obtain an interpolation motion vector for each of the interpolation blocks that form the interpolation frame. This situation will be described with reference to FIG. 10A.

When inserting an interpolation frame CF502 between a base frame BF500 and a reference frame RF501, a motion vector MV505 is detected for an image block 504 that forms the base frame BF500. In addition, an internal division of the motion vector MV505 is calculated by the ratio of the temporal distance between the base frame BF500 and the interpolation frame CF502 to the temporal distance between the base frame BF500 and the reference frame RF501, so as to derive an internal division motion vector DMV506. Here, this internal division motion vector DMV506 is to be an interpolation motion vector CMV508 for an interpolation block 507 having the same position with the image block 504. More specifically, the interpolation block 507 is generated in accordance with the pixel value of a pixel area 509 that is positioned at the proximal end of an arrow of the interpolation motion vector CMV508. Thus, it becomes easy to generate the interpolation blocks such that the interpolation frame is filled up.

Furthermore, when generating the interpolation block 507, an internal division motion vector DMV510 may be used that is derived by internally dividing the motion vector MV505 by the ratio of the temporal distance between the interpolation frame CF502 and the reference frame RF501 to the temporal distance between the base frame BF500 and the reference frame RF501. More specifically, the interpolation block 507 may be generated in accordance with the pixel value of a pixel area 512 that is positioned at the distal end of the arrow of the interpolation motion vector CMV511 while the internal division motion vector DMV510 is to be an interpolation motion vector CMV511 for the interpolation block 507 (see FIG. 10B).

Here, a situation in which the interpolation frame CF502 is inserted between the base frame BF500 and the reference frame RF501 was described in order to simplify the description. However, the present invention can be applied to a situation in which there is a plurality of base frames or reference frames. In addition, the present invention can be applied not only to a situation in which the interpolation motion vector is derived by internal division of the detected motion vector but also to a situation in which it is derived by external division of the same.

(4-9)

Furthermore, another method can be used for deriving the interpolation motion vector for each interpolation block that forms the interpolation frame when generating an interpolation frame. This method will be described with reference to FIG. 11.

A situation will be described where an interpolation frame CF518 is inserted between the base frame BF516 and the reference frame RF517. In order to generate an interpolation block 519 that forms the interpolation frame CF518, a motion vector MV520 that passes the interpolation block 519 is detected (see FIG. 11A). When this occurs, matching between base pixel areas 521 that form the base frame BF516 and reference pixel areas 522 that form the reference frame RF517 is performed (see FIG. 11B). Here, positions of the reference pixel areas 522 are determined as positions indicated by vectors 524 that are derived by externally dividing vectors 523 that connect positions of the base pixel areas 521 and positions of the interpolation block 519 by the ratio of the temporal distance between the base frame BF516 and the reference frame RF517 to the temporal distance between the base frame BF516 and the interpolation frame CF518. More specifically, the reference pixel areas 522 corresponds to the base pixel areas 521 of the base frame BF516 one to one. Corresponding reference pixel areas 522 are determined for the base pixel areas 521 included in a certain area 525 of the base frame BF516. Matching is performed for each combination. Then, the motion vector MV520 is detected by the best combination. The procedure for generating the interpolation frame CF518 in accordance with the motion vector MV520 is described in Section (4-8), so a description thereof will be omitted. Thus, similar to Section (4-8), it is easy to generate the interpolation block so as to fill up the interpolation frame.

Here, a situation in which the interpolation frame CF518 is inserted between the base frame BF516 and the reference frame RF517 was described in order to simplify the description. However, the present invention can be applied to a situation in which there is a plurality of base frames or reference frames. In addition, the present invention can be applied not only to a situation in which the interpolation motion vector is derived by internally dividing the detected motion vector but also to a situation in which it is derived by external division of the same. Furthermore, the base pixel area 521 may be an image block that forms the base frame BF516.

(4-10)

Figure 12:
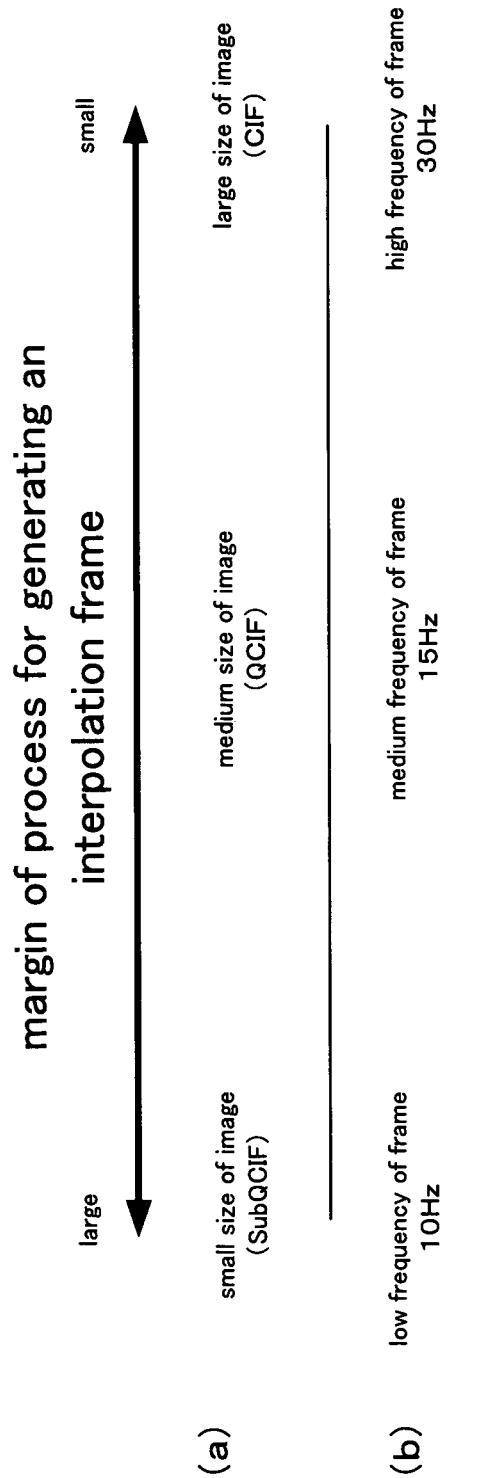
FIG. 12 describes a margin in a process of generating the interpolation frame.

The interpolation frame generation device 101 may be capable of establishing the method for generating the interpolation frame in accordance with a margin of the process for generating the interpolation frame. For example, the control unit 106 obtains an image size, a frame frequency and other elements of the input image signal 110 for determining a margin of the process for generating the interpolation frame in accordance with the obtained information. FIG. 12 describes the relationship between an image size or a frame frequency of the input image signal 110 and the margin of the process. Reference (a) in FIG. 12 shows the relationship between the image size and the margin of the process, and shows that the margin of the process becomes larger as the image size becomes smaller. Reference (b) in FIG. 12 shows the relationship between the frame frequency and the margin of the process. It shows that the margin of the process becomes larger as the frame frequency becomes lower when the number of the frames to be interpolated is the same. In accordance with the results of deciding the margin, the control unit 106 controls the interpolation frame generating unit so as to change the number of the interpolation frames to be generated. In addition, the control unit 106 controls the motion vector detecting unit, changes the number of image frames that are used for generating the interpolation frame, and changes the detection range for the motion vector or for changing the number of image blocks for detecting the motion vectors. In addition, it is possible to perform these changes in a manual manner.

(4-11)

In the embodiment described above, the frame can be either a frame in a progressive scanning image or a frame or a field in an interlaced scanning image.

(4-12)

In the above first embodiment and the modifications thereof, for the detected motion vector for generating the interpolation frame, the interpolation frame generating unit 104 may derive a corrected motion vector that is corrected by a smoothing filter and may derive the interpolation motion vector from this corrected motion vector.

Figure 13A:
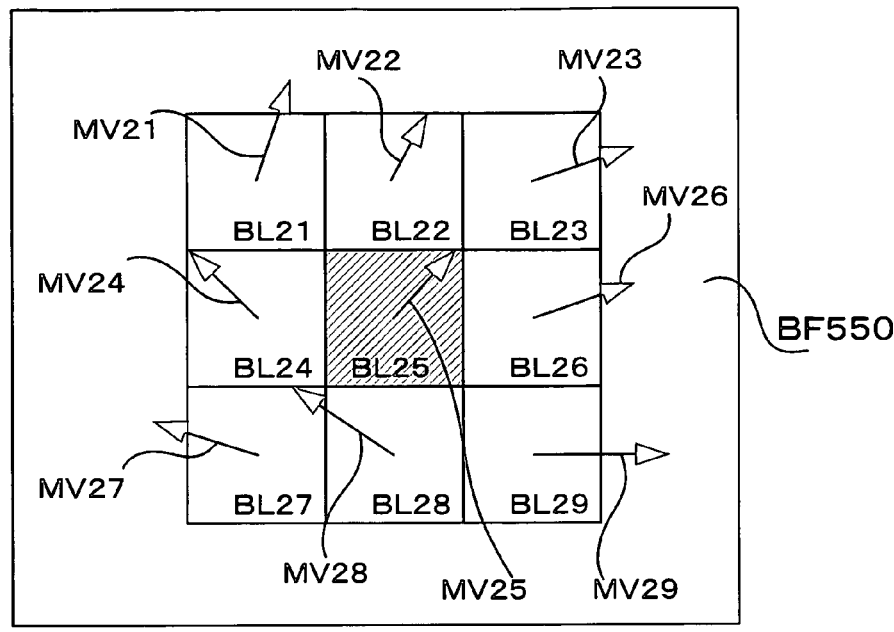
FIGS. 13A-13C show a modification of the first embodiment that includes a correction process in which a smoothing filter is used.

This process will be described specifically with reference to FIG. 13. FIG. 13A shows detected motion vectors MV21-MV29 of image blocks BL21-BL29 that form a base frame BF550.

Figure 13B:
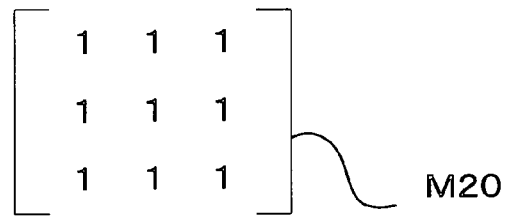
Figure 13C:
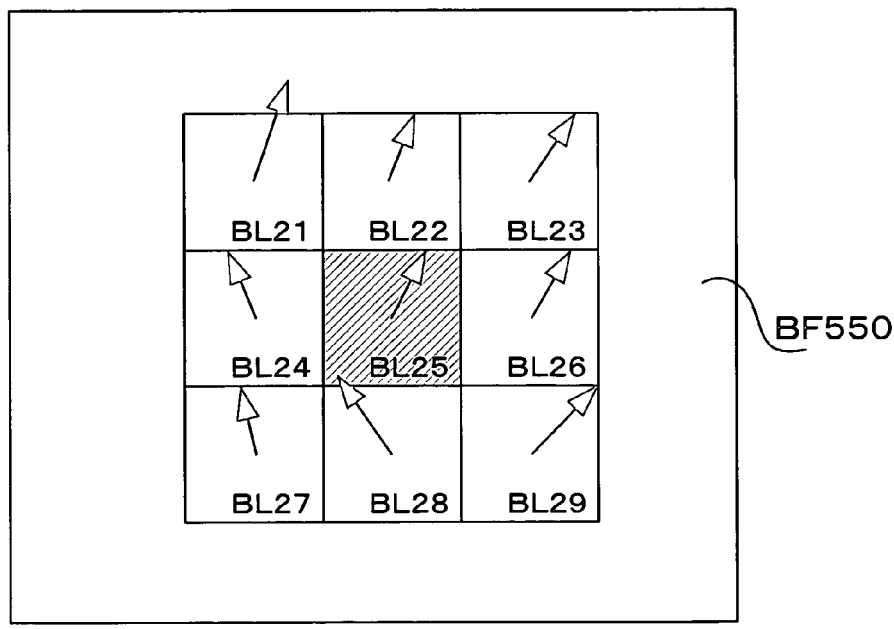

Here, when performing the correction process of the detected motion vector MV25 for the image block BL25, the motion vectors MV21-MV29 of the 3×3 image blocks BL21-BL29, which are located at upper, lower and diagonal vicinities of the image block BL25, are corrected by the linear smoothing filter that has a weight coefficient matrix M20 (see FIG. 13B). A similar correction process is performed for each of the image blocks BL21-BL29 of the base frame BF550, so that the corrected motion vectors are derived for the image blocks BL21-BL29 of the base frame BF550 as shown in FIG. 13C. Internal division or external division of this corrected motion vector is calculated so as to derive the interpolation motion vector and to generate the interpolation frame.

Thus, a correlation between the motion vector MV25 and each of the neighboring motion vectors MV21-MV24 and MV26-MV29 within the base frame BF550 is enhanced. In general, a correlation between movements of image blocks within an image frame is high. Therefore, if the motion vector is corrected in a vector space so as to enhance the correlation, it is possible to achieve a high quality image in the interpolation frame. Furthermore, the coefficient of the weight coefficient matrix M20 may be another coefficient.

In addition, the smoothing filter is not limited to the linear smoothing filter described above but can be an adaptive smoothing filter having a variable weight coefficient that varies in accordance with a size of the motion vector that is used for the correction process or a distance between the motion vectors. For example, in a certain adaptive smoothing filter, the weight coefficient is set to a large value when a distance between the motion vector to be corrected and motion vectors of surrounding image blocks are smaller than a threshold level while the weight coefficient is set to a small value when the distance is larger than a threshold level. More specifically, the correction process is performed so that the motion vector to be corrected is affected largely by a motion vector having characteristics of the same movement.

Thus, in an area within an image frame having the same movement characteristics, further enhancement of the correlation between the motion vectors of the image block can be achieved, so that image quality of the interpolation frame can be improved.

Furthermore, the weight coefficient of the adaptive smoothing filter can be one that varies in accordance with a distance between one vector that indicates a typical movement of the image blocks that form the base frame BF550 and a motion vector that is used for the correction process. For example, when the distance between the one vector indicating the typical movement and the motion vector that is used for the correction process is small, a large weight is given to the motion vector.

Thus, the correlation of the motion vectors in each of the image blocks is enhanced for the typical movement of the base frame BF550 while maintaining the movement characteristics. Since it becomes possible to generate the interpolation frame by the image blocks in which the correlation is enhanced for a typical movement of the base frame BF550, the image quality of the interpolation frame can be improved.

Here, the vector indicating a typical movement of the image blocks can be derived as (i) an average value of motion vectors of the entire base frame BF550, (ii) an average value of motion vectors of image blocks located at a periphery of the base frame BF550, (iii) an average value of motion vectors of plural image blocks located at a middle portion of the base frame BF550, (iv) an average value of motion vectors except for a certain image block in the base frame BF550, or (v) a modal value of motion vectors of the entire base frame BF550. A certain image block in (iv) may be an image block that is determined to have a motion vector having a low correlation with motion vectors of neighboring image blocks, or an image block in which it is determined that the detected motion vector will fail to correctly represent true motion of the image block.

In addition, the smoothing filter may be another nonlinear filter (such as a median filter).

For example, when using a median filter, the corrected motion vector can be derived while reducing the influence of an exceptional motion vector from amongst motion vectors that are used for the correction process, so that the image quality of the interpolation frame can be improved.

(4-13)

In Section (4-12) above, it is possible not to use motion vectors of partial image blocks among the entire image blocks for the correction process by the smoothing filter.

Here, the partial image blocks not to be used for the correction process may be image blocks that are located at a certain position in the image frame, an image block that was determined to have a motion vector having a low correlation with a motion vector of a neighboring image block, or an image block in which it is determined that the detected motion vector will fail to correctly represent true motion of the image block, for example.

The motion vector having a low correlation with motion vectors of neighboring image blocks is a motion vector having distances to motion vectors of neighboring image blocks all of which are larger than a predetermined value, for example. The image block in which the detected motion vector is determined to fail in correctly representing true motion of the image block is an image block in which a sum of absolute differences (SAD) between the image block of the base frame and the pixel area of the reference frame that was calculated when detecting the motion vector is larger than a threshold level.

Such image blocks have a tendency to have an inappropriate matching and low reliability for the motion vector.

With reference to FIG. 14, a situation will be described in which a motion vector of image blocks that are located at a certain position in the image frame is not used for the correction process.

Figure 14A:
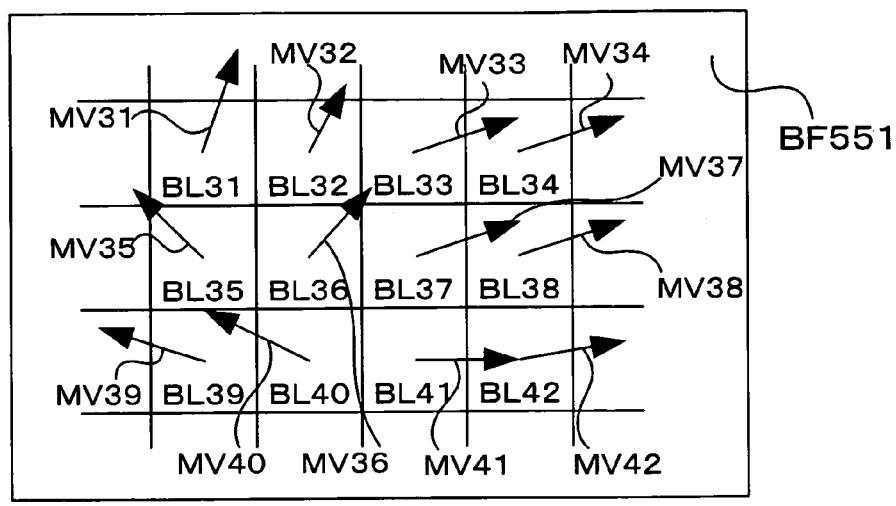
FIGS. 14A and 14B show a modification of the first embodiment that includes a correction process in which a motion vector of a partial image block is not used.

FIG. 14A shows detected motion vectors MV31-MV42 for image blocks BL31-BL42 of a base frame BF551. Here, when correcting motion vectors of image blocks that form the base frame BF551, the image blocks are thinned out in a checkerboard pattern for the base frame BF551 in advance, and the -motion vectors of the remaining image blocks are used for correcting image blocks so that motion vectors of all image blocks are corrected.

Figure 14B:
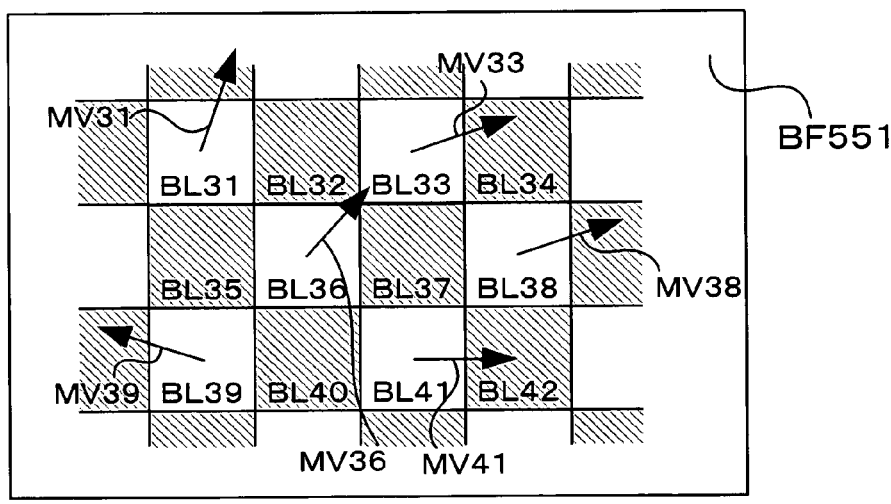

FIG. 14B shows the state in which the image blocks are thinned out in a checkerboard pattern for the base frame BF551. Here, a situation will be described in which motion vectors MV31, MV33, MV35, MV37, MV39 and MV41 of the remaining image blocks BL31, BL33, BL35, BL37, BL39 and BL41 are used for image blocks so that corrected motion vectors are derived for the image block BL36 and the image block BL37.

For a first example, corrected motion vectors for the image block BL36 can be derived by performing the correction process using the above-mentioned linear smoothing filter, adaptive smoothing filter or other nonlinear filters for the motion vectors MV31, MV33, MV36, MV39 and MV41 of surrounding image blocks except for the thinned-out image blocks.

For a second example, corrected motion vectors for the thinned-out image block BL37 are derived performing the correction process using the above-mentioned linear smoothing filter, adaptive smoothing filter or other nonlinear filters for the motion vectors MV33, MV36, MV38 and MV41 of surrounding image blocks. In addition, any one of the motion vectors MV33, MV36, MV38 and MV41 of the surrounding image blocks may be duplicated to be the corrected motion vector. Here, one of image blocks BL33, BL36, BL38 and BL41 that has a minimum sum of absolute differences (SAD) is selected as the image block to be the original of duplication, for example.

Thus, correlation of motion vectors in the image frame can be enhanced. In addition, since the image blocks are thinned out for performing the correction process, the effect of decreasing the volume of calculation can be enhanced. In addition, it is also possible to enhance the effect as a low-pass filter in the correction process.

(4-14)

In Sections (4-12) and (4-13) above, if the motion vector is expressed as a two-dimensional vector, the correction process is performed for each of the two vector components so that the corrected motion vector is derived. In addition, in the above Sections (4-12) and (4-13), a set of 3×3 image blocks is used for performing the correction process of the motion vector of the image block that is located at the center thereof. However, the set of image blocks to be used for the correction process is not limited to 3×3.

(4-15)

The correction process that was described in Sections (4-12) and (4-13) above can be one that is performed only for an image block that is determined to have a motion vector having a low correlation with a motion vector of neighboring image blocks, or an image block in which the detected motion vector is determined to fail in representing correctly real motion of the image block.

In addition, the correction process that was described as a modification of the first embodiment can be applied not only to the first embodiment and modifications thereof but also widely to the generation of an interpolation frame using motion vectors.

(4-16)

In Sections (4-12) and (4-13) above, if motion vectors are detected for different reference frames as the motion vectors of adjacent image blocks, it is possible that the weight coefficients of the smoothing filters vary in accordance with the temporal distance between the base frame and each of the reference frames. In addition, it may also be possible to perform the correction process for the interpolation motion vector obtained by internal division or external division of each of the motion vectors.

Second Embodiment

A second embodiment of the present invention will be described with reference to FIGS. 15-20.

(1) Interpolation Frame Generation Device 201

Figure 15:
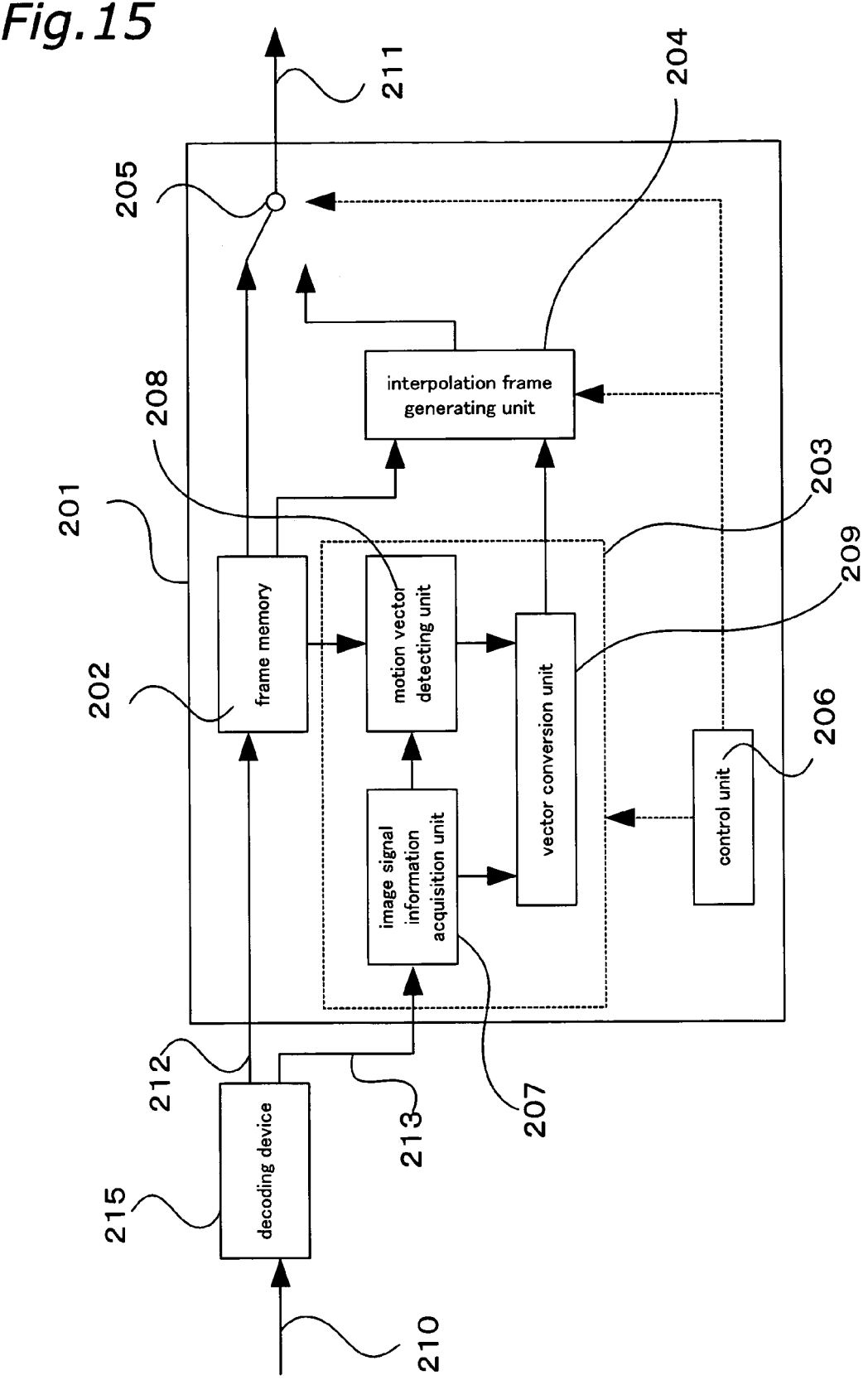
FIG. 15 is a block diagram showing the configuration of an interpolation frame generation device 201 according to a second embodiment of the present invention.

FIG. 15 shows an interpolation frame generation device 201 according to the second embodiment of the present invention. The interpolation frame generation device 201 is provided in a television set, a personal computer (PC), a cellular phone or other devices that display image signals. The interpolation frame generation device 201 is a device that generates an interpolation frame for interpolating the image frames from the image frames that form a decoded image signal 212 that is obtained by decoding a coded image signal 210 that is coded by motion compensation using a decoding device 215.

Here, the motion compensation coding is aimed at reducing the temporal redundancy between image frames that form the image signal and compressing the information volume, and is performed by using motion compensation vectors of the image blocks that form the image frame. For example, MPEG (Moving Picture Experts Group) is an international standard for compressing moving image signals, and uses two coding methods including intra-picture coding and inter-picture prediction coding. The intra-picture coding is a method in which an image frame is coded only by information within the frame, and an image frame that is coded by this method is called an Intra Coded Picture. The inter-picture prediction coding is a method in which an image frame is coded by using both information within the frame and information of another frame, and an image frame that is coded by this method is called a Predictive Coded Picture or a Bi-Predictive Coded Picture. In addition, motion compensation inter-picture coding in which the motion compensation coding is applied to the inter-picture prediction coding is used in the Predictive Coded Picture or the Bi-Predictive Coded Picture. In this embodiment, a situation will be described in which an interpolation frame is generated for interpolating the image frames that are obtained by decoding the image signal that is encoded by MPEG.

The interpolation frame generation device 201 includes a frame memory 202, a motion vector deriving unit 203, an interpolation frame generating unit 204, a signal switching unit 205 and a control unit 206. The frame memory 202 stores the decoded image signal 212 for each of the image frames. The motion vector deriving unit 203 includes an image signal information acquisition unit 207, a motion vector detecting unit 208, and a vector conversion unit 209. The image signal information acquisition unit 207 acquires image signal information 213 from the decoding device 215. Here, the image signal information 213 means information on each image block such as a motion compensation vector, a coding mode, quantization information or a quantized DCT coefficient, for example, which is acquired from a coded image signal 210, and includes information for an image block whose data are not transmitted as a skipped image block. Here, the coding mode means information indicating a coding method for each image block. The motion vector detecting unit 208 detects a motion vector in accordance with an image frame stored in the frame memory 202. The vector conversion unit 209 acquires information from the image signal information acquisition unit 207 and the motion vector detecting unit 208 and delivers interpolation motion vectors for generating an interpolation frame. An operation of the motion vector deriving unit 203 will be described later in detail. The interpolation frame generating unit 204 generates an interpolation frame in accordance with image frames stored in the frame memory 202 and interpolation motion vectors that are derived by the motion vector deriving unit 203. An operation of the interpolation frame generating unit 204 will be described later in detail. The signal switching unit 205 switches between an image frame stored in the frame memory 202 and an interpolation frame generated by the interpolation frame generating unit 204 so as to make an output image signal 211. The control unit 206 supplies control signals that are necessary for operating the motion vector deriving unit 203, the interpolation frame generating unit 204 and the signal switching unit 205.

Figure 16A:
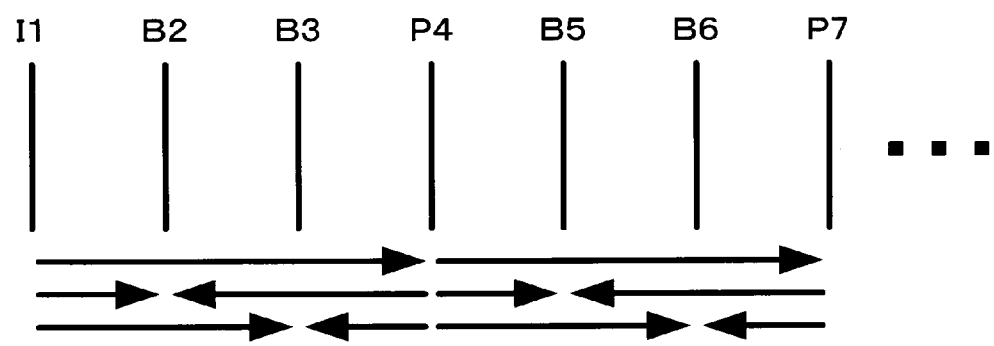
FIGS. 16A and 16B describe the operation of a motion vector deriving unit and an interpolation frame generating unit.
Figure 16B:
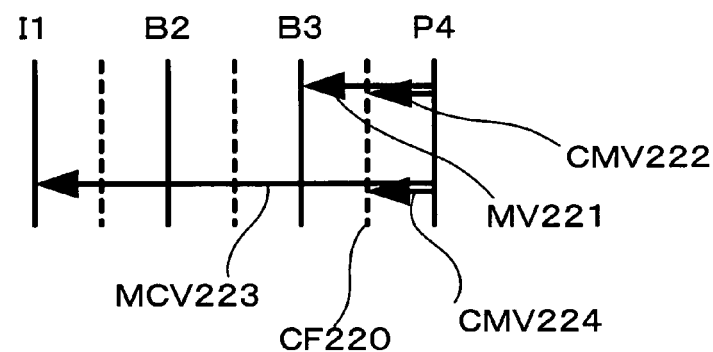

Here, with reference to FIG. 16, operating the motion vector deriving unit 203 and the interpolation frame generating unit 204 will be described in greater detail. FIG. 16A shows image frames that form the decoded image signal 212. A situation will be described in which the interpolation frame is generated so as to double a frame frequency of the decoded image signal 212. Alphabet portions of references (I, B, B, P, . . . of I1, B2, B3, P4, . . . ) of the image frame as shown in FIG. 16A denote picture types when coding the image frames, respectively. In addition, the image frame for which the motion compensation was performed when coding each image frame is indicated with relationship by arrows. More specifically, it indicates that the image frame that is positioned at the proximal end of the arrow (hereinafter referred to as a coded reference frame) is referred for the motion compensation coding when coding the image frame that is positioned at the distal end of the arrow. Hereinafter, a situation will be described in which an interpolation frame CF220 is generated between the image frame B3 and the image frame P4.

The image signal information acquisition unit 207 acquires the image signal information 213 and selects partial image blocks (hereinafter called specific image blocks) from amongst all image blocks that form an image frame to be a base for generating the interpolation frame CF220 (hereinafter called a base frame). Here, the specific image blocks include an image block that was decided to have a motion compensation vector of zero in accordance with the image signal information 213, an image block that was decided to have a motion compensation vector having a low correlation with a motion compensation vector of adjacent image blocks, an image block that was decided not to have a motion compensation vector in accordance with a coding mode, or an image block that was decided to have been intra coded, for example. In addition, it also includes an image block that has a sum of DCT coefficients of image blocks obtained from the quantization information and the quantized DCT coefficient exceeds a threshold level. Here, the motion compensation vector having a low correlation with a motion compensation vector of a neighboring image block includes a motion compensation vector in which all the distances between itself and motion compensation vectors of neighboring image blocks exceed a predetermined value, for example. In addition, this specific image blocks include an image block to which data are not transmitted as a skipped image block. These decisions may be used each or with combined for selecting specific image blocks. Here, the base frame can be either an image frame that is located before or after the interpolation frame CF220 in the display order. In addition, the base frame can be a single frame or a plurality of frames.

The motion vector detecting unit 208 detects motion vectors for specific image blocks that were selected by the image signal information acquisition unit 207. For example, if the base frame is the image frame P4, matching process of specific image blocks of the image frame P4 with a pixel area that forms the image frame B3 is performed so as to detect the motion vector MV221. In addition, the vector conversion unit 209 performs internal division of the motion vector MV221 by the ratio of the temporal distance between the interpolation frame CF220 and the image frame P4 to the temporal distance between the image frame B3 and the image frame P4 so as to derive the interpolation motion vector CMV222. More specifically, a size of the detected motion vector MV221 is transformed into half without changing a direction thereof, so as to derive the interpolation motion vector CMV222.

On the other hand, with regard to image blocks except for the specific image blocks (hereinafter called general image blocks), the motion compensation vectors of the general image blocks are acquired in accordance with the image signal information 213 that was acquired by the image signal information acquisition unit 207. For example, if the base frame is the image frame P4, with regard to the general image block of the image frame P4, an interpolation motion vector CMV224 is derived from an acquired motion compensation vector MCV223. The interpolation motion vector CMV224 is derived by internal division of the motion compensation vector MCV223 by the ratio of the temporal distance between the interpolation frame CF220 and the image frame P4 to the temporal distance between the image frame I1 that is a coded reference frame of the image frame P4 and the image frame P4.

The interpolation frame generating unit 204 generates the interpolation frame CF220 in accordance with the interpolation motion vectors CMV222 and CMV224 that were derived for the image blocks that form the image frame and the base frame stored in the frame memory 202. The process of generating the interpolation frame CF220 is described above in the first embodiment, so a description thereof will be omitted here.

Figure 17:
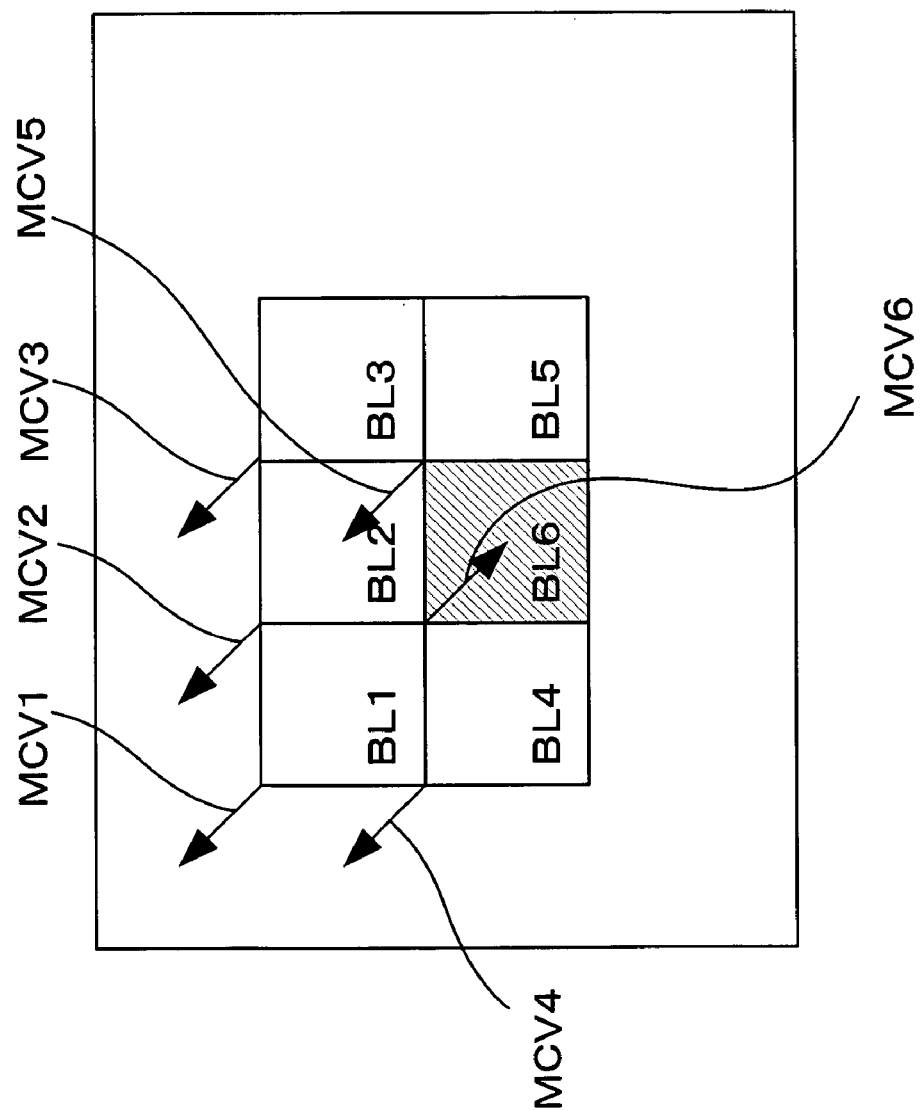
FIG. 17 is an example of the selection of a specific image block by an image signal information acquisition unit 207.

Here, with reference to FIG. 17, a specific example for selecting a specific image block by the image signal information acquisition unit 207 will be described. A situation will be described in which the image block is decided to have a motion compensation vector having a low correlation with motion compensation vectors of adjacent image blocks. FIG. 17 shows motion compensation vectors MCV1-MCV6 that are obtained from the image signal information 213 for image blocks BL1-BL6 that form the base frame. Here, the motion compensation vector MCV6 of the image block BL6 has a low correlation with motion compensation vectors MCV1-MCV5 of adjacent image blocks BL1-BL5. In this situation, the image block BL6 is determined to be a specific image block by the image signal information acquisition unit 207.

(2) Interpolation Frame Generation Method

Figure 18:
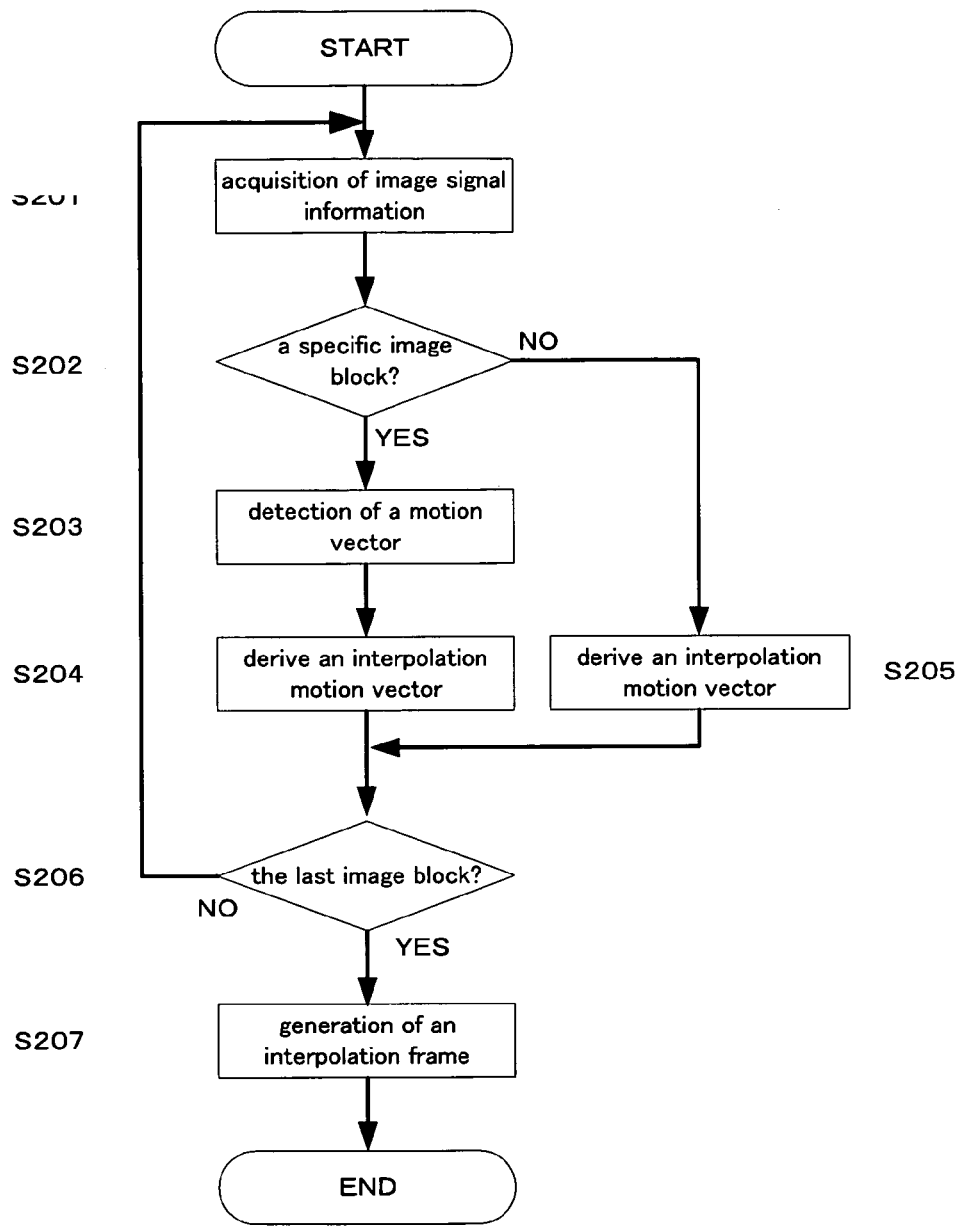
FIG. 18 is a flowchart showing an interpolation frame generation method according to the second embodiment of the present invention.

FIG. 18 shows a flowchart that describes an interpolation frame generation method in the interpolation frame generation device 201. A detailed description of each step is the same as the description in the section titled "(1) Interpolation Frame Generation Device 201", and thus a description thereof will be omitted.

The image signal information acquisition unit 207 acquires image signal information 213 of the base frame (Step S201). The image signal information acquisition unit 207 decides whether or not the image block that forms the base frame is a specific image block (Step S202). The motion vector detecting unit 208 detects a motion vector for the specific image block (Step S203). The vector conversion unit 209 derives an interpolation motion vector in accordance with the detected motion vector (Step S204). The vector conversion unit 209 derives an interpolation motion vector in accordance with the acquired motion compensation vector for the general image block (Step S205). After the interpolation motion vectors are derived for all image blocks (Step S206), the interpolation frame generating unit 204 generates the interpolation frame in accordance with the image frames stored in the frame memory 202 and the derived interpolation motion vectors (Step S207).

(3) Effect of the Second Embodiment

In the second embodiment of the present invention, the specific image blocks for detecting motion vectors are selected in accordance with the image signal information 213. For this reason, the volume of calculation for detecting a motion vector can be decreased.

Here, the specific image blocks include an image block having a motion compensation vector of zero, an image block that was decided not to have a motion compensation vector by the coding mode, an image block that was decided to have a motion compensation vector having a low correlation with a motion compensation vector of neighboring image blocks, or an image block that was decided to have been intra coded. In addition, it also includes an image block that has a sum of DCT coefficients of image blocks obtained from the quantization information and the quantized DCT coefficient exceeds a threshold level. The motion compensation vector does not always represent true motion of the image block. Therefore, a motion vector is detected for an image block whose motion compensation vector indicates an unusual value, so that the accuracy with which an interpolation frame is generated can be improved. In addition, it also becomes possible to detect a motion vector within an image frame that is different from the coded reference frame. As a result, an appropriate motion vector can be detected for generating an interpolation frame.

(4) Modifications of the Second Embodiment

The present invention is not limited to the embodiment described above but can be modified in a variety of ways within the scope thereof.

(4-1)

Though the interpolation frame generation device 201 is described to have the control unit 206 as shown in FIG. 15, the control unit 206 may be the one that controls other devices such as the decoding device 215 in parallel outside the interpolation frame generation device 201.

(4-2)

A situation in which the interpolation frame is generated so that the frame frequency of the decoded image signal 212 is doubled was described with reference to FIG. 16. However, the effect of the present invention is similar to a situation in which the interpolation frame is generated so that the frame frequency is changed by another magnification. In addition, the effect of the present invention does not depend on the image frame as shown in FIG. 16A, and the image frame can be the one that is coded by another coding method and does not include a Bi-Predictive Coded Picture.

(4-3)

Figure 19:
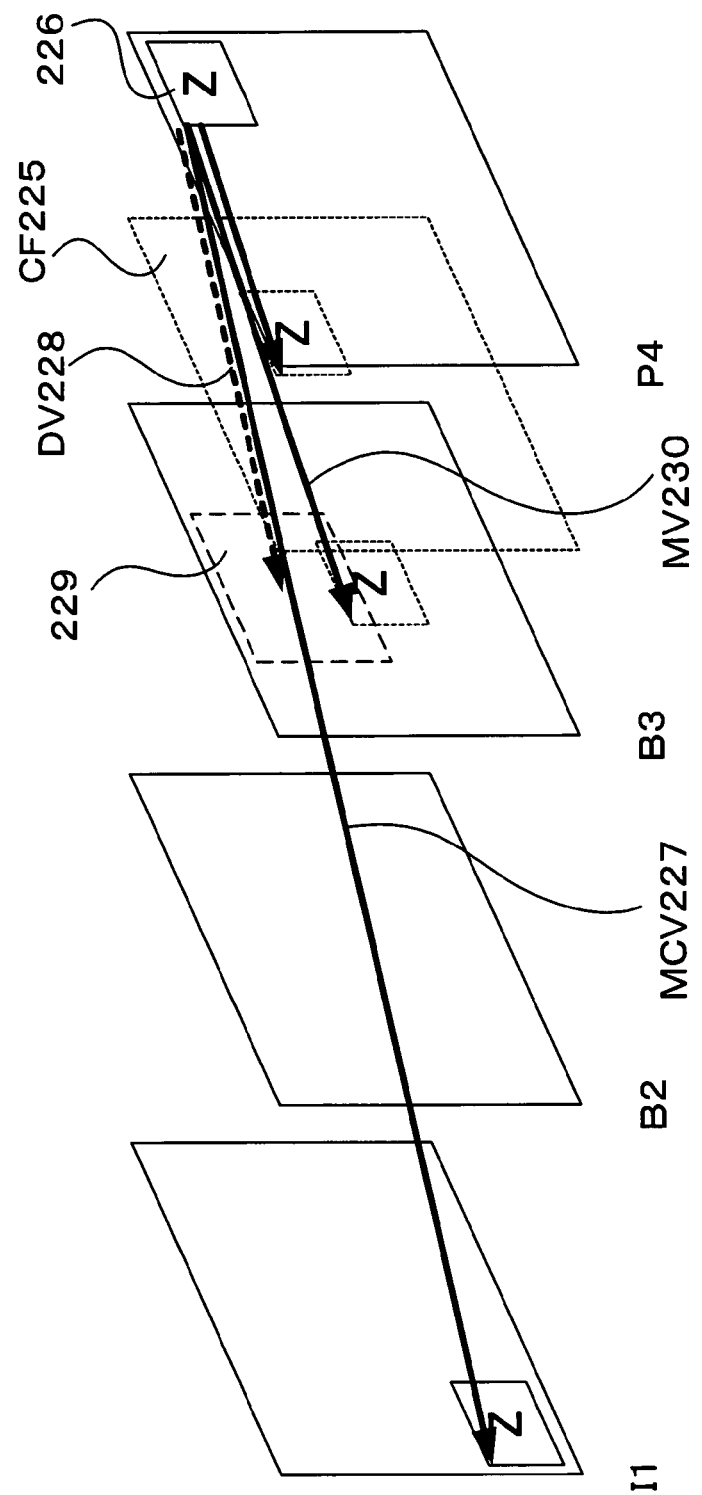
FIG. 19 shows a modification of the second embodiment with regard to the decision in a detection range of a motion vector.

The motion vector detecting unit 208 detects motion vectors for specific image blocks of the base frame. In this situation, it is possible to determine a detection range of the motion vectors for the specific image blocks in accordance with the acquired motion compensation vectors. This situation will be described with reference to FIG. 19. FIG. 19 shows an image frame that forms the decoded image signal 212. A situation will be described in which an interpolation frame CF225 is generated between the image frame B3 and the image frame P4 using the image frame P4 as the base frame. It is assumed that a specific image block 226 of the image frame P4 is motion-compensation coded by the motion compensation vector MCV227 using the image frame I1 as the coded reference frame. The motion vector detecting unit 208 uses the image frame B3 as an object image frame for detecting a motion vector (hereinafter called a reference frame) for the specific image block 226. More specifically, the motion vector detecting unit 208 performs matching for the specific image block 226 with a pixel area that forms the image frame B3 so as to detect a motion vector. When this occurs, internal division of the motion compensation vector MCV227 is made so as to derive an internal division motion compensation vector DV228 for the image frame B3 of the specific image block 226, and a motion vector MV230 is detected from a vicinity 229 of the derived internal division motion compensation vector DV228. Thus, it is considered that the volume of calculation for detecting a motion vector can be decreased.

In addition, the method of determining a detection range for motion vectors can be used not only for movement detection of specific image blocks but also for detecting motion vectors of an image frame in general. In addition, the image frame that is used as a reference frame may be an image frame that is the same as the coded reference frame. More specifically, a motion vector can be detected at a vicinity of the motion compensation vector MCV227 in FIG. 19.

(4-4)

In addition, it is possible to use motion compensation vectors that were obtained for all image blocks that form the base frame as the interpolation motion vector. More specifically, the interpolation motion vector is derived from the obtained motion compensation vectors for all image blocks that form the base frame. More specifically, internal division of the motion compensation vector is made by the ratio of the temporal distance between the interpolation frame and the base frame to the temporal distance between the coded reference frame and the base frame when the base frame was coded, so that the interpolation motion vector is derived. In addition, the interpolation frame is generated in accordance with image frames stored in the frame memory 202 and interpolation motion vectors that are derived for the image blocks that form the base frame.

Here, the motion vector deriving unit 203 may use a smoothing filter for the obtained motion compensation vector so as to derive a corrected motion compensation vector after the correction process, and may derive the interpolation motion vector from this corrected motion compensation vector.

A detailed description thereof is the same as that found in Section (4-12) of the first embodiment with reference to FIG. 13. Though FIG. 13 shows a correction process for the detected motion vector, it can be applied to a motion compensation vector as well.

The motion compensation vector does not necessarily represent true motion of an image block. On the other hand, correlation of movements between adjacent image blocks is high in general. Therefore, a high quality image of an interpolation frame can be effectuated by correcting the motion compensation vector by the vector space so as to enhance the correlation.

Furthermore, if the motion compensation vector is expressed as a two-dimensional vector, the correction process is performed for each of two vector components, so that the corrected motion compensation vector is derived. In addition, a motion compensation vector of the center image block is corrected by a set of 3×3 image blocks in the above explanation. However, the set of image blocks that is used for the correction process is not limited to 3×3.

In addition, it is possible to thin out the image blocks that are located at a certain position in the base frame before the correction process by the smoothing filter, and to use motion compensation vectors of the remaining image blocks, so as to derive the corrected motion compensation vectors.

A detailed description thereof is the same as that found in Section (4-13) of the first embodiment with reference to FIG. 14. Though FIG. 14 shows a correction process for the detected motion vector, it can be applied to a motion compensation vector as well.

Here, the thinned-out image blocks include image blocks that are located at a certain position in the base frame and image blocks that are located in a checkerboard pattern, for example. This can be considered as a sort of adaptive smoothing filter. However, if a nonlinear filter such as a median filter as the smoothing filter is used, the effect of decreasing the volume of calculation can be enhanced. In addition, the effect as a low-pass filter can be also enhanced.

In addition, the process of using these smoothing filters is applied not only to this modification but also to the above second embodiment in the same way.

(4-5)

The interpolation frame generation device 201 may be one that is capable of setting a method for generating an interpolation frame in accordance with a margin of the process for generating the interpolation frame. For example, the control unit 206 decides a margin of the process for generating the interpolation frame in accordance with an image size, a frame frequency or others of the decoded image signal 212. The relationship between the image size or the frame frequency of the decoded image signal 212 and the margin of the process is similar to the relationship between the image size or the frame frequency of the input image signal 110 and the margin of the process shown in FIG. 12, so a description thereof will be omitted. In accordance with the result of deciding the margin, the control unit 206 controls the interpolation frame generating unit so as to change the number of interpolation frames to be generated. In addition, the control unit 206 changes the number of image frames to be used for generating an interpolation frame, a detection range of the motion vector, or the number of image blocks for which a motion vector is detected. In addition, it is possible to change them in a manual manner.

(4-6)

In the above embodiment, the frame can be a frame in the progressive scanning image or a frame or field in the interlaced scanning image.

(4-7)

The function of each block shown in the block diagram of FIG. 15 is not limited to the function described above. For example, it is possible that the interpolation frame generating unit 204 includes a function of the vector conversion unit 209.

(5) Decoding Device 215

Figure 20:
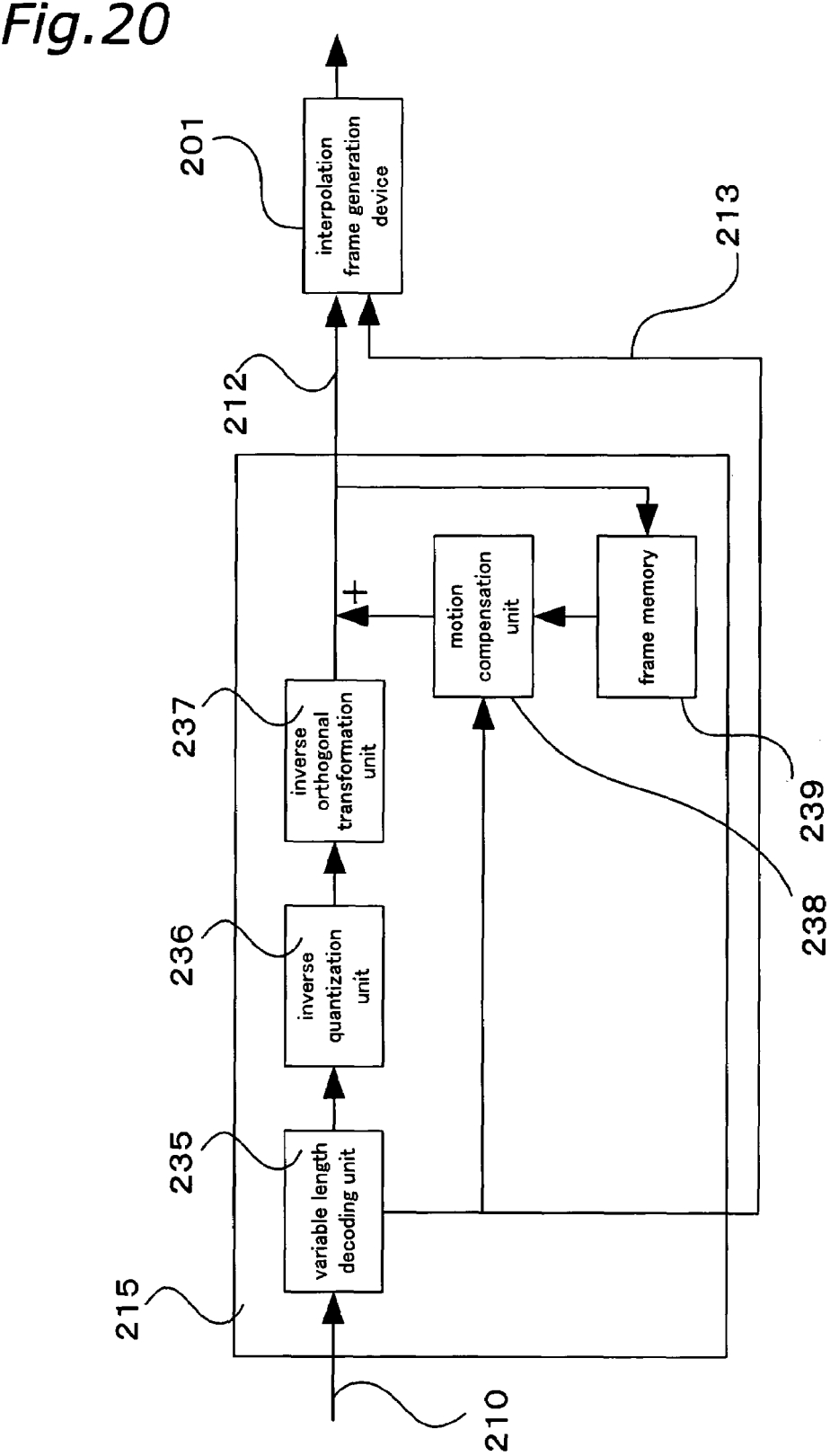
FIG. 20 is a block diagram showing the configuration of a decoding device.

With reference to FIG. 20, the decoding device 215 will be described. The decoding device 215 is a device for decoding a coded image signal 210 that is coded by motion compensation so as to deliver the decoded image signal 212 and the image signal information 213, and the device is built in or connected to a television set, a personal computer (PC), a cellular phone or other devices having the interpolation frame generation device 201 for displaying an image signal. A situation will be described in which the decoding device 215 decodes the coded image signal 210 that is coded by MPEG. A variable length decoding unit 235 decodes image signal information 213 for each image block, so that a coding mode, a motion compensation vector, quantization information and a quantized DCT coefficient are separated from each other. The quantized DCT coefficient is reproduced to a DCT coefficient by a inverse quantization unit 236 and is converted into pixel data by a inverse orthogonal transformation unit 237. The I-picture that is intra coded is delivered as the decoded image signal 212 without being changed. The P-picture and the B-picture that are inter-picture prediction coded are delivered after pixel data are added that are motion compensated by the motion compensation unit 238. In addition, the I-picture and the P-picture are stored in the frame memory 239 since they have to be used for decoding process afterward.

Third Embodiment

Section (4-4) of the second embodiment states that it is possible to use motion compensation vectors that were obtained for all image blocks that form the base frame as the interpolation motion vectors. Here, it is possible to derive the interpolation motion vectors by using corrected motion compensation vectors that are obtained by correcting motion compensation vectors of the selected specific image blocks by motion compensation vectors except for the specific image blocks (hereinafter called general image blocks).

A third embodiment of the present invention will be described with reference to FIGS. 21-24.

(1) Interpolation Frame Generation Device 601

Figure 21:
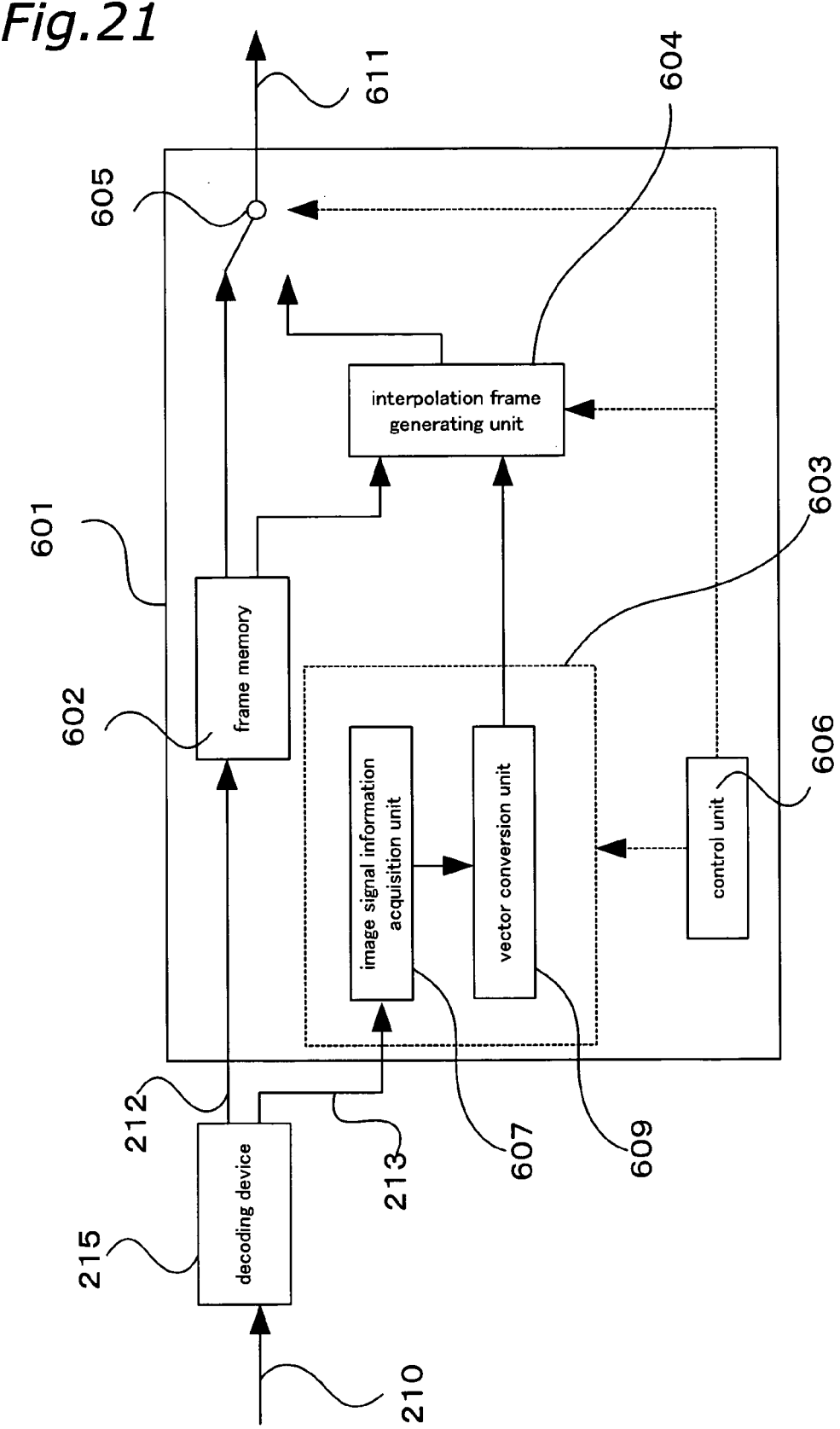
FIG. 21 is a block diagram showing the configuration of an interpolation frame generation device according to a third embodiment of the present invention.

FIG. 21 shows an interpolation frame generation device 601 for effectuating this function. The interpolation frame generation device 601 is provided in a television set, a personal computer (PC), a cellular phone or other devices that display an image signal. The interpolation frame generation device 601 is a device for generating an interpolation frame for interpolating image frames from image frames that form the decoded image signal 212 that is obtained by decoding the coded image signal 210 that is coded by motion compensation by the decoding device 215.

A difference between the interpolation frame generation device 601 and the interpolation frame generation device 201 that was shown in FIG. 15 is that the former does not have a function corresponding to the motion vector detecting unit 208. In addition, since operation of each unit that forms the device is substantially the same as the operation of each unit that was described in the second embodiment with reference to FIG. 15, the differences will be described below. In addition, the units of this embodiment that are the same as those described above in the second embodiment will be referred to with the same reference numerals, and a detailed description thereof will be omitted.

The interpolation frame generation device 601 includes a frame memory 602, a vector deriving unit 603, an interpolation frame generating unit 604, a signal switching unit 605, and a control unit 606.

The frame memory 602 stores the decoded image signal 212 for each image frame.

The vector deriving unit 603 has an image signal information acquisition unit 607 and a vector conversion unit 609. The image signal information acquisition unit 607 acquires the image signal information 213 from the decoding device 215. The vector conversion unit 609 acquires information from the image signal information acquisition unit 607. The vector conversion unit 609 selects specific image blocks in accordance with the acquired information and corrects the motion compensation vectors of the specific image blocks. In addition, the vector conversion unit 609 delivers the corrected motion compensation vectors and the motion compensation vectors of the general image blocks.

Here, the specific image blocks include an image block that was decided to have a motion compensation vector of zero in accordance with the image signal information 213, an image block that was decided not to have a motion compensation vector by a coding mode, an image block that was decided to have a motion compensation vector having a low correlation with a motion compensation vector of adjacent image blocks, or an image block that was decided to have been intra coded. In addition, it also includes an image block that has a sum of DCT coefficients of image blocks obtained from the quantization information and the quantized DCT coefficient exceeds a threshold level. Here, the motion compensation vector having a low correlation with motion compensation vectors of adjacent image blocks includes a motion compensation vector in which all the distances between itself and motion compensation vectors of adjacent image blocks exceed a predetermined value, for example. In addition, this specific image blocks include an image block to which data are not transmitted as a skipped image block. The correction process of the motion compensation vectors by the vector conversion unit 609 will be described below.

The interpolation frame generating unit 604 derives interpolation motion vectors for each of the image blocks from motion compensation vectors of a general image block and corrected motion compensation vectors of specific image blocks, and then generates an interpolation frame. More specifically, an interpolation motion vector is derived in the same way as described in the second embodiment except that the interpolation motion vectors are derived by using the corrected motion compensation vectors for the specific image blocks.

The signal switching unit 605 switches between an image frame stored in the frame memory 602 and an interpolation frame generated by the interpolation frame generating unit 604 so as to make an output image signal 611. The control unit 606 delivers control signals that are necessary for operating the vector deriving unit 603, the interpolation frame generating unit 604 and the signal switching unit 605.

(1-1) Operation of the Vector Conversion Unit 609

The operation of the vector conversion unit 609 will be described in greater detail. The vector conversion unit 609 selects the specific image blocks and performs a correction process on the motion compensation vectors that are obtained for the specific image blocks so as to obtain corrected motion compensation vectors.

Figure 22A:
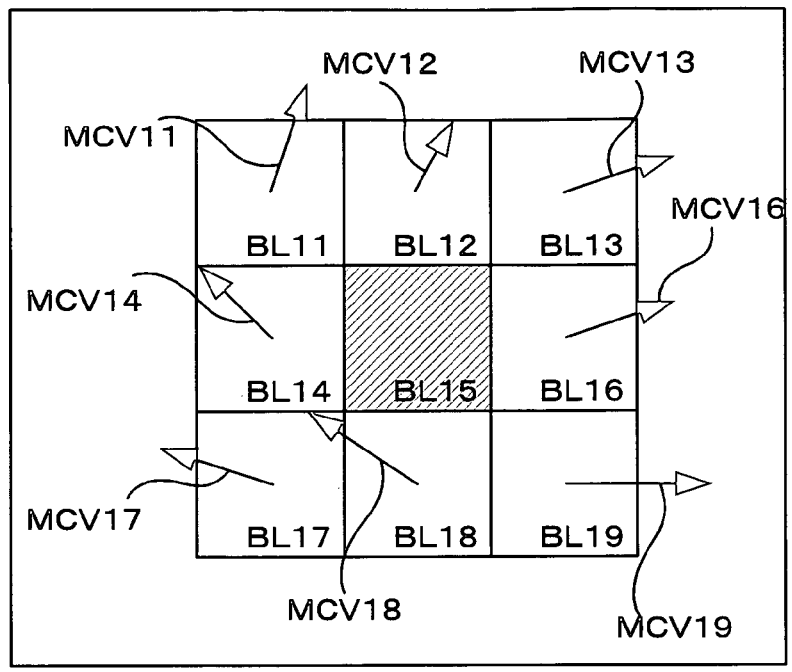
FIGS. 22A and 22B describe the derivation of a motion compensation vector.
Figure 22B:
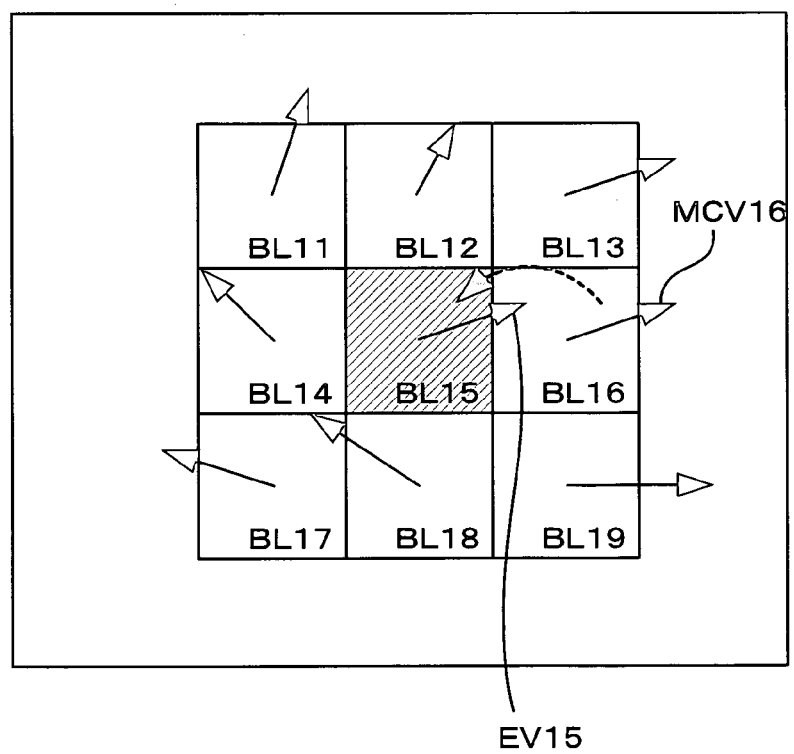

Here, with reference to FIG. 22, a specific example of deriving the corrected motion compensation vector will be described. FIG. 22A shows motion compensation vectors MCV11-MCV14 and MCV16-MCV19 that were acquired from the image signal information 213 for the image blocks BL11-BL19. Here, the image block BL15 does not have a motion compensation vector. More specifically, the image block BL15 is an intra coded image block or a skipped image block to which data was not transmitted.

Concerning this image block BL15, surrounding image blocks BL11-BL14 and BL16-BL19 are used for deriving a corrected motion compensation vector. For example, a motion compensation vector MCV16 of an image block BL16 that is a surrounding image block of the image block BL15 is duplicated to be a corrected motion compensation vector EV15 (see FIG. 22B). Here, as the image block to be an original of the duplication, an image block is selected that is decided to have a smallest sum of DCT coefficients among the surrounding image blocks BL11-BL14 and BL16-BL19, for example.

If it is decided that the image block BL15 is a specific image block though it has a motion compensation vector, a motion compensation vector of the image block BL15 is replaced with a motion compensation vector of a surrounding image block to be a corrected motion compensation vector.

(2) Method for Generating an Interpolation Frame

FIG. 23 shows a flowchart that describes a method for generating an interpolation frame by the interpolation frame generation device 601. A detailed description of each step is similar to the description in "(1) Interpolation Frame Generation Device 601", so a detailed description thereof will be omitted.

The image signal information acquisition unit 607 acquires the image signal information 213 (Step S601). The vector conversion unit 609 decides whether or not an image block is a specific image block (Step S602). The vector conversion unit 609 corrects a motion compensation vector of a specific image block so as to derive a corrected motion compensation vector (Step S603). After deciding whether or not an image block is a specific image block for all image blocks (Step S604), the interpolation frame generating unit 604 derives interpolation motion vectors of the image blocks from motion compensation vectors of general image blocks and corrected motion compensation vectors of specific image blocks (Step S605). In addition, the interpolation frame generating unit 604 generates an interpolation frame in accordance with image frames stored in the frame memory 602 and derived interpolation motion vectors (Step S606).

(3) Effect of the Third Embodiment

In the third embodiment of the present invention, the specific image blocks are selected in accordance with the image signal information 213. The motion compensation vector of the specific image block is an image block having a motion compensation vector which has been determined to incorrectly represent true motion. The corrected motion compensation vector that is obtained by correcting this motion compensation vector of the specific image block is used for generating the interpolation frame. Here, the corrected motion compensation vector is obtained by duplicating a motion compensation vector of a surrounding image block. In general, a movement of an image block has a large correlation in a spatial manner with movement of surrounding image blocks. Therefore, the interpolation frame generation device 601 can improve image quality of an interpolation frame by generating the interpolation frame using a corrected motion compensation vectors that has a large correlation in a spatial manner with surrounding image blocks.

In addition, the interpolation frame generation device 601 derives an interpolation motion vector without performing a process of movement detection for the image block. Therefore, the volume of calculation in the device can be decreased.

(4) Modifications of the Third Embodiment

The present invention is not limited to the embodiment described above but can be modified in a variety of ways within the scope thereof.

(4-1)

The correction process of the motion compensation vector performed by the vector conversion unit 609 can be one for correcting the motion compensation vector of the image block surrounding the specific image block by using a nonlinear filter such as a linear smoothing filter or a median filter.

Figure 24A:
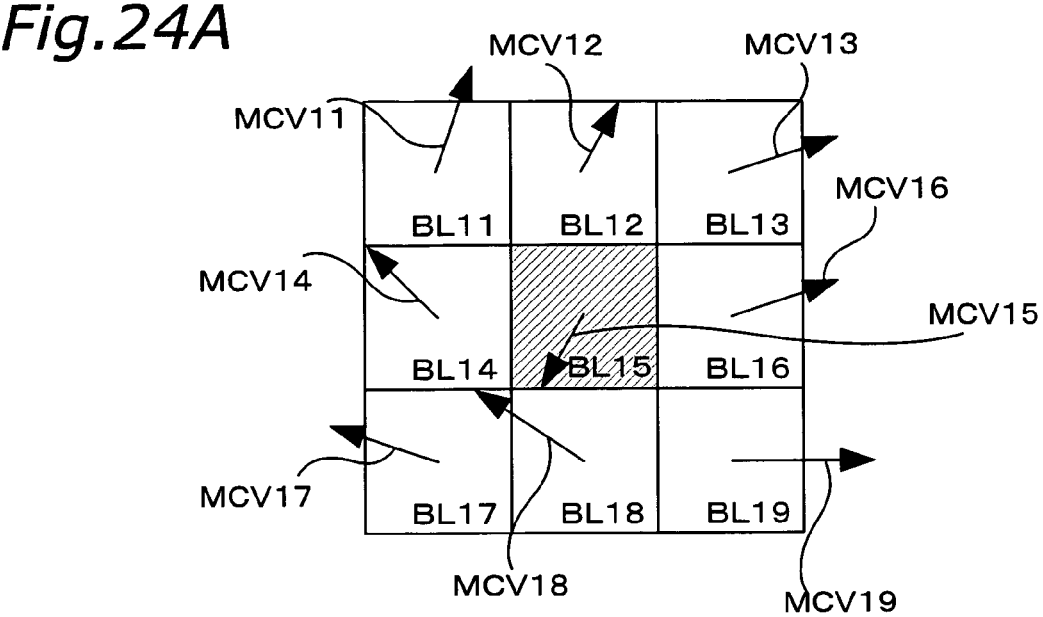
FIGS. 24A-24C describe a modification of the third embodiment that includes a correction process for a motion compensation vector of an image block at a periphery of a specific image block.

With reference to FIG. 24, the details of the correction process will be described. FIG. 24A shows motion compensation vectors MCV11-MCV19 that were obtained from the image signal information 213 for image blocks BL11-BL19. Here, it is assumed that the image block BL15 is decided to be a specific image block. More specifically, the image block BL15 includes an image block that was decided to have a motion compensation vector MCV15 having a low correlation with motion compensation vectors of adjacent image blocks, an image block that has a sum of DCT coefficients exceeds a threshold level.

Figure 24B:
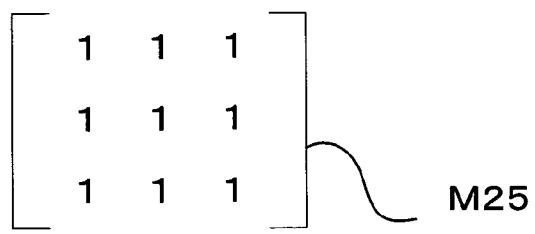
Figure 24C:
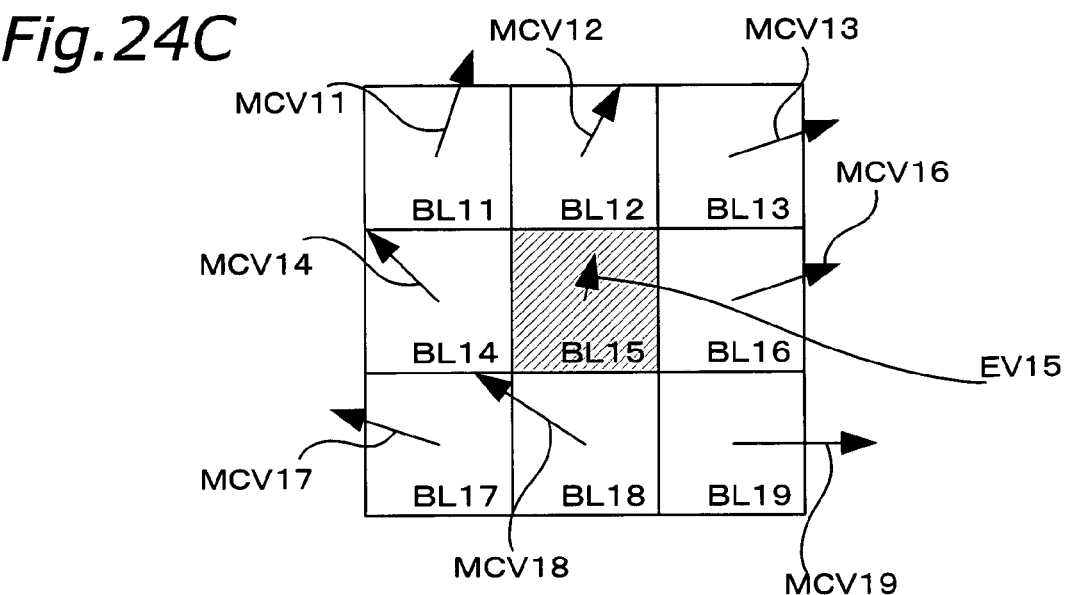

For the motion compensation vectors MCV11-MCV19 of the 3×3 image blocks BL11-BL19, the corrected motion compensation vector EV15 is derived by using a linear smoothing filter having a 3×3 weight coefficient matrix M25 as shown in FIG. 24B (see FIG. 24C). In addition, it is possible to derive the corrected motion compensation vector EV15 by using a nonlinear filter such as a median filter, a minimum value filter or a maximum value filter.

By means of these correction processes, it becomes possible to derive a corrected motion compensation vector for the specific image block that has a high spatial correlation with motion compensation vectors of surrounding image blocks.

Furthermore, the weight coefficient matrix M25 as shown in FIG. 24B can be the one that has another coefficient. In addition, it is possible that the coefficient varies in accordance with a size of the motion compensation vectors MCV11-MCV19 or other factors.

In addition, the weight coefficient of this adaptive smoothing filter can be the one that varies in accordance with a distance between one vector indicating a typical movement of the image blocks that form the image frame and each of the motion compensation vectors MCV11-MCV19 that is used for the correction process. For example, if the distance between the one vector indicating a typical movement and each of the motion compensation vectors MCV11-MCV19 that is used for the correction process is small, a large weight is given to each of the motion vectors.

Thus, a corrected motion compensation vector can be derived in which the space correlation with a motion compensation vector of a surrounding image block and the correlation with a typical movement of the image frame are enhanced for the specific image block.

(4-2)

When duplicating a motion compensation vector of a surrounding image block for the specific image block, it is possible to select a motion compensation vector of an image block to be an original of the duplication as follows.

First, motion compensation vectors of surrounding image blocks of the specific image block are duplicated. Second, in the image frame that was referred when the image frame including the specific image block is coded by motion compensation coding (hereinafter called a coded reference frame), a sum of absolute differences (SAD) between the pixel areas indicated by the motion compensation vectors and the specific image block is calculated. In the surrounding image blocks, the SAD is calculated, and a motion compensation vector in which the SAD becomes a minimum value is selected as a corrected motion compensation vector of the specific image block.

By means of this correction process, the interpolation frame can be generated for the specific image block that has a motion compensation vector to be decided to fail in representing true motion while maintaining correlation of movement with a surrounding image block. Therefore, the image quality of an interpolation frame can be improved.

(4-3)

The correction process of the motion compensation vector by using a smoothing filter as described in Section (4-4) of the second embodiment can be applied to this embodiment and modifications thereof. In addition, it is possible to thin out image blocks that are located at predetermined positions in the image frame before the correction process by the smoothing filter. These processes are performed by the vector conversion unit 609, for example.

The motion compensation vector does not necessarily correspond to a real movement of an image block. On the other hand, correlation of movements between neighboring image blocks is high in general. Therefore, a high quality image of an interpolation frame can be effectuated when the motion compensation vectors are processed by the smoothing process in the vector space so as to enhance the correlation. In addition, a corrected motion compensation vector having high correlation with a neighboring image block can be derived for the specific image block, too.

Fourth Embodiment

A fourth embodiment of the present invention will be described with reference to FIGS. 25-28.

(1) Interpolation Frame Generation Device

Figure 25:
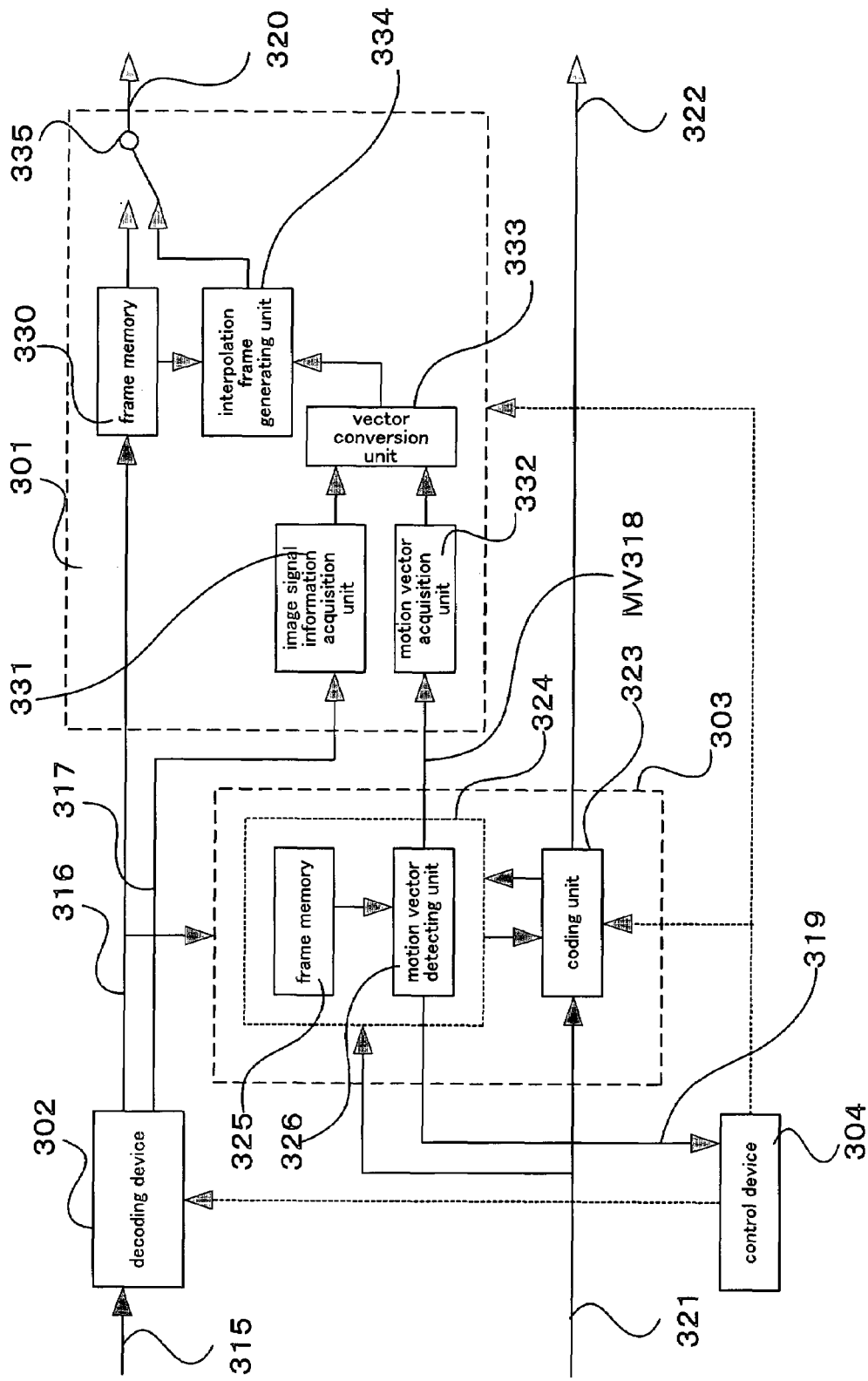
FIG. 25 is a block diagram showing the configuration of an interpolation frame generation device according to a fourth embodiment of the present invention.

FIG. 25 shows an interpolation frame generation device 301 as a fourth embodiment of the present invention. The interpolation frame generation device 301 is a device for generating an interpolation frame for interpolating image frames in accordance with the image frame that form an image signal in a television set, a personal computer (PC), a cellular phone or other devices that display an image signal. The interpolation frame generation device 301 is connected to a decoding device 302, a coding device 303 and a control device 304.

The interpolation frame generation device 301 includes a frame memory 330, an image signal information acquisition unit 331, a motion vector acquisition unit 332, a vector conversion unit 333, an interpolation frame generating unit 334, and a signal switching unit 335. The frame memory 330 stores a decode image signal 316 that was obtained by decoding the coded image signal that is coded by motion compensation signal 315 by the decoding device 302 for each image frame. The image signal information acquisition unit 331 acquires image signal information 317 from the decoding device 302 that will be described later. The motion vector acquisition unit 332 acquires a motion vector MV318 from the coding device 303 that will be described later. The vector conversion unit 333 acquires information from the image signal information acquisition unit 331 or the motion vector acquisition unit 332 and delivers an interpolation motion vector for generating an interpolation frame. The interpolation frame generating unit 334 generates an interpolation frame in accordance with the image frame stored in the frame memory 330 and the interpolation motion vector that was delivered by the vector conversion unit 333. The signal switching unit 335 switches between the image frame stored in the frame memory 330 and the interpolation frame generated by the interpolation frame generating unit 334 so as to make an output image signal 320. More detailed operation of the interpolation frame generation device 301 will be described in the section titled "(2) Interpolation Frame Generation Method".

The decoding device 302 is a device that decodes the coded image signal that is coded by the motion compensation 315 so as to deliver the decoded image signal 316 and the image signal information 317. The decoding device 302 is similar to the decoding device 215 that was described in the second embodiment, so a detailed description thereof will be omitted. In addition, the image signal information 317 is information such as a motion compensation vector or a coding mode for each image block that is obtained from the coded image signal 315, for example. Here, the coding mode is information indicating a coding method for each image block. More specifically, the coding mode indicates information that the image block is intra coded or inter-picture prediction coded.

The coding device 303 encodes an input image signal 321 by motion compensation coding and delivers a coded image signal 322. The coding device 303 includes a coding unit 323 and a motion compensation unit 324. Operating the coding unit 323 will be described below. The motion compensation unit 324 includes a frame memory 325 and a motion vector detecting unit 326. The frame memory 325 stores the input image signal 321 for each image frame. The motion vector detecting unit 326 detects the motion vector MV318 in accordance with the image frame stored in the frame memory 325. In addition, the motion vector detecting unit 326 delivers an operating state as detecting unit operation information 319. The detecting unit operation information 319 includes information about whether or not the motion vector detecting unit 326 is in the operating condition or information about a margin of the process of the motion vector detecting unit 326, which depends on accuracy in detecting a motion vector or a method for coding the input image signal 321, for example.

The control device 304 acquires the detecting unit operation information 319 and supplies control signals that are necessary for operating the interpolation frame generation device 301, the decoding device 302 and the coding device 303.

Figure 26:
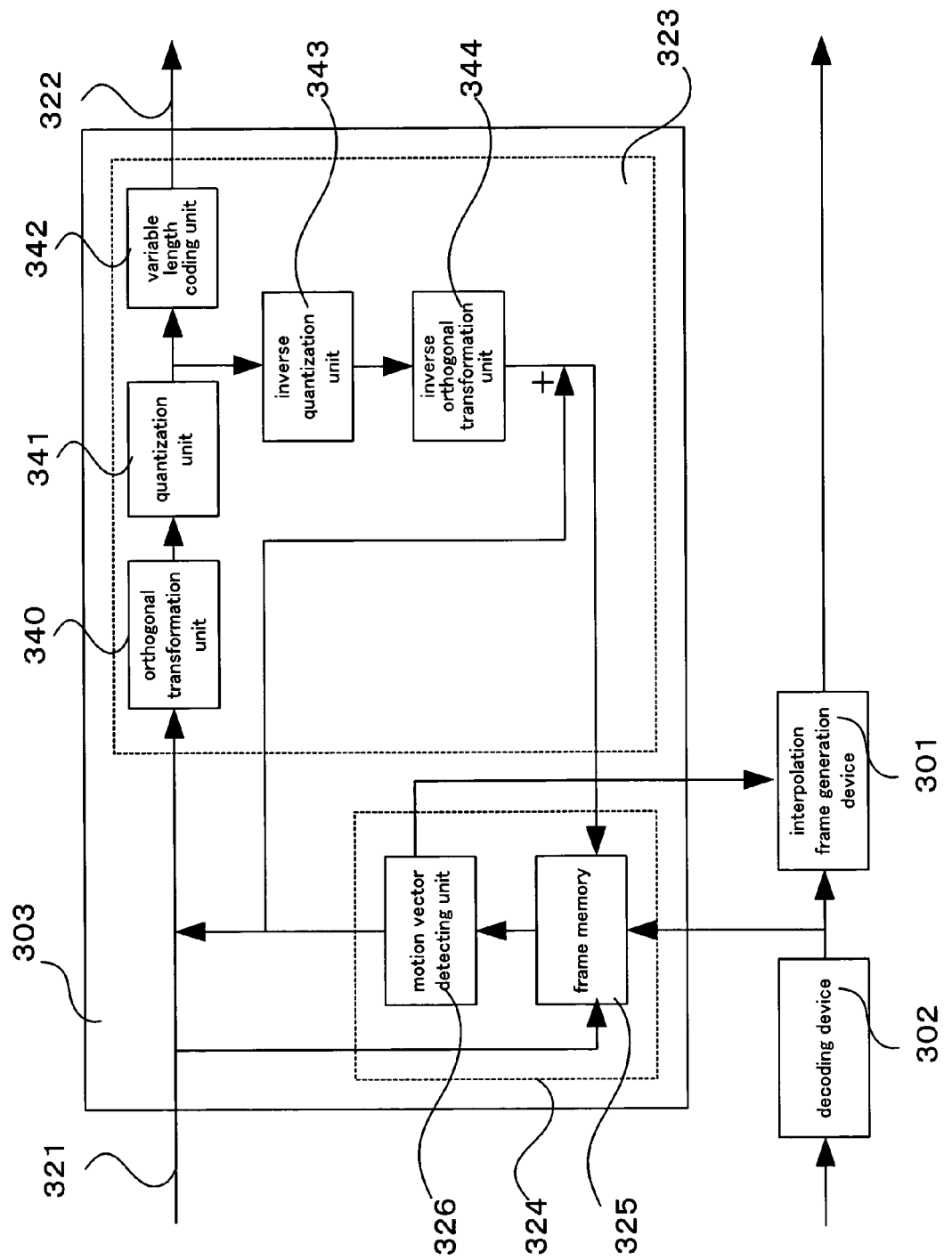
FIG. 26 is a block diagram showing the configuration of a coding device.

Here, the operation of the coding unit 323 will be described with reference to FIG. 26. The coding unit 323 includes an orthogonal transformation unit 340, a quantization unit 341, a variable length coding unit 342, an inverse quantization unit 343 and an inverse orthogonal transformation unit 344. A situation will be described in which the coding unit 323 performs MPEG coding. The input image signal 321 is sorted in order for coding and then converted into DCT coefficients by the orthogonal transformation unit 340. The quantization unit 341 quantizes the DCT coefficients. The quantized DCT coefficients are coded together with the motion compensation vector and the coding mode obtained from the motion compensation unit 324 by the variable length coding unit 342 with variable length coding, so as to be delivered as the coded image signal 322. Information that is used for motion compensation among the quantized DCT coefficients is decoded by the inverse quantization unit 343 and the inverse orthogonal transformation unit 344 and is stored in the frame memory 325 of the motion compensation unit 324.

(2) Interpolation Frame Generation Method

Figure 27:
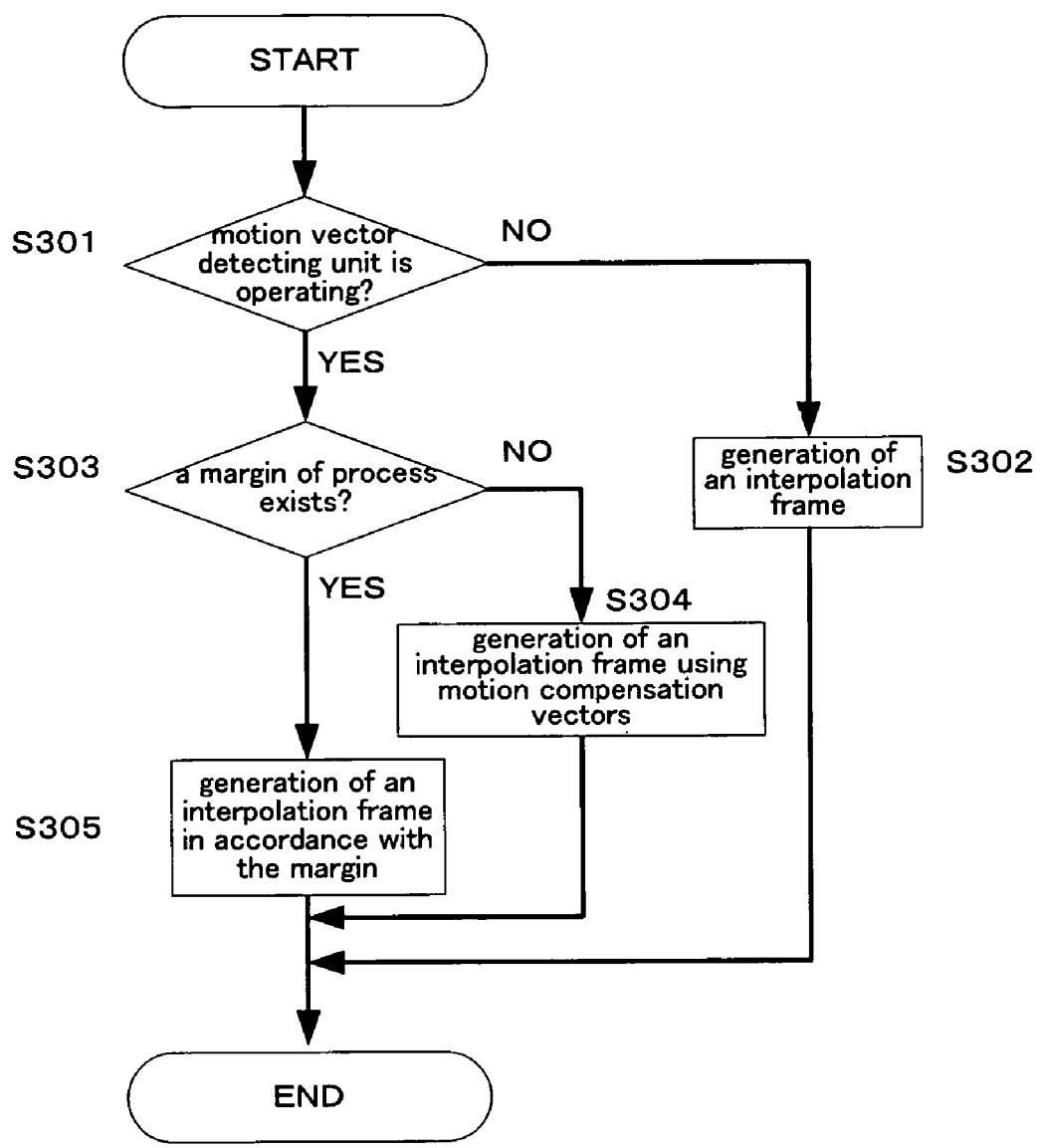
FIG. 27 is a flowchart showing an interpolation frame generation method according to the fourth embodiment of the present invention.

FIG. 27 shows a flowchart for describing a method for generating an interpolation frame by the interpolation frame generation device 301. The control device 304 obtains the detecting unit operation information 319 from the motion vector detecting unit 326 and decides whether or not the motion vector detecting unit 326 is in the operating condition (Step S301).

If the motion vector detecting unit 326 is not operating, the interpolation frame generating unit 334 generates an interpolation frame (Step S302). The interpolation frame is generated in accordance with the motion vector MV318 detected by the motion vector detecting unit 326 and the image frame stored in the frame memory 330. Here, it is possible to use the method for generating an interpolation frame that was described in the first embodiment.

Figure 28:
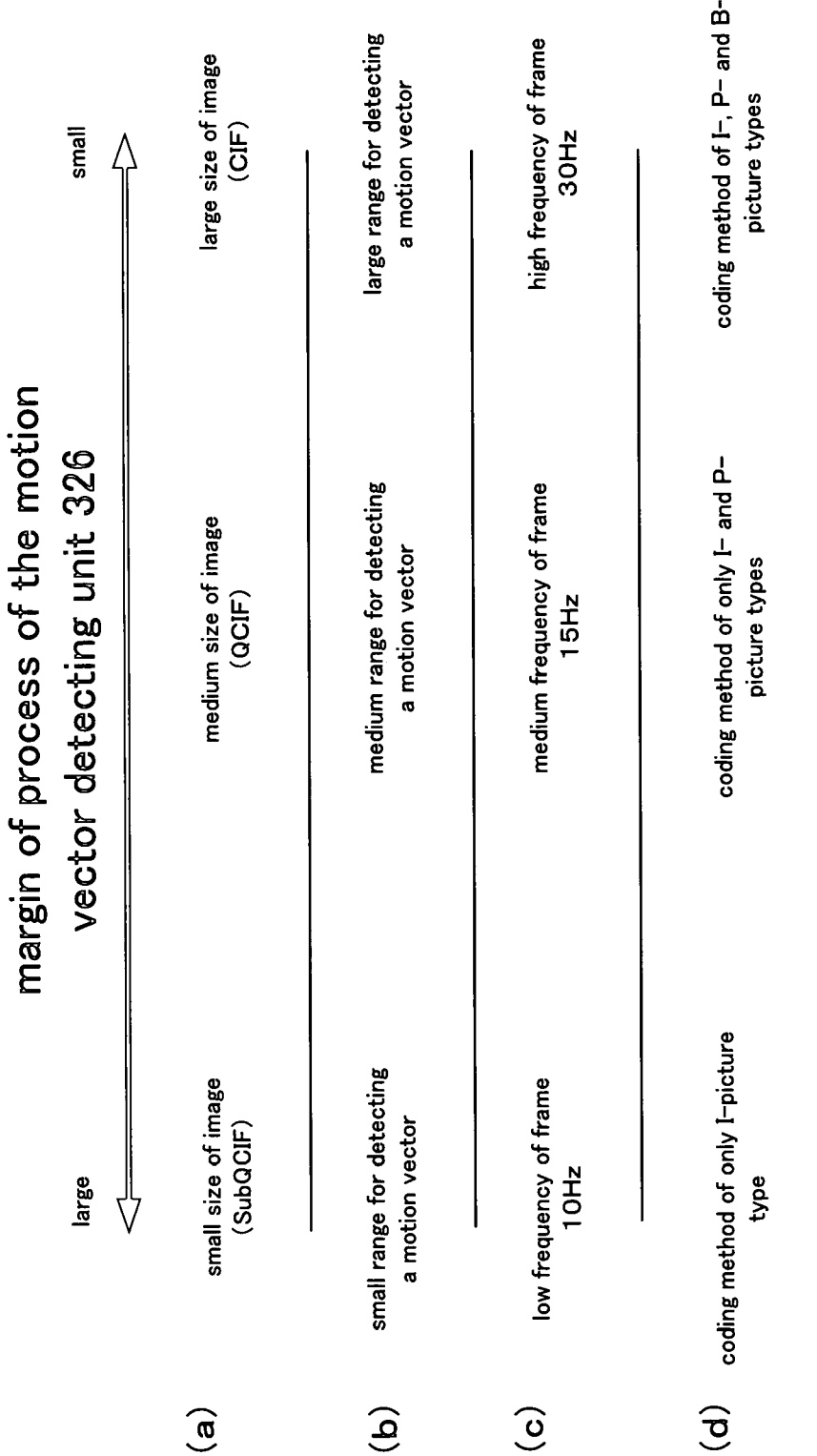
FIG. 28 describes a margin for a process performed by a motion detecting unit.

If the motion vector detecting unit 326 is operating, the control device 304 decides the margin of the process of the motion vector detecting unit 326 from the detecting unit operation information 319 (Step S303). FIG. 28 shows a description of the margin of the process of the motion vector detecting unit 326. Reference (a) in FIG. 28 shows the margin of the process of the motion vector detecting unit 326, which depends on an image size of the input image signal 321. It shows that margin of the process of the motion vector detecting unit 326 decreases as the image size increases. Reference (b) in FIG. 28 shows the margin of the process of the motion vector detecting unit 326, which depends on a detection range for detecting a motion vector when the input image signal 321 is encoded by motion compensation coding. It shows that the margin of the process of the motion vector detecting unit 326 decreases as the detection range increases. Reference (c) in FIG. 28 shows the margin of the process of the motion vector detecting unit 326, which depends on a frame frequency of the input image signal 321. It shows that the margin of the process of the motion vector detecting unit 326 decreases as the frame frequency increases. Reference (d) in FIG. 28 shows the margin of the process of the motion vector detecting unit 326, which depends on a method for coding the input image signal 321. It shows that the margin of the process is small when the coded image signal 322 includes I-, P-, and B-pictures.

If it is decided that there is no margin of the process, the interpolation frame generating unit 334 generates an interpolation frame in accordance with image signal information 317 obtained from the decoding device 302 and the image frame stored in the frame memory 330 (see Step S304 in FIG. 27). More specifically, the interpolation frame is generated by using motion compensation vectors of the image signal information 317. A detailed description thereof is the same as that provided in Section (4-4) of the second embodiment, and thus a description thereof will be omitted.

If it is decided that there is a margin of the process, the interpolation frame generating unit 334 generates an interpolation frame in accordance with the margin of the process (Step S305). More specifically, if it is decided that the margin of the process is large (see FIG. 28), the number of interpolation frames is increased, or the detection range for detecting a motion vector for generating the interpolation frame is enlarged, or the number of blocks for detecting a motion vector is increased, or the number of image frames that are used for generating an interpolation frame is increased.

(3) Effect of the Fourth Embodiment

In the fourth embodiment of the present invention, the interpolation frame generation device 301 uses the motion compensation unit 324 that is included in the coding device 303. Thus, a scale of a circuit of hardware can be reduced. In addition, a scale of software coding can be reduced.

In addition, since the generation of an interpolation frame is controlled in accordance with the margin of the process of the motion compensation unit 324, hardware resources are used efficiently, and an appropriate interpolation frame can be generated within the range of the margin of the process.

(4) Modifications of the Fourth Embodiment

The present invention is not limited to the embodiment described above but can be modified in a variety of ways within the scope thereof.

(4-1)

With reference to FIG. 25, the interpolation frame generation device 301 acquires the decode image signal 316 that was obtained by decoding by the decoding device 302. Here, the input signal of the interpolation frame generation device 301 may be an input image signal that is not processed in the decoding device 302. In this situation, since the decode image signal 316 is not obtained, it is possible not to generate an interpolation frame in Step S304 of FIG. 27.

(4-2)

In the above-described embodiment, the margin of the process of the motion vector detecting unit 326 is used for controlling the generation of an interpolation frame. Here, it is possible to put a priority on the generation of an interpolation frame, and to control so that the process of the motion vector detecting unit 326 by the coding device is reduced. More specifically, if an interpolation frame is generated during the detection process of a motion vector of the input image signal 321 by the motion vector detecting unit 326, the generation of an interpolation frame has a priority, the detection range for detecting a motion vector of the input image signal 321 is changed, or other control is performed for decreasing the volume of calculation for detecting a motion vector.

(4-3)

With reference to Steps S303-S305 of FIG. 27, if the motion vector detecting unit 326 is operating, the generation of an interpolation frame is controlled in accordance with a margin of the process. Here, it is possible that if the motion vector detecting unit 326 is operating, an interpolation frame is not generated. Alternatively, if the motion vector detecting unit 326 is operating, the interpolation frame generating unit 334 may generate an interpolation frame in accordance with the image signal information 317 obtained from the decoding device 302 and the image frame stored in the frame memory 330.

(4-4)

In the above-described embodiment, the control device 304 decides the margin of the process of the motion vector detecting unit 326 in accordance with the detecting unit operation information 319. Here, the margin of the process of the motion vector detecting unit 326 may be the one that the control device 304 decides directly in accordance with the time that is necessary for the process of the coding device 303.

(4-5)

In the interpolation frame generation device 301, like in Section (4-10) of the first embodiment or Section (4-5) of the second embodiment, it is possible that a method for generating an interpolation frame can be set in accordance with a margin of the process for generating the interpolation frame. For example, it is possible that a method for generating an interpolation frame can be changed in accordance with an image size or a frame frequency of the decode image signal 316 that is entered in the frame memory 330.

(4-6)

In the embodiment described above, the frame can be either a frame of a progressive scanning image or a frame or field of an interlaced scanning image.

Fifth Embodiment

In the first to fourth embodiments, the interpolation motion vector is derived for each of the image blocks for generating an interpolation frame. Here, it is possible that the interpolation frame is generated by moving a base frame to be a base for generating an interpolation frame by one interpolation motion vector. In this situation, it is not necessary to derive interpolation motion vectors for all of image blocks, so that the volume of calculation for deriving interpolation motion vectors can be decreased. In addition, since the base frame is moved by one interpolation motion vector, distortion of an image in the interpolation frame can be reduced. In addition, since the base frame is moved by one interpolation motion vector for generating an interpolation frame, the volume of calculation for generating an interpolation frame can be decreased.

A fifth embodiment of the present invention will be described with reference to FIGS. 29-33.

(1) Interpolation Frame Generation Device 621

Figure 29:
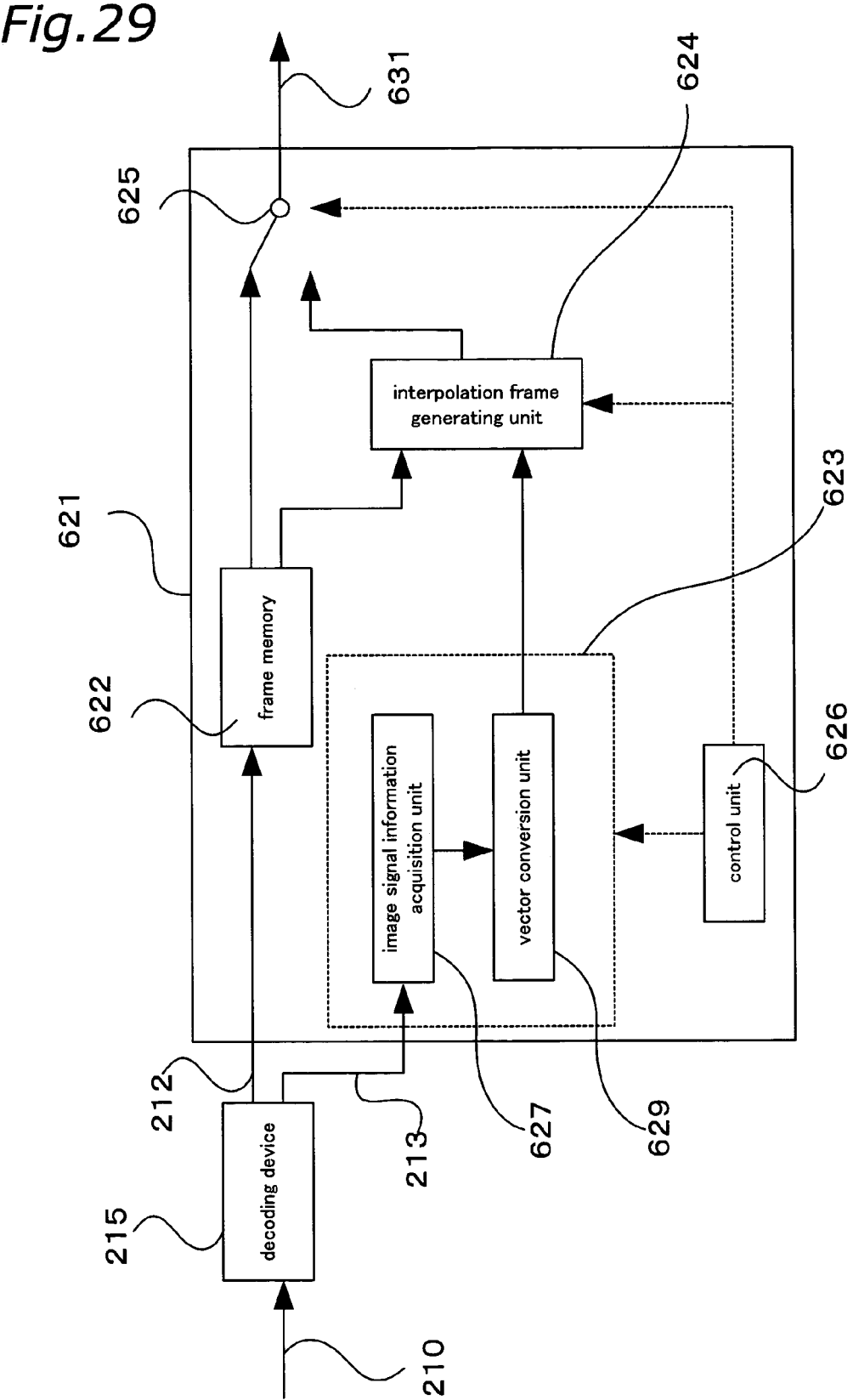
FIG. 29 is a block diagram showing the configuration of an interpolation frame generation device according to a fifth embodiment of the present invention.

FIG. 29 shows an interpolation frame generation device 621 that realizes this function. The interpolation frame generation device 621 is included in a television set, a personal computer (PC), a cellular phone, or other devices which display an image signal. The interpolation frame generation device 621 is a device for generating an interpolation frame for interpolating image frames from image frames that form the decoded image signal 212 that was obtained by decoding the coded image signal 210 that is coded by motion compensation by the decoding device 215.

The interpolation frame generation device 621 has many elements similar to the interpolation frame generation device 601 as shown in FIG. 21, so only the points that differ therefrom will be described below.

The interpolation frame generation device 621 includes a frame memory 622, a vector deriving unit 623, an interpolation frame generating unit 624, a signal switching unit 625, and a control unit 626. The vector deriving unit 623 includes an image signal information acquisition unit 627 and a vector conversion unit 629. The image signal information acquisition unit 627 acquires image signal information 213 from the decoding device 215. The vector conversion unit 629 acquires information from the image signal information acquisition unit 627.

The operation of the vector conversion unit 629 and the interpolation frame generating unit 624, which are differences between the interpolation frame generation device 621 and the interpolation frame generation device 601 as shown in FIG. 21, will be described as follows.

(1-1) Operation of the Vector Conversion Unit 629

The vector conversion unit 629 acquires information from the image signal information acquisition unit 627. In addition, the vector conversion unit 629 derives a global motion vector for interpolation from motion compensation vectors that are included in the image signal information 213.

More specifically, the global motion vector is derived as (i) an average value of the entire motion compensation vectors in the image frame, (ii) an average value of motion compensation vectors of image blocks that are located at a periphery of the image frame, (iii) an average value of motion compensation vectors of image blocks that are located at the middle portion of the image frame, (iv) an average value of motion compensation vectors of image blocks except for a predetermined image block in the image frame, or (v) a modal value of the entire motion compensation vectors in the image frame. Here, the predetermined image block in (iv) is a specific image block that was described in the second or third embodiments, for example.

The global motion vector that is derived by the above (i)-(v) can capture a feature of the movement of the image frame as follows. As shown in (i), a typical movement of the entire image frame can be captured. As shown in (ii), a movement of the entire image frame, for example, unstable holding of a video camera can be typically captured. As shown in (iii), a typical movement of the image frame, for example, a movement of an object can be typically captured. As shown in (iv), more accurate movement of the entire image frame can be captured except for a motion compensation vector which was determined to be one that does not correctly represent true motion of each image block. As shown in (v), a movement of the entire image frame can be captured.

The vector conversion unit 629 switches these methods (i)-(v) for deriving an interpolation vector in accordance with a feature of the image frame, or fixes one of them for application. Furthermore, it is possible to make the vector as the global motion vector, which is obtained by giving a weight to each global motion vector derived by the methods (i)-(v) for deriving an interpolation vector and by combining them.

(1-2) Operation of the Interpolation Frame Generating Unit 624

The interpolation frame generating unit 624 derives the interpolation motion vector by internal division or external division of the global motion vector that was derived by the vector conversion unit 629. More specifically, internal division or external division of the global motion vector is calculated by the ratio of the temporal distance between the interpolation frame and the base frame to the temporal distance between the coded reference frame and the base frame when the base frame was coded by motion compensation coding, so that the interpolation motion vector is derived. In addition, the interpolation frame generating unit 624 generates an interpolation frame from the derived interpolation motion vector and the image frame stored in the frame memory 622.

Figure 30B:
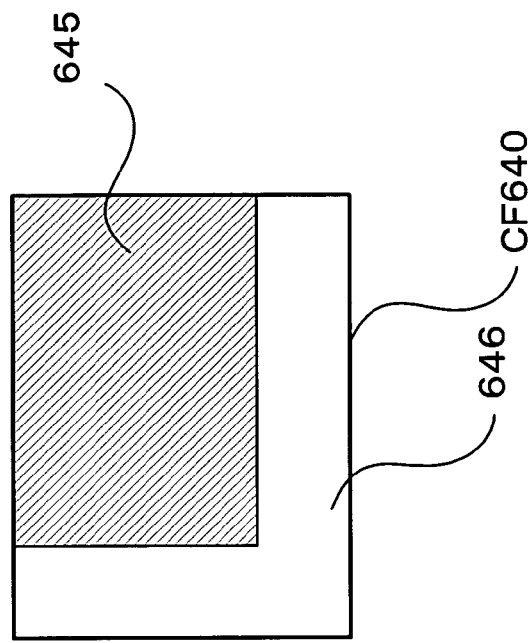
FIGS. 30A and 30B describe the generation of an interpolation frame.
Figure 30A:
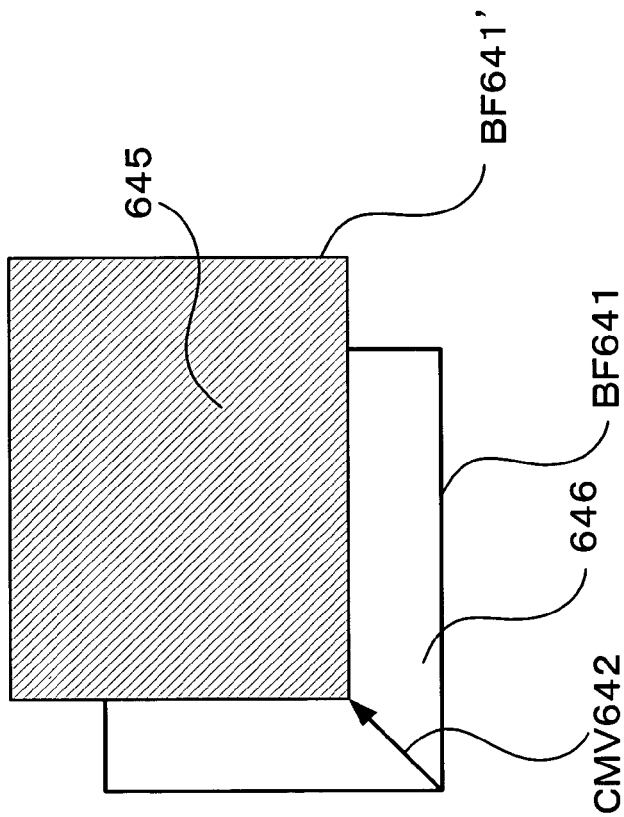

With reference to FIG. 30, the generation of an interpolation frame CF640 (see FIG. 30B) will be described. For a base frame BF641 that is an image frame to be a base for generating the interpolation frame CF640, the global motion vector is derived by the method for deriving an interpolation vector as described in (1-1), and further an interpolation motion vector CMV642 is derived by the interpolation frame generating unit 624 (see FIG. 30A).

A pixel area 645 on the interpolation frame CF640 is area-compensated by pasting a part of the base frame BF641' after a moving process by the interpolation motion vector CMV642.

On the other hand, concerning a pixel area 646 on the interpolation frame CF640, the area compensation is performed by using the base frame BF641 or the base frame BF641' after the moving process.

More specifically, the area compensation of the pixel area 646 is performed by the method such as (i) pasting a pixel of the base frame BF641 that is located at the same position, (ii) repeating pixel data at an edge of the base frame BF641' after the moving process, or (iii) using a pixel area at a periphery of the base frame BF641' after the moving process so that the area compensation is performed smoothly.

With reference to FIGS. 31A-31D, each of them will be described in detail. FIG. 31A shows a manner in which the base frame BF641 is moved in parallel by the interpolation motion vector CMV642. The base frame BF641 is shown by a check pattern. In addition, the base frame BF641' after the movement is hatched in single hatching for easy understanding of the explanation.

The interpolation frame CF640 that is generated by the area compensation method (i) described above is shown in FIG. 31B. A part of the base frame BF641' after being moved is pasted on the pixel area 645. In addition, the pixel of the base frame BF641 before being moved at the same position is pasted on the pixel area 646 that needs the area compensation.

The interpolation frame CF640 that is generated by the area compensation method (ii) described above is shown in FIG. 31C. A part of the base frame BF641' after being moved is pasted on the pixel area 645. In addition, pixel data at an edge of the base frame BF641' after being moved are repeated in the pixel area 646 that needs the area compensation.

The interpolation frame CF640 that is generated by the area compensation method (iii) described above is shown in FIG. 31D. A part of the base frame BF641' after being moved is pasted on the pixel area 647. In addition, a pixel area 648 that is a part of the base frame BF641' after being moved is used for area compensation of the pixel area 646. For example, the pixel area 648 that is a part of the base frame BF641' after being moved is extended to the pixel area 646 for the area compensation. A size of the pixel area 648 that is used for this area compensation (the area with cross hatching in FIG. 31D) can be set freely. The more the area is (The smaller the pixel area 647 is), the more smoothly the area compensation can be performed, though the distortion of the entire image becomes larger.

Figure 32:
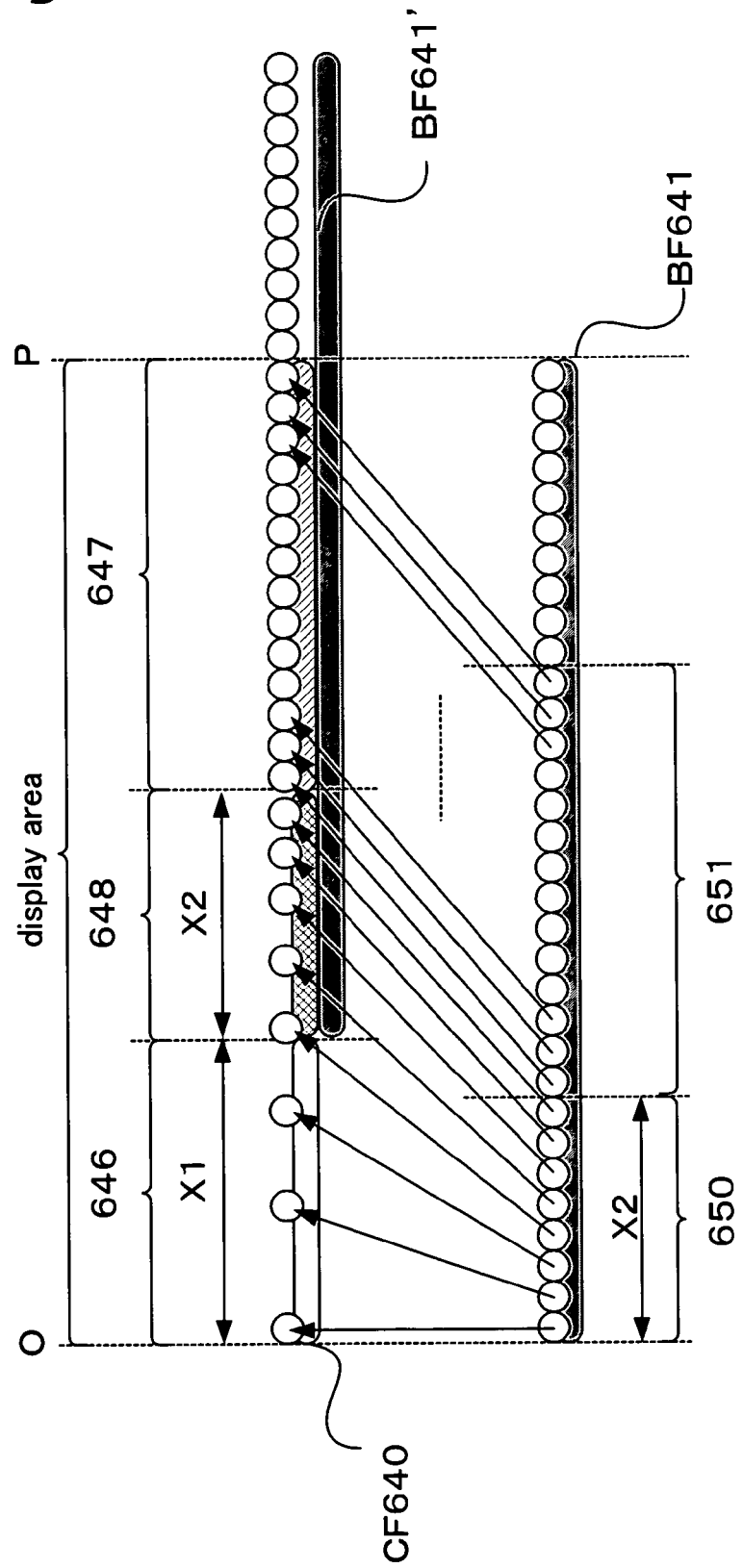
FIG. 32 provides a supplemental description of FIG. 31D.
Figure 33:
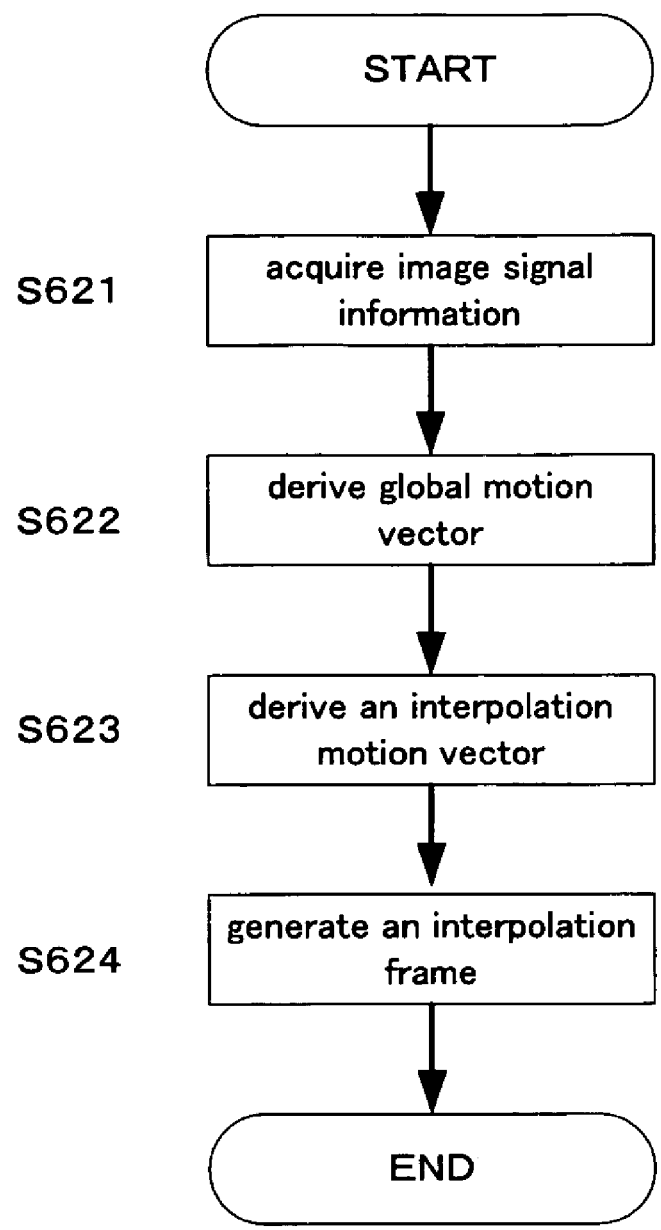
FIG. 33 is a flowchart showing an interpolation frame generation method according to a fifth embodiment of the present invention.

With reference to FIG. 32, an area compensation state of the pixel on the line OP on the interpolation frame CF640 as shown in FIG. 31D will be described. An OP direction component of the interpolation motion vector CMV642 is denoted by x1. In addition, a size of the pixel area 648 that is used for the area compensation in the OP direction is denoted by x2. Then, the area compensation is performed so that the pixel area 650 having the size x2 on the base frame BF641 is extended to the pixel areas 646 and 648 having the size (x1+x2). Concerning the pixel area 647, a pixel obtained by moving a pixel area 651 in the OP direction by x1 is used for performing the area compensation (2) Interpolation Frame Generation Method FIG. 33 shows a flowchart for describing a method for generating an interpolation frame by the interpolation frame generation device 621. A detailed explanation of each step is the same as the explanation in "(1) Interpolation Frame Generation Device 621", so the detailed explanation will be omitted.

The image signal information acquisition unit 627 acquires image signal information 213 (Step S621). The vector conversion unit 629 derives a global motion vector for interpolation from the image signal information 213 (Step S622). The deriving process is performed as described in "(1-1) Operation of the Vector Conversion Unit 629". The interpolation frame generating unit 624 derives an interpolation motion vector from the global motion vector (Step S623) and generates an interpolation frame from the derived interpolation motion vector and the image frame stored in the frame memory 622 (Step S624). Here, the interpolation frame is generated as described in "(1-2) Operation of Interpolation Frame Generating Unit 624".

(3) Effect of the Fifth Embodiment

In the fifth embodiment of the present invention, the interpolation frame generation device 621 generates the interpolation frame CF640 by moving the base frame BF641 in parallel by one interpolation motion vector CMV642. Since it is not necessary to derive interpolation motion vectors for all of image blocks that form the base frame BF641, the volume of calculation is decreased. In addition, since the base frame BF641 is moved by one interpolation motion vector CMV642, image distortion in the interpolation frame CF640 is reduced. In addition, since the base frame BF641 is moved by one interpolation motion vector CMV642 for generating the interpolation frame CF640, it is not necessary to move each of the image blocks by the interpolation motion vector for each image block that forms the base frame BF641. Therefore, the volume of calculation for generating an interpolation frame is decreased.

In addition a situation in which an image with shaking, e.g., an image that was taken by a video camera is stored, a movement of the entire image is captured for generating the interpolation frame. Therefore, impression of the image becomes smooth, and shaking of the image that causes hard observation is reduced.

(4) Modifications of the Fifth Embodiment

The present invention is not limited to the embodiment described above but can be modified variously in the scope thereof.

(4-1)

If the base frame BF641 is a frame coded by intra coding, one interpolation motion vector that is derived for the image frame that is located before or after the base frame BF641 in the display order is used so as to generate the interpolation frame.

More specifically, (i) the one interpolation motion vector that is derived for the image frame that is temporally located either before or after is used as an interpolation motion vector for the base frame BF641, (ii) the one interpolation motion vectors that are derived for the image frames that are temporally located before and after are compared, and if the difference is large, the base frame BF641 or the image frame that is temporally located before or after is used as an interpolation frame CF640 (still), or the interpolation frame CF640 is not generated. Here, large difference of the one interpolation motion vectors means that a distance of each of the one interpolation vectors is large, for example.

(4-2)

In the above-described embodiment, the global motion vector may be derived by using the detected motion vectors for image blocks. More specifically, in the interpolation frame generation device 101 as shown in FIG. 1, the interpolation frame generating unit 104 may derive the global motion vector in accordance with motion vectors detected by the motion vector detecting unit 103. Here, the deriving process is performed by the method (1-1) described above. In addition, the interpolation frame generating unit 104 derives one interpolation motion vector from the global motion vector and generates an interpolation frame by using the method (1-2) described above.

Sixth Embodiment

When generating an interpolation frame, it is possible to decide whether or not the base frame to be a base for generating an interpolation frame is adequate for generating the interpolation frame and to switch the methods for generating the interpolation frame in accordance with the result of the decision.

A sixth embodiment of the present invention will be described with reference to FIGS. 34-35.

(1) Interpolation Frame Generation Device 651

Figure 34:
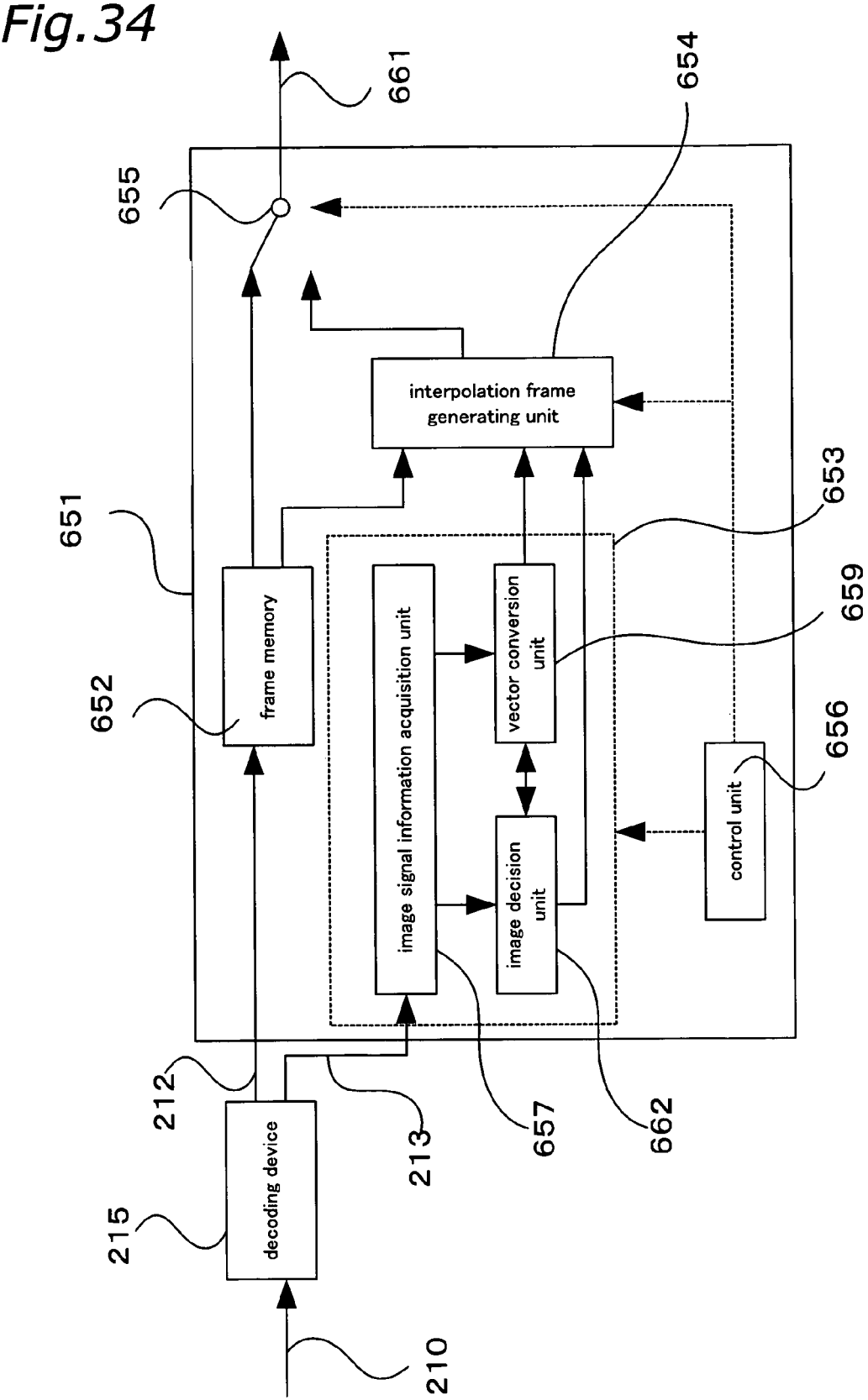
FIG. 34 is a block diagram showing the configuration of an interpolation frame generation device according to a sixth embodiment of the present invention.

FIG. 34 shows an interpolation frame generation device 651 that realizes this function. The interpolation frame generation device 651 is included in a television set, a personal computer (PC), a cellular phone, or other devices having a function of displaying an image signal. The interpolation frame generation device 651 is a device for generating an interpolation frame for interpolating image frames from image frames that form the decoded image signal 212 that was obtained by decoding the coded image signal 210 that is coded by motion compensation by the decoding device 215.

The interpolation frame generation device 651 has many elements similar to the interpolation frame generation device 601 as shown in FIG. 21, so different points will be described mainly as follows.

The interpolation frame generation device 651 includes a frame memory 652, a vector deriving unit 653, an interpolation frame generating unit 654, a signal switching unit 655, and a control unit 656. The vector deriving unit 653 includes an image signal information acquisition unit 657, an image decision unit 662, and a vector conversion unit 659. The image signal information acquisition unit 657 acquires image signal information 213 from the decoding device 215. The image decision unit 662 decides whether or not the base frame is adequate for the generation of an interpolation frame in accordance with the image signal information 213. The vector conversion unit 659 acquires information from the image signal information acquisition unit 657 and the image decision unit 662.

Operating the image decision unit 662, the vector conversion unit 659 and the interpolation frame generating unit 654, which are differences between the interpolation frame generation device 651 and the interpolation frame generation device 601 as shown in FIG. 21, will be described as follows.

(1-1) Operation of the Vector Conversion Unit 659

The vector conversion unit 659 acquires information from the image signal information acquisition unit 657. The vector conversion unit 659 performs an operation similar to the operation of the vector conversion unit 609 described in the third embodiment with reference to FIG. 21.

More specifically, the vector conversion unit 659 selects specific image blocks among the entire image blocks that form the base frame in accordance with the image signal information 213 that is acquired by the image signal information acquisition unit 657. Here, the specific image block is the same as the one that was described in the above [Third Embodiment], so the explanation will be omitted. In addition, the motion compensation vectors of the specific image blocks are corrected by image blocks except for the specific image blocks (hereinafter called general image blocks).

In addition, the vector conversion unit 659 performs an operation similar to the operation of the vector conversion unit 629 that was described in the above [Fifth Embodiment] with reference to FIG. 29 for the obtained corrected motion compensation vectors.

More specifically, an average value of the corrected motion compensation vectors obtained for the specific image blocks and the motion compensation vectors obtained for the general image blocks is calculated, so that a global motion vector for interpolation is derived.

In addition, the vector conversion unit 659 performs smoothing process for the obtained corrected motion compensation vectors by using the smoothing filter that was described in the above [Second Embodiment] (4-4).

More specifically, the smoothing filter as shown in FIG. 13B is applied to the corrected motion compensation vectors obtained for the specific image blocks and to the motion compensation vectors obtained for the general image blocks. Hereinafter, the corrected motion compensation vectors of the specific image blocks and the motion compensation vectors of the general image blocks that are smoothing-processed are called smoothed vectors.

(1-2) Operation of the Image Decision Unit 662

The image decision unit 662 decide whether or not the base frame is adequate for generating an interpolation frame in accordance with the image signal information 213, the smoothed vectors and the global motion vector.

More specifically, it is first decided whether or not the smoothed vectors derived by the vector conversion unit 659 is adequate for generating an interpolation frame. If the decision result is negative, the image decision unit 662 decides whether or not the global motion vector derived by the vector conversion unit 659 is adequate for generating an interpolation frame.

The decision whether or not the smoothed vectors are adequate for generating an interpolation frame is performed as follows. It is decided that the generation of an interpolation frame is difficult in accordance with the smoothed vectors in the case (i) where a dispersion of the smoothed vectors is large, or in the case (ii) where a ratio of the specific image blocks to the entire image blocks that form the base frame is high, or in the case (iii) where a ratio of the image blocks in which a sum of the DCT coefficients exceeds a certain threshold level to the entire image blocks that form the base frame is high, or in the case (iv) where directions of the smoothed vectors varies by more than a predetermined numbers.

The case (i) will be described more specifically. In the case (i) where a dispersion of the smoothed vectors of an entire frame is large, it is decided that movements between a base frame and a reference frame are complex, and that the generation of an interpolation frame is difficult. The case (ii) will be described more specifically. In the case (ii), a ratio of the specific image blocks to the entire image blocks and a ratio of the image blocks that are decided to have motion compensation vectors having low correlation with motion compensation vectors of adjacent image blocks to the entire image blocks are calculated. In the case where the ratio of the specific image blocks to the entire image blocks is high, it is decided that a correlation between a base frame and a reference frame is low, and that the generation of an interpolation frame is difficult. In the case where the ratio of the image blocks that are decided to have motion compensation vectors having low correlation with motion compensation vectors of adjacent image blocks to the entire image blocks is high, it is decided that movements between a base frame and a reference frame are complex, and that the generation of an interpolation frame is difficult. The case (iv) will be described more specifically. In the case (iv), the smoothed vectors that are expressed as two-dimensional vectors for the image blocks are sampled sequentially in the base frame by a scanning method such as horizontal scanning, vertical scanning or zigzag scanning. Concerning the sampled series of smoothed vectors, it is decided that the generation of an interpolation frame is difficult if the number of change of a quadrant in which the vectors are located exceeds a certain number.

Furthermore, these decisions in (i)-(iv) can be done independently from each other or in a combination thereof.

The decision whether or not the global motion vector is adequate for the generation of an interpolation frame is performed as follows. It is decided that the generation of an interpolation frame is difficult in accordance with the global motion vector in the case (v) where a ratio of the image blocks in which distances between the smoothed vectors of a base frame and the global motion vector is large to the entire image blocks that form the base frame is high, or in the case (vi) where a ratio of divided areas in which distances between typical vectors and the global motion vector is large to a base frame is high. Here, the divided areas are the areas dividing the base frame into a certain number. The typical vectors are the vectors representing movements of each of the divided areas.

The case (vi) will be described more specifically. In the case (vi), a base frame is divided into a certain number of the divided areas. The divided areas, for example, divide the base frame in quarters. Next, the typical vectors of the divided areas are derived. The typical vectors, for example, are derived as average value of motion compensation vectors of general image blocks in each of the divided areas. It is decided that the generation of an interpolation frame is difficult in the case where differences between each of the typical vectors and the global motion vector are large.

(1-3) Operation of the Interpolation Frame Generating Unit 654

The interpolation frame generating unit 654 switches between methods for generating an interpolation frame in accordance with the result of decision by the image decision unit 662.

If it is decided that the smoothed vectors are adequate for the generation of an interpolation frame, the interpolation frame generating unit 654 performs an operation similar to the operation of the interpolation frame generating unit 604 that was described in the above [Third Embodiment] with reference to FIG. 21, so as to generate an interpolation frame.

More specifically, the interpolation motion vectors are derived for the image blocks that form the base frame by using the smoothed vectors so as to generate an interpolation frame.

If it is decided that the smoothed vectors are not adequate for the generation of an interpolation frame and if it is decided that the global motion vector is adequate for the generation of an interpolation frame, the interpolation frame generating unit 654 performs an operation similar to the operation of the interpolation frame generating unit 624 described in the fifth embodiment with reference to FIG. 29, so as to generate an interpolation frame. More specifically, one interpolation motion vector is derived for the base frame by using the global motion vector so as to generate an interpolation frame.

If it is decided that the global motion vector is not adequate for the generation of an interpolation frame, the interpolation frame generating unit 654 generates an interpolation frame without using the smoothed vectors or the global motion vector. For example, an image frame that is located either before or after the interpolation frame in the display order is used as an interpolation frame.

(2) Interpolation Frame Generation Method

Figure 35:
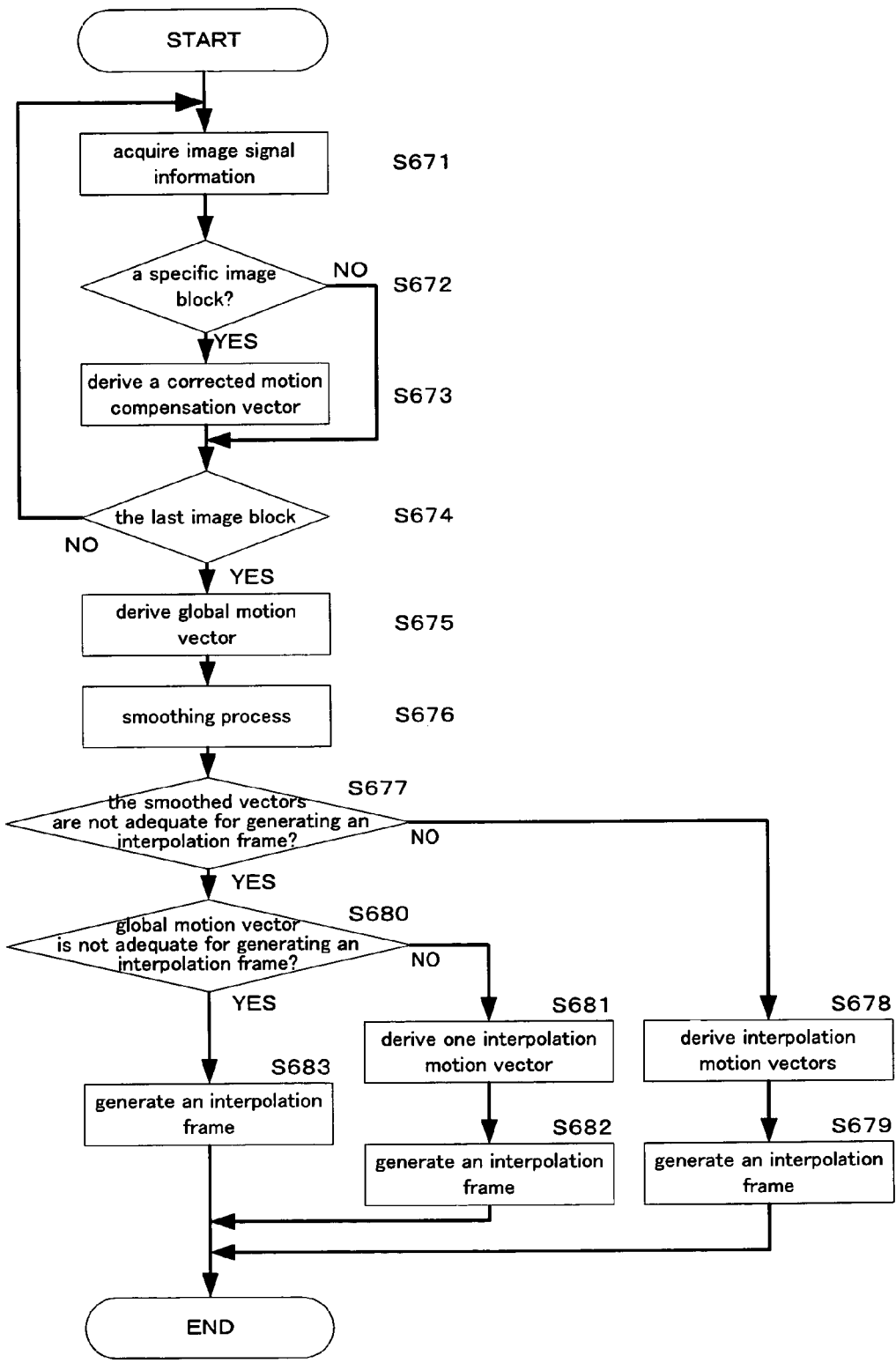
FIG. 35 is a flowchart showing an interpolation frame generation method according to a sixth embodiment of the present invention.

FIG. 35 shows a flowchart for describing an interpolation frame generation method by the interpolation frame generation device 651. A detailed explanation of each step is similar to that described in the section titled "(1) Interpolation Frame Generation Device 651", so a detailed description thereof will be omitted.

The image signal information acquisition unit 657 acquires image signal information 213 (Step S671).

The vector conversion unit 659 decides whether or not the image block is a specific image block (Step S672). The vector conversion unit 659 corrects a motion compensation vector of the specific image block so as to derive a corrected motion compensation vector (Step S673). After deciding for all image blocks whether or not each of them is a specific image block (Step S674), the vector conversion unit 659 derives a global motion vector for interpolation from the motion compensation vectors of the general image blocks and the corrected motion compensation vectors of the specific image blocks (Step S675). In addition, the vector conversion unit 659 performs the smoothing process for the motion compensation vectors of the general image blocks and the corrected motion compensation vectors of the specific image blocks so as to derive the smoothed vectors (Step S676).

The image decision unit 662 decides whether or not the smoothed vectors derived by the vector conversion unit 659 are adequate for the generation of an interpolation frame (Step S677). If it is decided that the smoothed vectors are adequate for the generation of an interpolation frame, the interpolation frame generating unit 654 uses the smoothed vectors so as to derive interpolation motion vectors for the image blocks that form the base frame (Step S678), and to generate an interpolation frame (Step S679).

If it is decided that the smoothed vectors are not adequate for the generation of an interpolation frame, the image decision unit 662 decides whether or not the global motion vector derived by the vector conversion unit 659 is adequate for the generation of an interpolation frame (Step S680). If it is decided that the global motion vector is adequate for the generation of an interpolation frame, the interpolation frame generating unit 654 uses the global motion vector so as to derive one interpolation motion vector for the base frame (Step S681), and to generate an interpolation frame (Step S682).

If it is decided that the global motion vector is not adequate for the generation of an interpolation frame, the interpolation frame generating unit 654 does not use the smoothed vectors or the global motion vector for generating an interpolation frame (Step S683). For example, an image frame that is located either before or after the interpolation frame in the display order is used as an interpolation frame.

(3) Effect of the Sixth Embodiment

In the sixth embodiment of the present invention, the interpolation frame generation device 651 decides whether or not the base frame to be a base for generating an interpolation frame is adequate for the generation of an interpolation frame, so as to switch the methods for generating an interpolation frame in accordance with a result of the decision. Therefore, it is possible to generate an interpolation frame by a method that is adequate for characteristics of the base frame. Thus, image quality of the interpolation frame can be improved.

(4) Modifications of the Sixth Embodiment

The present invention is not limited to the embodiment described above but can be modified variously in the scope thereof.

(4-1)

In the above (1-3), if the smoothed vectors and the global motion vector are decided not to be adequate for the generation of an interpolation frame, the interpolation frame generating unit 654 does not use the smoothed vectors or the global motion vector for generating an interpolation frame.

Here, though an image frame that is located either before or after the interpolation frame in the display order is used as an interpolation frame, it is possible to determine in advance which image frame is used as the interpolation frame.

In addition, it is possible to select an image frame to be an interpolation frame by deciding a difference between image frames that are located before and after in the display order or by deciding a difference in luminance between image frames, for example. For example, the backward image frame is used as an interpolation frame if the difference is large, while the forward image frame is used as an interpolation frame if the difference is small. If the quantity of variation is large between the image frames, the image after the variation is used as an interpolation frame to be displayed, so that a visual impression can be improved.

In addition, it is possible to select an image frame that is the closest to an interpolation frame in the display order as the interpolation frame.

In addition, it is possible to use an image that is obtained by overlapping image frames that are located before and after the interpolation frame in the display order as an interpolation frame.

In addition, the interpolation frame generating unit 654 may not generate an interpolation frame if it is decided by the image decision unit 662 that the base frame is not adequate for the generation of an interpolation frame. It is because that some display devices that are connected to the interpolation frame generation device 651 and display the output image signal 661 can continue to display image frames stored in a display memory included in the display device if an interpolation frame is not generated. In this case, it is also possible to decrease the volume of calculation for the generation of an interpolation frame.

(4-2)

In the above (1-1), it is possible that the vector conversion unit 659 does not perform the smoothing process, and the image decision unit 662 decides whether or not the base frame is adequate for the generation of an interpolation frame in accordance with the corrected motion compensation vectors of the specific image blocks and the motion compensation vectors of the general image blocks.

Here, the decision is performed by applying the method (i)-(iv) described in the Section (1-2) above to the corrected motion compensation vectors of the specific image blocks and the motion compensation vectors of the general image blocks. Furthermore, it is possible to perform the smoothing process when it is decided that the base frame is adequate for the generation of an interpolation frame.

(4-3)

It is possible to decide whether or not the base frame is adequate for the generation of an interpolation also in a situation in which the motion vector that is detected for the image block that forms the base frame is used for generating an interpolation frame.

More specifically, in the interpolation frame generation device 101 as shown in FIG. 1, the motion vector detecting unit 103 calculates a sum of absolute differences (SAD) in each of the image blocks of the base frame and the pixel areas of the reference frame, so as to detect motion vectors of the image blocks. Here, the motion vector detecting unit 103 decides that the base frame is not adequate for the generation of an interpolation in the case (i) where a dispersion of motion vectors of the image blocks that form the base frame is large, or in the case (ii) where a ratio of image blocks in which the value of SAD exceeds a certain threshold level to the entire image blocks that form the base frame is high.

The interpolation frame generating unit 104 derives a global motion vector for interpolation from the detected motion vectors if the base frame is not adequate for the generation of an interpolation. Here, the deriving process is performed by the method (i)-(v) for deriving a global motion vector described in Section (1-1) of the fifth embodiment.

In addition, the interpolation frame generating unit 104 derives one interpolation motion vector from the global motion vector and generates an interpolation frame by using the method described in Section (1-2) of the fifth embodiment.

In addition, if the base frame is not adequate for the generation of an interpolation, the interpolation frame generating unit 104 generates an interpolation frame by the method (i) of using the image as an interpolation frame, which is obtained by overlapping image frames that are located before and after the interpolation frame in the display order, or the method (ii) of using the image as an interpolation frame, which is located before or after the interpolation frame in the display order. Here, in the method (ii), it is possible to determine in advance one of the image frames that are located before or after in the display order. On the other hand, it is possible that the generation of an interpolation is not performed if the base frame is not adequate for the generation of an interpolation.

(4-4)

In the above (1-1), it is possible that the vector conversion unit 659 does not derive a global motion vector, and the image decision unit 662 decides whether or not the smoothed vectors, or both the corrected motion compensation vectors of the specific image blocks and the motion compensation vectors of the general image blocks are adequate for the generation of an interpolation frame. In the case where it is decided that these vectors are not adequate for the generation of an interpolation frame, the vector conversion unit 659 derives the global motion vector. Furthermore, the image decision unit 662 decides whether or not the global motion vector is adequate for the generation of an interpolation frame by using the method (v)-(vi) described in Section (1-2) above. Thus, the volume of calculation for deriving the global motion vector can be decreased.

Seventh Embodiment

In this embodiment, when generating the interpolation frame, the area that is an outer frame area of the base frame to be a base for generating an interpolation frame and is not adequate for the generation of an interpolation (hereinafter called an interpolation inadequate area) is detected. In addition, a special area compensation process, which is different from the process for an area except for the interpolation inadequate area (hereinafter called an interpolation adequate area), is performed for the detected interpolation inadequate area, so as to generate an interpolation frame.

In general, when detecting motion vectors of the image blocks that form the base frame so as to generate an interpolation frame, a distortion can be generated in an outer frame area of the interpolation frame. This is because that even if a motion vector is detected in the outer frame area of the base frame, the motion vector does not always represent true motion of the image block.

For example, there is a case where an aspect ratio of the base frame is converted in a manner such as a letter box or a side panel. The letter box means a method for converting an image of the aspect ratio 16:9 into an image of the aspect ratio 4:3 by providing band-like areas to the upper and lower edges of the image. The side panel means a method for converting an image of the aspect ratio 4:3 into an image of the aspect ratio 16:9 by providing band-like areas to the right and left edges of the image.

When detecting motion vectors of the image blocks that form the base frame having the band-like areas, it is difficult to detect motion vectors correctly for the image blocks including boundaries between the area except for the band-like area (hereinafter called a main picture area) and the band-like areas. This is because that the image blocks including the boundaries includes still band-like areas and a moving main picture area. Therefore, when generating an interpolation frame by using detected motion vectors, a distortion can be generated in the image at the boundaries between the main picture area and the band-like areas.

In the embodiment described above, if it is decided that the detected motion vectors do not represent true motion of the image blocks, the generation of an interpolation frame is performed by using corrected motion vectors obtained by correcting motion vectors of the image blocks (for example, see the first embodiment (4-12)). Thus, it is possible to reduce the above-mentioned distortion of the image.

On the other hand, in this embodiment, the band-like areas are detected as interpolation inadequate areas, and a special area compensation process is performed for this interpolation inadequate area. Thus, an interpolation frame having higher quality of image can be generated.

The seventh embodiment of the present invention will be described with reference to FIGS. 36-47.

(1) Interpolation Frame Generation Device 701

Figure 36:
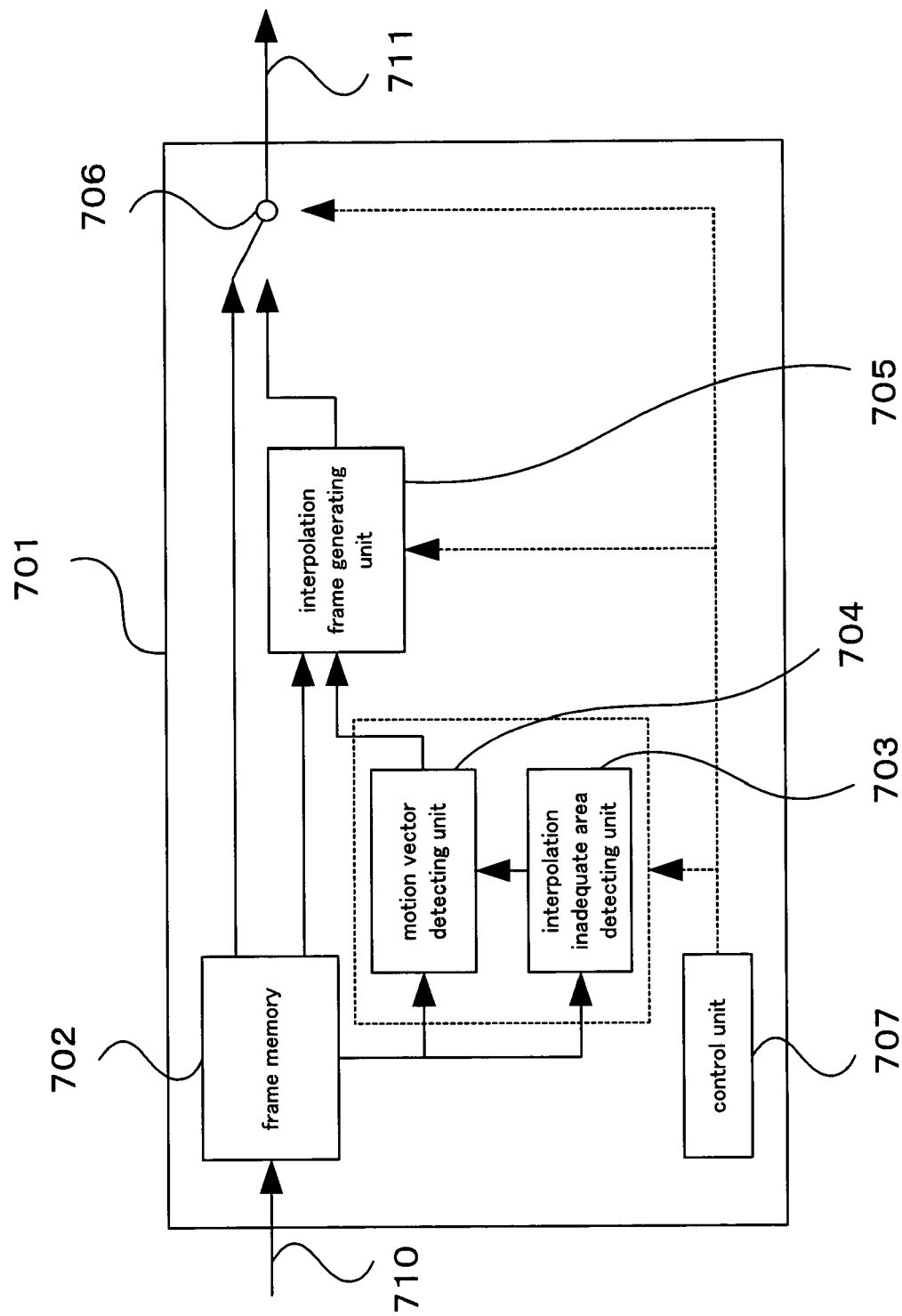
FIG. 36 is a block diagram showing the configuration of an interpolation frame generation device according to a seventh embodiment of the present invention.

FIG. 36 shows an interpolation frame generation device 701 as the seventh embodiment of the present invention. The interpolation frame generation device 701 is a device for generating an interpolation frame for interpolating image frames that form an image signal in a television set, a personal computer (PC), a cellular phone, or other devices that display an image signal.

The interpolation frame generation device 701 includes a frame memory 702, an interpolation inadequate area detecting unit 703, a motion vector detecting unit 704, an interpolation frame generating unit 705, a signal switching unit 706, and a control unit 707.

The frame memory 702 stores an input image signal 710 for each image frame. The interpolation inadequate area detecting unit 703 detects an interpolation inadequate area that is an outer frame area of an image frame stored in the frame memory 702 and is not adequate for the generation of an interpolation. An operation of the interpolation inadequate area detecting unit 703 will be described specifically later.

The motion vector detecting unit 704 detects motion vectors of image blocks that do not include an interpolation inadequate area detected by the interpolation inadequate area detecting unit 703 in accordance with a plurality of image frames stored in the frame memory 702. An operation of the motion vector detecting unit 704 will be described specifically later.

The interpolation frame generating unit 705 generates an interpolation frame from image frames and detected motion vectors. An operation of the interpolation frame generating unit 705 will be described specifically later.

The signal switching unit 706 switches between the image frame stored in the frame memory 702 and the interpolation frame generated by the interpolation frame generating unit 705 so as to make an output image signal 711. The control unit 707 delivers control signals that are necessary for operating the interpolation inadequate area detecting unit 703, the motion vector detecting unit 704, the interpolation frame generating unit 705 and the signal switching unit 706.

(1-1) Operation of the Interpolation Inadequate Area Detecting Unit 703

The interpolation inadequate area detecting unit 703 detects an interpolation inadequate area in an image frame stored in the frame memory 702. More specifically, a pixel value of an outer frame area of a base frame to be a base for generating an interpolation frame is obtained, so that the number of lines in the horizontal and the vertical directions is detected that have substantially a constant pixel value. Here, a line that has substantially a constant pixel value means a line in which luminance values of pixels are within a certain range of value, for example.

Figure 37:
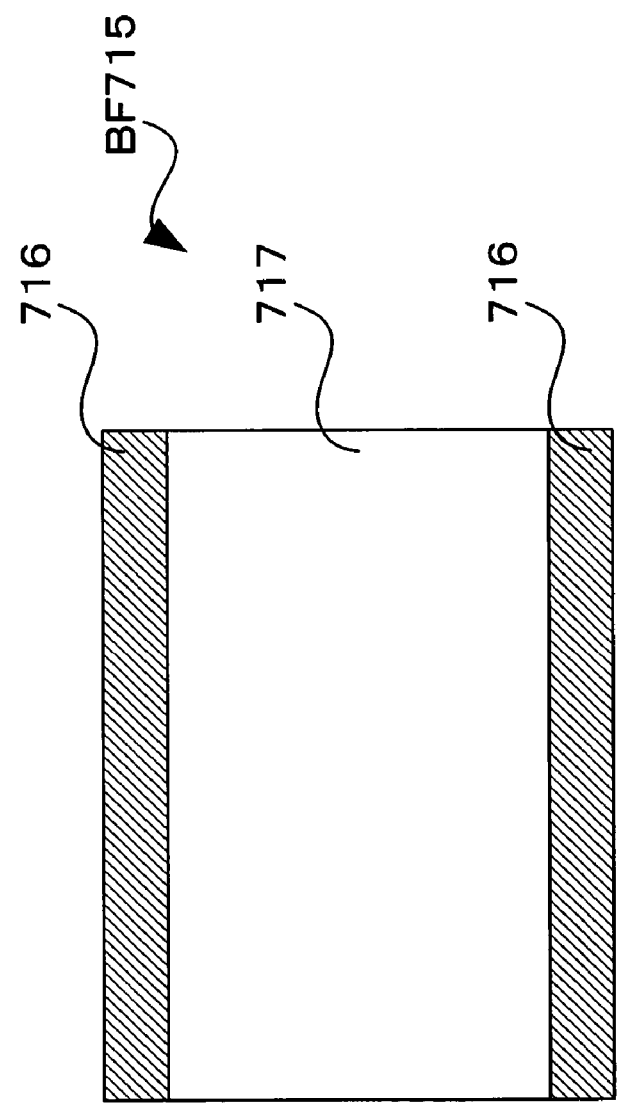
FIG. 37 describes an interpolation inadequate area and an interpolation adequate area.

FIG. 37 shows a detected interpolation inadequate area 716 and an interpolation adequate area 717 in a base frame BF715 whose aspect ratio was converted to the letter box. The bandlike areas located at the upper and the lower position of the base frame BF715 are detected as the interpolation inadequate areas 716, while the main picture area is detected as the interpolation adequate area 717.

Hereinafter, a situation in which an interpolation frame is generated from the base frame BF715 will be described.

(1-2) Operation of the Motion Vector Detecting Unit 704

The motion vector detecting unit 704 detects motion vectors for image blocks that form the base frame BF715. Here, the image blocks to be an object for detecting motion vectors are image blocks except for the image blocks including interpolation inadequate areas 716 in the number more than a predetermined value among image blocks that form the base frame BF715 and include pixels in the number 8×8 or 16×16. Here, concerning the predetermined value, the ratio can be set freely. In this embodiment, the image block that includes interpolation inadequate areas 716 even in the small number is excepted from the image blocks to be an object for detecting motion vectors.

Figure 38:
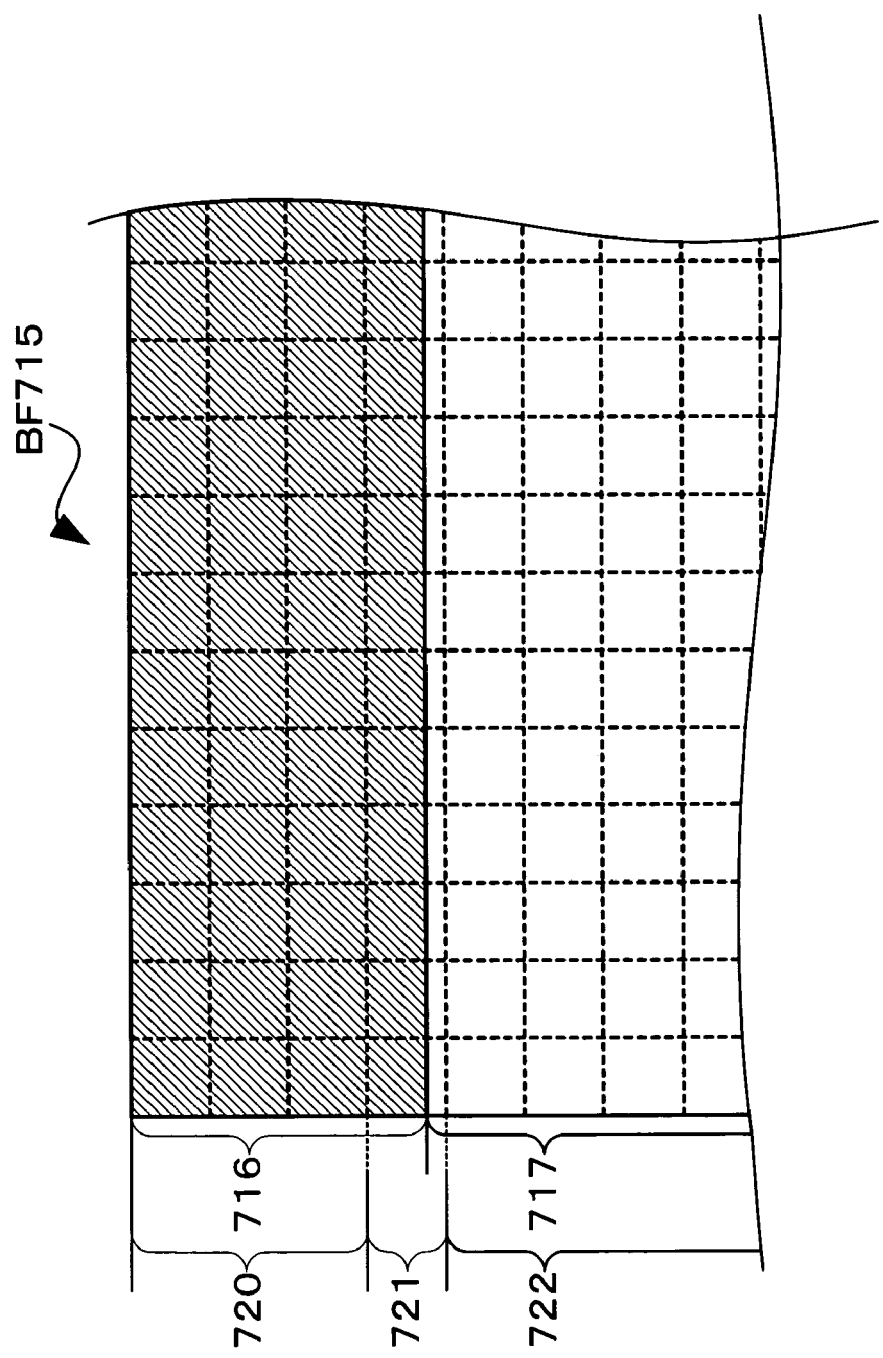
FIG. 38 describes the operation of a motion vector detecting unit.

With reference to FIG. 38, this will be further described. FIG. 38 is an enlarged view of the base frame BF715 in which the boundary portion between the interpolation inadequate area 716 and the interpolation adequate area 717 is enlarged. Here, the image block group 721 includes a boundary between the interpolation inadequate area 716 and the interpolation adequate area 717. The image block group 720 includes only the interpolation inadequate area 716. The image block group 722 includes only the interpolation adequate area 717.

The motion vector detecting unit 704 does not perform detection of motion vectors for image blocks that include the interpolation inadequate area 716 even in a small number, and regards the value of the motion vectors for the image block group 720 and the image block group 721 as [0].

In addition, the motion vector detecting unit 704 detects motion vectors for an image block group 722 that has image blocks except for the image block group 720 and the image block group 721.

The detection process by the motion vectors are performed by matching the pixel area of the reference frame that is an image frame to be an object for detecting a motion vector with each image block of the image block group 722.

(1-3) Operation of the Interpolation Frame Generating Unit 705

Figure 39:
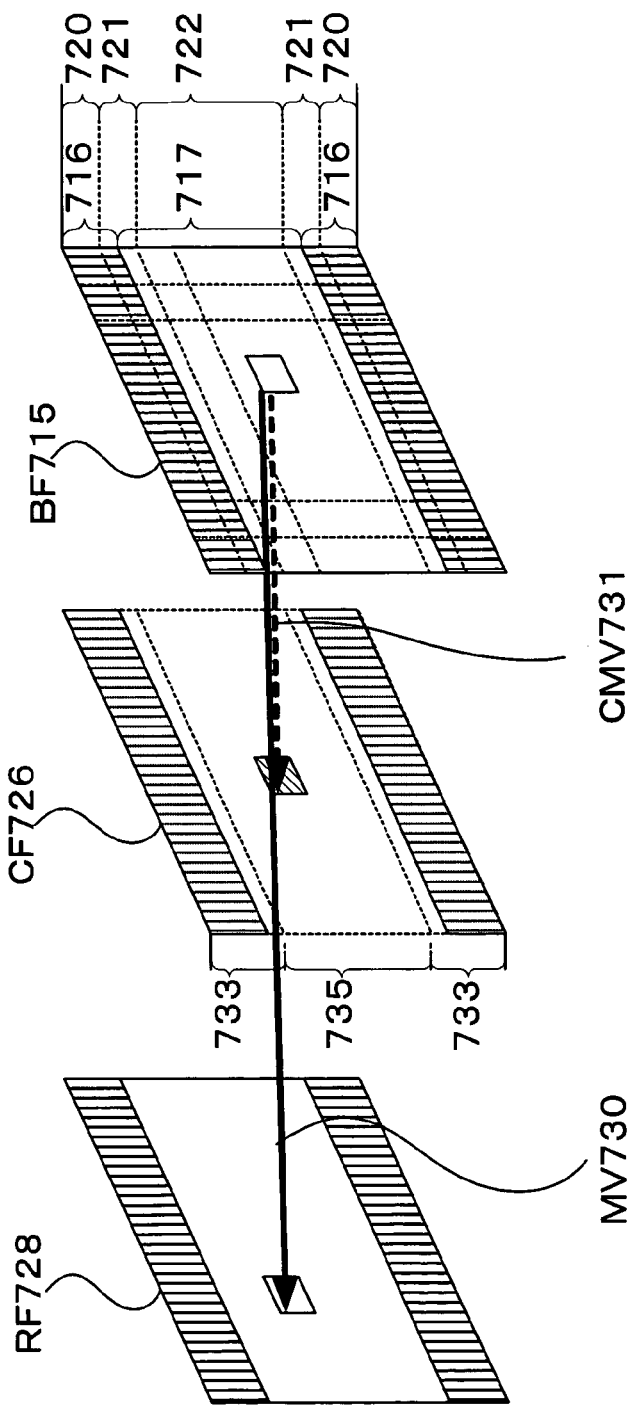
FIG. 39 describes the operation of an interpolation frame generating unit.

With reference to FIG. 39, an operation of the interpolation frame generating unit 705 will be described. The interpolation frame generating unit 705 generates the interpolation frame CF726 in accordance with a motion vector of the image block that forms the base frame BF715 obtained from the motion vector detecting unit 704.

Concerning the image block group 720 and the image block group 721, the motion vectors are regarded to have the value [0]. Therefore, the interpolation frame generating unit 705 regards the image block group 720 and the image block group 721 as static areas, so as to generate an interpolation pixel area 733 located at the same position as the image block group 720 and the image block group 721 in the interpolation frame CF726. More specifically, the image block group 720 and the image block group 721 including the interpolation inadequate area 716 are pasted on the interpolation pixel area 733 of the interpolation frame CF726.

Concerning each image block of the image block group 722, matching with a pixel area of the reference frame RF728 is performed so that the motion vector MV730 is obtained. The interpolation frame generating unit 705 calculates internal division of the motion vector MV730 by a ratio of the temporal distance between the base frame BF715 and the interpolation frame CF726 to the temporal distance between the base frame BF715 and the reference frame RF728, so as to derive an interpolation motion vector CMV731. In addition, the interpolation frame generating unit 705 moves each image block of the image block group 722 by the interpolation motion vector CMV731, so as to generate an interpolation pixel area 735 located at the same position as the image block group 722 in the interpolation frame CF726.

(2) Interpolation Frame Generation Method

Figure 40:
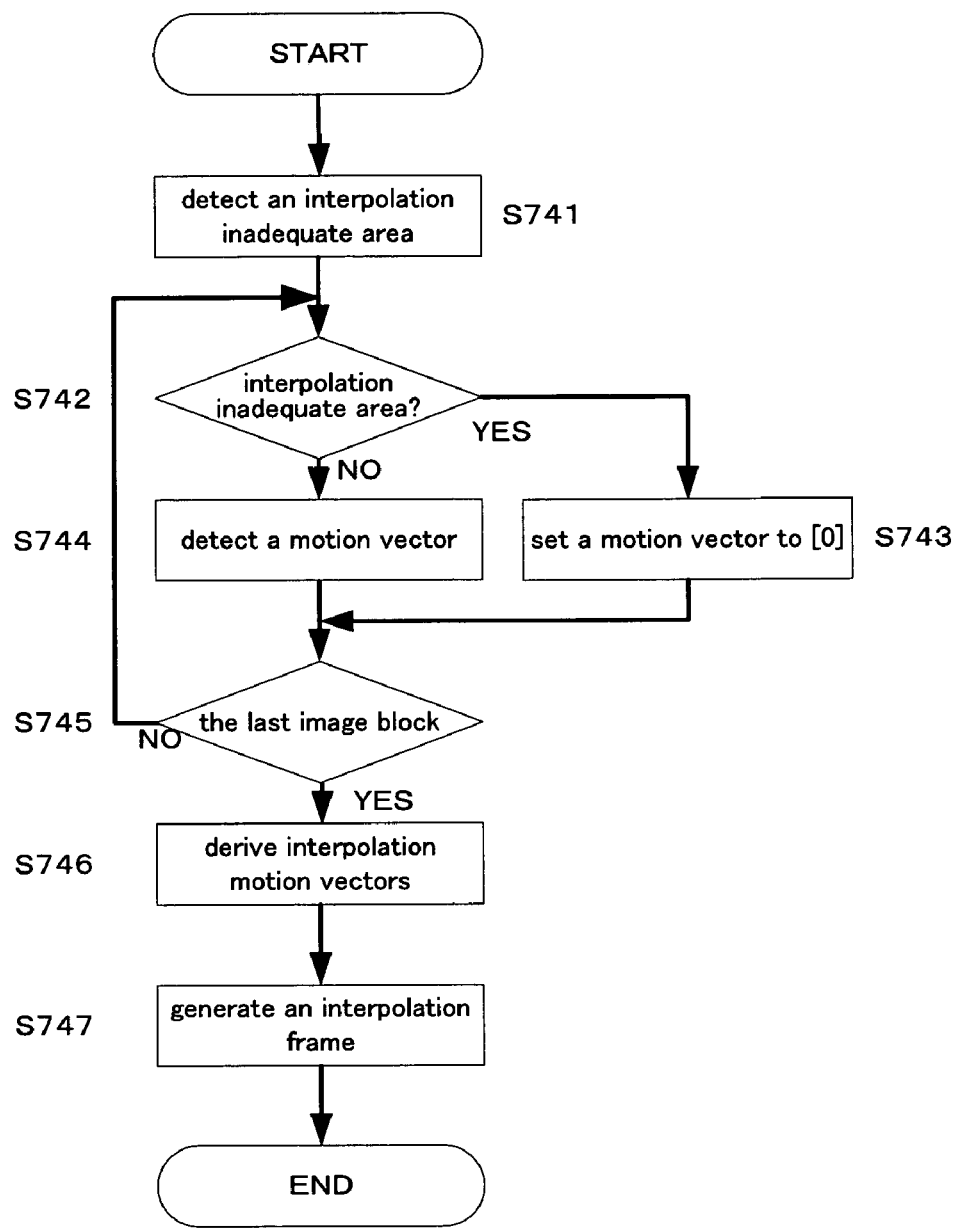
FIG. 40 is a flowchart showing an interpolation frame generation method according to the seventh embodiment of the present invention.

FIG. 40 shows a flowchart for describing the interpolation frame generation method by the interpolation frame generation device 701. A detailed description of each step is similar to that provided in (1), so a detailed description will be omitted.

The interpolation inadequate area detecting unit 703 detects an interpolation inadequate area in the image frame stored in the frame memory 702 (Step S741).

The motion vector detecting unit 704 decides whether or not the image block that forms the base frame BF715 includes the interpolation inadequate area 716 (Step S742) and regards a motion vector of the image block to have a value [0] if it includes the interpolation inadequate area (Step S743). If it does not include the interpolation inadequate area 716, it detects a motion vector of the image block (Step S744).

After motion vectors are detected for all image blocks (Step S745), the interpolation frame generating unit 705 derives interpolation motion vectors from the motion vectors (Step S746). Here, the interpolation motion vectors of the image blocks including the interpolation inadequate area are regarded to have a value [0]. In addition, interpolation motion vectors of the image blocks that do not include the interpolation inadequate area are derived by calculating internal division of the motion vector by a ratio of the temporal distance between the base frame BF715 and the interpolation frame CF726 to the temporal distance between the base frame BF715 and the reference frame RF728. Using the derived interpolation motion vectors, the image blocks that form the base frame BF715 are moved so that the interpolation frame CF726 is generated (Step S747).

(3) Effect of Seventh Embodiment

In the seventh embodiment of the present invention, the interpolation frame generation device 701 detects the interpolation inadequate area 716 and performs a special area compensation process for image blocks that include the interpolation inadequate area 716 so as to generate the interpolation frame CF726. Therefore, in the interpolation frame CF726, it is possible to prevent a distortion of an image at the outer frame area of the interpolation frame CF726, especially a distortion that can be generated easily in the interpolation frame CF726 at the boundary between an interpolation pixel area located at the same position as the interpolation inadequate area 716 and an interpolation pixel area located at the same position as the interpolation adequate area 717, so that the image quality of the interpolation frame CF726 is improved.

In addition, in the interpolation frame generation device 701, it is not required to detect the motion vectors for the image blocks that include the interpolation inadequate area 716. Therefore, the volume of calculation for generating the interpolation frame CF726 can be decreased.

In addition, between the process for image blocks that include an interpolation inadequate area 716 and the process for image blocks that do not include the interpolation inadequate area 716, operations are common except for the detection of motion vectors. Therefore, a hardware structure of the interpolation frame generation device 701 for generating the interpolation frame CF726 and a structure of a program for performing the interpolation frame generation method can be simplified.

Furthermore, in the above embodiment, a situation was described in which the interpolation frame CF726 is generated by the base frame BF715 whose aspect ratio is converted by the letter box method. However, the present invention can also be applied similarly to a situation in which the base frame BF715 is converted in its aspect ratio by the side panel method.

(4) Modifications of the Seventh Embodiment

The present invention is not limited to the embodiment described above but can be modified in a variety of ways within the scope thereof.

(4-1) Modifications of the Interpolation Inadequate Area Detecting Unit 703

(4-1-1)

The interpolation inadequate area detecting unit 703 may be one that that sets a predetermined interpolation inadequate area in an outer frame area of the image frame in accordance with an image size of the image frame stored in the frame memory 702.

If the output image signal 711 is displayed by overscan in a television set, a personal computer (PC), a cellular phone, or other devices that display an image signal and include the interpolation frame generation device 701, the outer frame area of the image frame that forms the output image signal 711 and the interpolation frame are not displayed. Therefore, when generating an interpolation frame, the area that is an outer frame area of the interpolation frame and is not displayed, i.e., an area except for a so-called safety zone, is used as an interpolation inadequate area, so that interpolation pixels that form the interpolation frame are not generated.

Thus, in the interpolation frame generation device 701, the volume of calculation for detecting an interpolation inadequate area can be decreased.

Furthermore, a value such as 80-90 percent of the entire image frame is set as a safety zone, for example.

(4-1-2)

The interpolation inadequate area detecting unit 703 may be one that acquires information indicating an interpolation inadequate area (hereinafter called interpolation inadequate area information) from the outside of the interpolation frame generation device 701 so as to decide the interpolation inadequate area.

Figure 41:
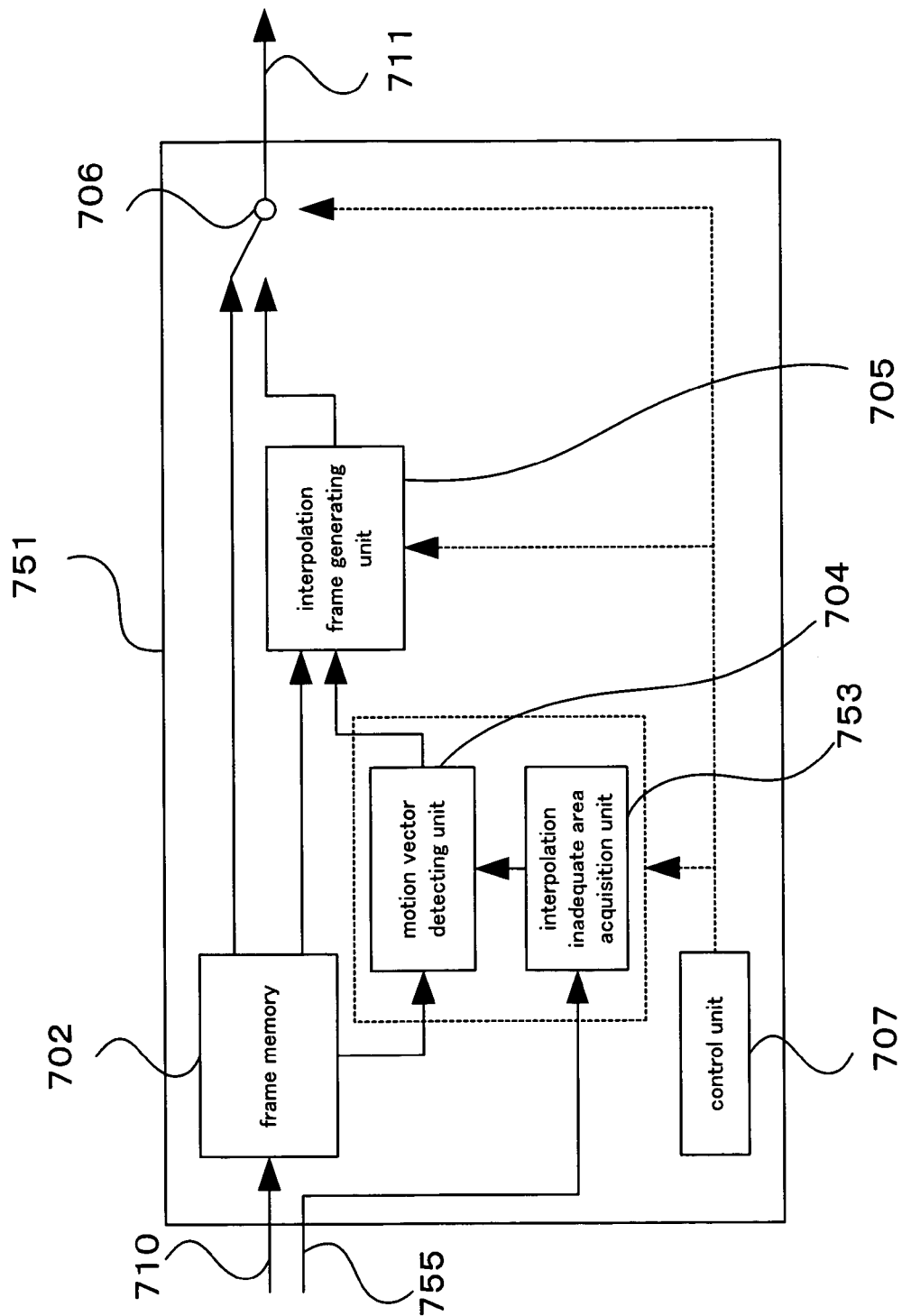
FIG. 41 is a block diagram showing the configuration of an interpolation frame generation device as a modification of the seventh embodiment of the present invention.

FIG. 41 shows an interpolation frame generation device 751 as a modification of the seventh embodiment. In FIG. 41, parts that have an operation similar to the interpolation frame generation device 701 (see FIG. 36) are denoted by the same reference numeral. The interpolation frame generation device 751 is different from the interpolation frame generation device 701 in that an interpolation inadequate area acquisition unit 753 is provided. Hereinafter, an operation of the interpolation inadequate area acquisition unit 753 will be described.

(1) Operation of the Interpolation Inadequate Area Acquisition Unit 753

The interpolation inadequate area acquisition unit 753 acquires interpolation inadequate area information 755 from the outside of the interpolation frame generation device 701.

The interpolation inadequate area information 755 is, for example, (i) a display size of the display device and a memory size of a frame memory (not shown) included in the display device, which are acquired from a display device (not shown) that displays the output image signal 711 that is interpolated by an interpolation frame, or (ii) information about an area in which the display device can display the output image signal 711 (a safety zone), or (iii) other information that indicates an interpolation inadequate area.

Figure 42:
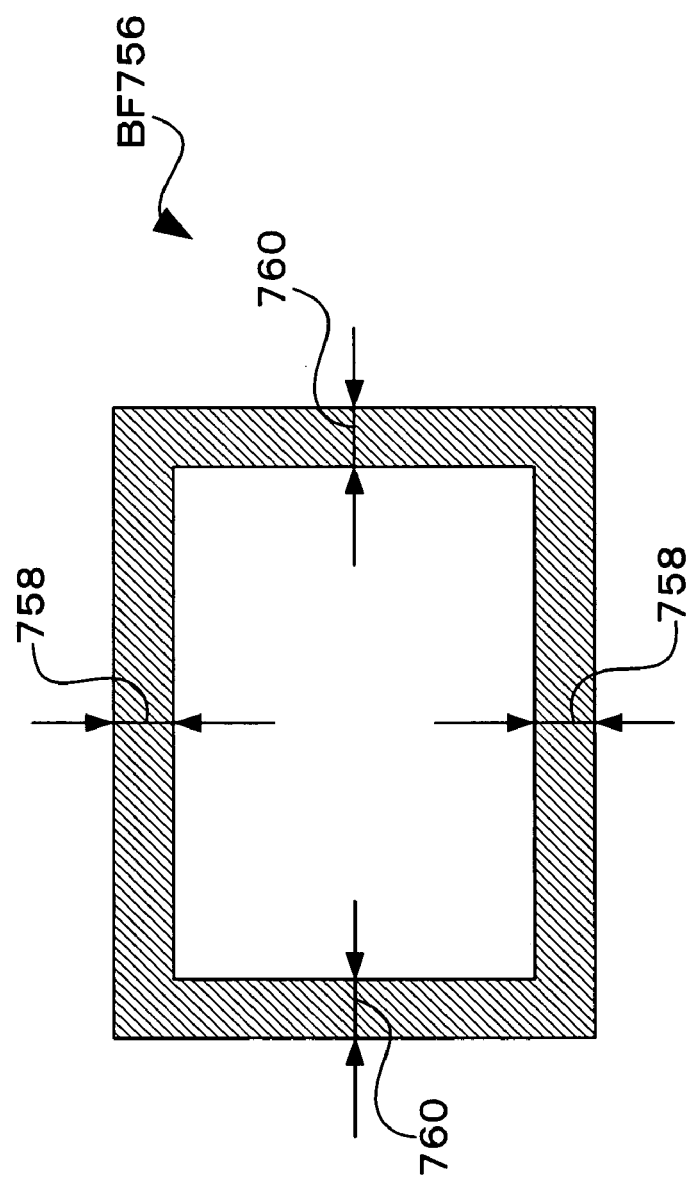
FIG. 42 describes the operation of an interpolation inadequate area acquisition unit.

With reference to FIG. 42, an operation of the interpolation inadequate area acquisition unit 753 will be described in a situation in which the interpolation inadequate area information 755 of (i) is acquired. When the interpolation inadequate area information 755 of (i) is acquired, the interpolation inadequate area acquisition unit 753 estimates an image size of the base frame BF756 to be a base for generating an interpolation frame in accordance with the memory size. Usually, the memory size corresponds to an image size of an image frame that forms the output image signal 711 and an interpolation frame, so the image size of the base frame can be estimated.

In addition, a difference 758 and a difference 760 between the estimated image size and the acquired display size are calculated. The interpolation inadequate area acquisition unit 753 informs the motion vector detecting unit 704 of the difference 758 and the difference 760 as interpolation inadequate areas.

Furthermore, the display size of the display device can be acquired from a driver program for operating the display device or an application program for displaying an output image signal 711 using a window in a display screen of the display device.

The interpolation inadequate area information 755 of (ii) is acquired from the display device, for example. The interpolation inadequate area acquisition unit 753 informs the motion vector detecting unit 704 of the number of horizontal and vertical lines that are overscanned and obtained from the display device as the interpolation inadequate area.

Furthermore, the interpolation inadequate area information 755 that is obtained from the display device is not limited to the number of horizontal and vertical lines that are overscanned but may be informed as a ratio of the safety zone to the entire image frame. The interpolation inadequate area acquisition unit 753 derives an interpolation inadequate area from the informed ratio of the safety zone, so as to inform the motion vector detecting unit 704 thereof.

The interpolation inadequate area information 755 of (iii) is acquired from a decoding device (not shown) for decoding a coded image signal, for example. If the coded image signal includes information that indicates an interpolation inadequate area, information indicating a decoded interpolation inadequate area is acquired as the interpolation inadequate area information 755 by the interpolation inadequate area acquisition unit 753.

(2) Effect of the Interpolation Inadequate Area Acquisition Unit 753

Using the interpolation inadequate area information 755 of (i)-(iii) an interpolation inadequate area that is, in general, located at the outer frame area of the base frame and is considered not to be adequate for the generation of an interpolation can be acquired.

For this interpolation inadequate area, the interpolation frame generating unit 705 generates an interpolation frame in the same way as described in the section titled "(1-3) Operation of the Interpolation Frame Generating Unit 705". Thus, visual effect of the outer frame area in the interpolation frame is improved.

In addition, it becomes possible to reduce a process for an area that is not displayed in the display device, so the volume of calculation for generating an interpolation frame can be decreased while gaining a similar visual effect.

Furthermore, the interpolation inadequate area acquisition unit 753 may acquire an image frame stored in the frame memory 702 from the frame memory 702. In this case, it is possible to perform an operation similar to the interpolation inadequate area detecting unit 703 that was described in the section titled "(1-1) Operation of the Interpolation Inadequate Area Detecting Unit 703".

(4-2) Modifications of the Motion Vector Detecting Unit 704

(4-2-1)

In the section titled "(1-2) Operation of the Motion Vector Detecting Unit 704", it is stated that a motion vector is not detected for the image block group 720 and the image block group 721 that include the interpolation inadequate area 716 of the base frame BF715 to be a base for generating the interpolation frame CF726 even in a small number (see FIGS. 37-39).

Here, the motion vector detecting unit 704 may divide the interpolation adequate area 717 newly into image blocks so as to detect motion vectors for the reference frame RF728.

Thus, the motion vectors are used for the entire area of the interpolation adequate area 717 so that an interpolation frame can be generated.

Figure 43A:
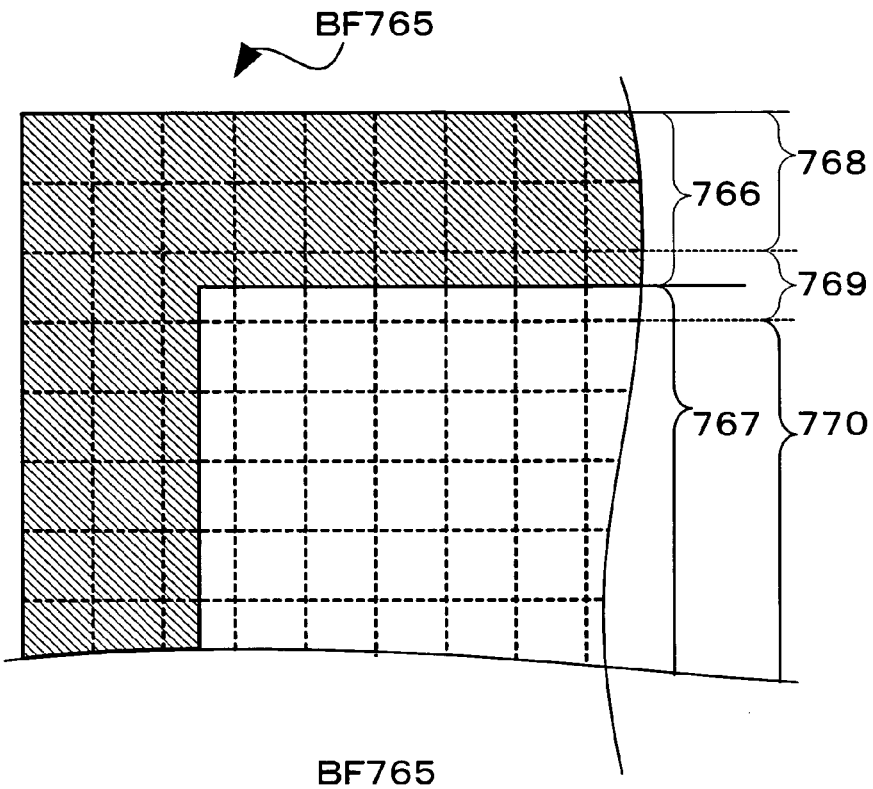
FIGS. 43A and 43B describe the operation of the motion vector detecting unit as a modification of the seventh embodiment of the present invention.
Figure 43B:
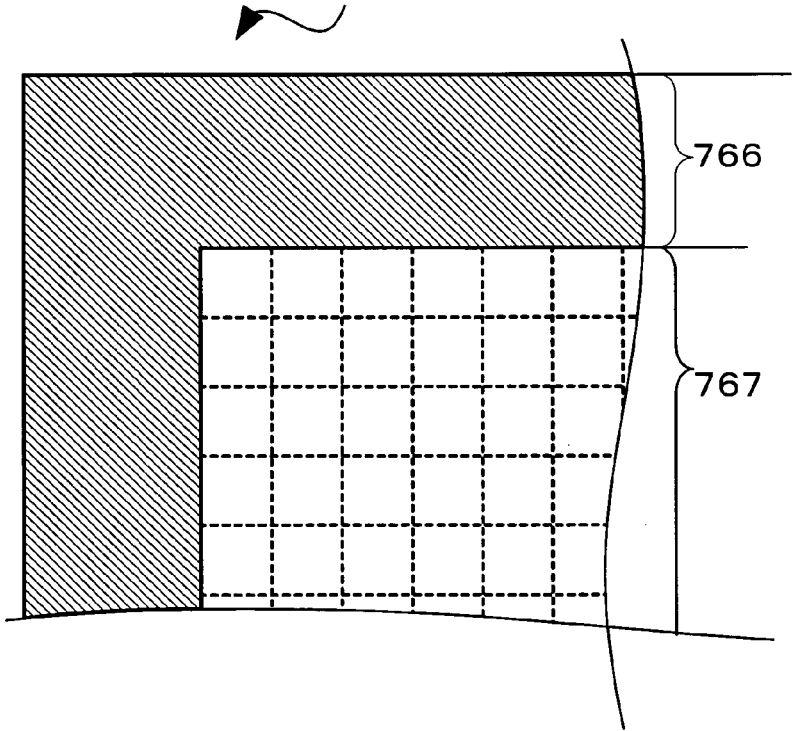

With reference to FIGS. 43A and 43B, the operation of the motion vector detecting unit 704 as a modification of the present invention will be described. FIGS. 43A and 43B are enlarged views of the base frame BF765 to be a base for generating an interpolation frame, in which the outer frame area is enlarged.

For the base frame BF765, an interpolation inadequate area 766 (a hatching area in FIGS. 43A and 43B) and an interpolation adequate area 767 are obtained by the interpolation inadequate area detecting unit 703 (see FIG. 36) or the interpolation inadequate area acquisition unit 753 (see FIG. 41).

FIG. 43A shows the state where the entire area of the base frame BF765 is uniformly divided into image blocks. The image block group 769 has image blocks that include a boundary between the interpolation inadequate area 766 and the interpolation adequate area 767. The section titled "(1-2) Operation of the Motion Vector Detecting Unit 704" states that the detection of motion vectors is not performed for this image block group 769.

On the other hand, FIG. 43B shows the state where the interpolation adequate area 767 of the base frame BF765 is uniformly divided into image blocks. This motion vector detecting unit 704 detects motion vectors of the image blocks that are obtained by uniformly dividing the interpolation adequate area 767.

The interpolation frame generating unit 705 uses the detected motion vectors and the interpolation adequate area 767 of the base frame BF765 for performing area compensation of the interpolation pixel area that is located at the same position as the interpolation adequate area 767 in the interpolation frame. In addition, with regard to the interpolation pixel area that is located at the same position as the interpolation inadequate area 766 in the interpolation frame, the interpolation inadequate area 766 of the base frame BF765 is used just as it is, for example. An operation of this interpolation frame generating unit will be described later in Section (4-3) as a modification of the interpolation frame generating unit 705.

By means of this modified motion vector detecting unit 704, an interpolation frame can be generated accurately for the interpolation adequate area 767 including a boundary between the same and the interpolation inadequate area 766.

Furthermore, the effect of the present invention does not depend on a size or a shape of the image block of the interpolation adequate area 767, and it is possible that the interpolation adequate area 767 is not divided uniformly.

(4-2-2)

The section titled "(1-2) Operation of the Motion Vector Detecting Unit 704" states that the detection of motion vectors is performed by matching a pixel area of the reference frame (that is an image frame to be an object of the detection of motion vectors) with image blocks that do not include the interpolation inadequate area in a base frame that is a base for generating an interpolation frame.

Here, it is possible that the matching is performed between the image blocks that do not include the interpolation inadequate area in the base frame and the area that is obtained by extending the interpolation adequate area of the reference frame outward so that motion vectors can be detected.

Thus, more accurate motion vectors can be detected.

Figure 44B:
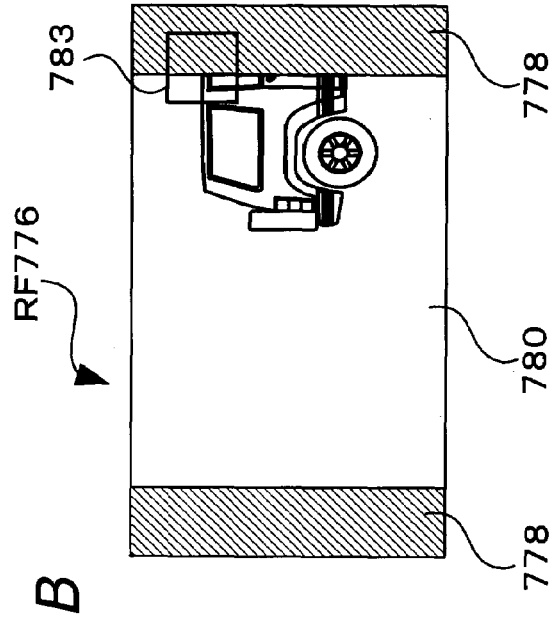
FIGS. 44A-44C describe the operation of the motion vector detecting unit as a modification of the seventh embodiment of the present invention.
Figure 44C:
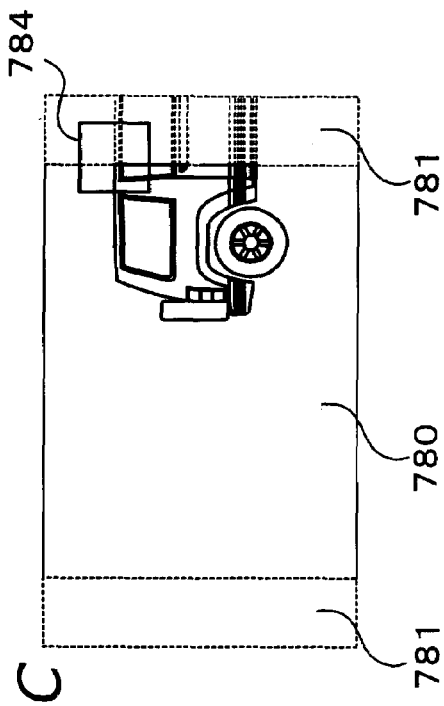
Figure 44A:
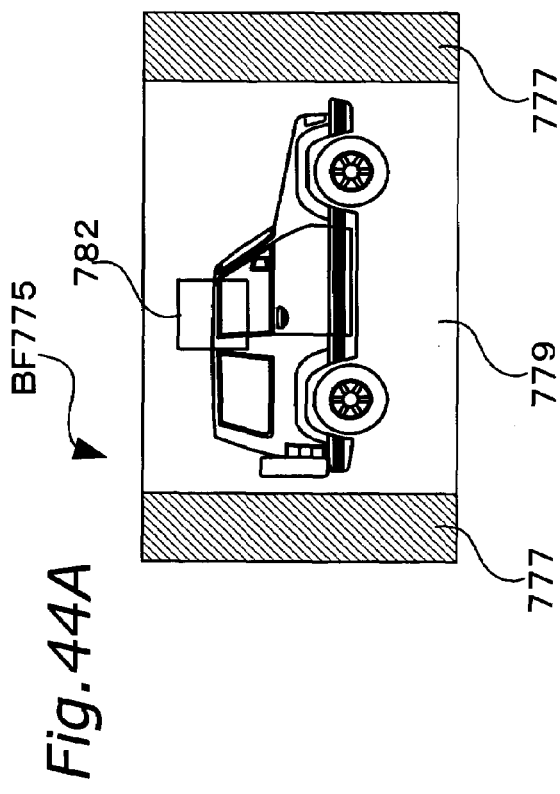

With reference to FIG. 44, an operation of the motion vector detecting unit 704 as a modification will be described. FIG. 44 shows a base frame BF775 to be a base for generating an interpolation frame and a reference frame RF776 to be an object for detecting motion vectors (see FIG. 44A and 44B).

For the base frame BF775 and the reference frame RF776, an interpolation inadequate area 777 and an interpolation inadequate area 778 are obtained, respectively. The base frame BF775 and the reference frame RF776 are image frames that are obtained by the conversion of an aspect ratio by the side panel method, for example.

When detecting a motion vector for an image block 782 of an interpolation adequate area 779 of the base frame BF775, it is difficult to detect a motion vector for a pixel area 783, which is a motion vector to be detected originally even if the matching with pixel areas of the reference frame RF776 are performed. This is because that the pixel area 783 is framing out of an interpolation adequate area 780 of the reference frame RF776.

Therefore, an outside reference area 781 that is an area obtained by enlarging the interpolation adequate area 780 of the reference frame RF776 outward is referred so that the motion vector is detected. The enlarged area is obtained by duplicating pixels located at the outer rim of the interpolation adequate area 780 outward (see FIG. 44C).

Thus, matching between the image block 782 and a pixel area 784 of the outside reference area 781 of the reference frame RF776 can be performed.

By this detection of motion vectors, more appropriate motion vectors can be detected for image blocks that can frame out by a movement such as a pan or a tilt of the base frame BF775. Therefore, image quality of an interpolation frame is further improved.

Furthermore, this detection of motion vectors can be applied to the detection of motion vectors in each of the above embodiments.

(4-3) Modifications of the Interpolation Frame Generating Unit 705

(4-3-1)

In the above "(1-3) Operation of the Interpolation Frame Generating Unit 705", the area compensation process is performed for the interpolation pixel area 733 that is located at the same position in the interpolation frame CF726 in a unit of image block including the interpolation inadequate area 716 (see FIG. 39).

Here, the interpolation frame generating unit 705 may perform the area compensation process for the interpolation pixel area that is located at the same position in the interpolation frame CF726 in a unit of pixel of the interpolation inadequate area 716.

With reference to FIG. 45, an operation of the interpolation frame generating unit 705 as a modification will be described. The interpolation frame generating unit 705 as a modification generates an interpolation frame CF786 on the basis of the base frame BF785.

It is assumed that an interpolation inadequate area 787 and an interpolation adequate area 788 are obtained for the base frame BF785 by the interpolation inadequate area detecting unit 703 (see FIG. 36) or the interpolation inadequate area acquisition unit 753 (see FIG. 41).

The motion vector detecting unit 704 described in Section (4-2-1) divides the interpolation adequate area 788 into image blocks and detects a motion vector for each of the image blocks. The interpolation frame generating unit 705 as a modification generates an interpolation pixel area 790 that is located at the same position as the interpolation adequate area 788 in accordance with the detected motion vectors and the interpolation adequate area 788.

In addition, the interpolation frame generating unit 705 as a modification generates the interpolation pixel area 789 that is located at the same position as the interpolation inadequate area 787 by one of two types of area compensation processes.

The two types of area compensation process are, for the interpolation pixel area 789 of the interpolation frame CF786, (i) duplicating pixels of interpolation inadequate area 787 of the base frame BF785 to the same position of the interpolation frame CF786, and (ii) performing area compensation of the interpolation pixel area 789 by a predetermined pixel value.

Here, a predetermined pixel value in (ii) is, for example, a predetermined pixel value (for example, a pixel value indicating black color), a pixel value representing the interpolation inadequate area 787 (for example, an average of the pixel values of the interpolation inadequate area 787, or a pixel value of a typical point thereof).

Thus, it is possible to prevent a distortion of an image in the outer frame area of the interpolation frame CF786, especially a distortion that is easily generated at the boundary between the interpolation pixel area 789 at the interpolation pixel area 790, so that image quality of the interpolation frame CF786 is improved. In addition, since it is sufficient to detect a motion vector for the interpolation adequate area 788 of the base frame BF785, the volume of calculation for generating the interpolation frame CF786 can be decreased.

Furthermore, the interpolation frame generating unit 705 as a modification may obtain the position of the interpolation inadequate area 787 from the motion vector detecting unit 704 as a modification, or from the interpolation inadequate area detecting unit 703 (see FIG. 36), or from the interpolation inadequate area acquisition unit 753 (see FIG. 41).

(4-4) Others

The detection of an interpolation inadequate area is not required to be performed for all base frames to be bases for generating an interpolation frame, but it is possible to use an interpolation inadequate area that is once detected in a plurality of the generation of an interpolation. In addition, not only for the interpolation frame but also for an image frame that is interpolated by the interpolation frame, it is possible to perform the area compensation of a part of the image frame by using interpolation inadequate area detected for the other image frames.

(1) Operation of the Interpolation Frame Generation Device 801

Figure 46:
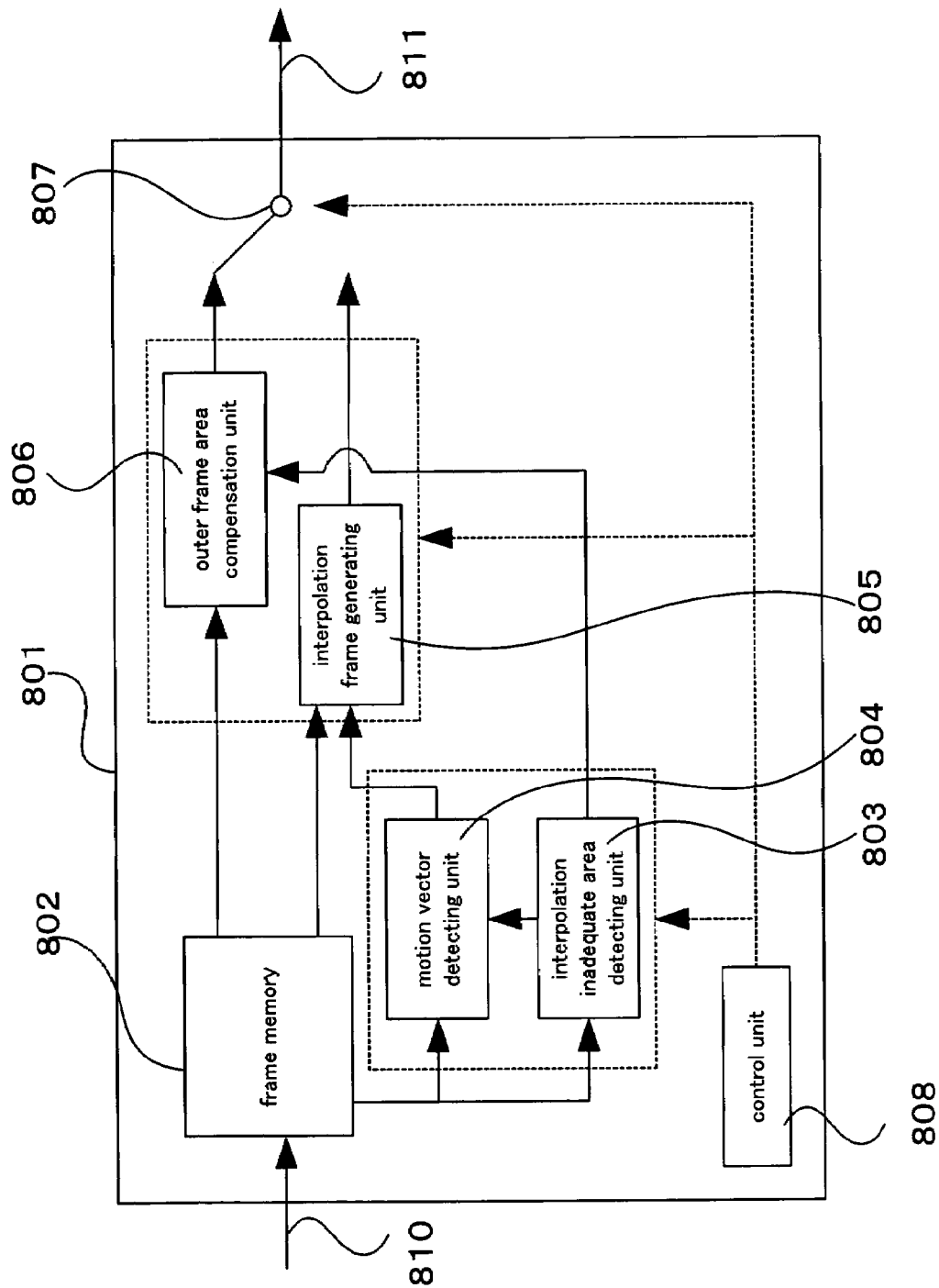
FIG. 46 is a block diagram showing the configuration of an interpolation frame generation device as a modification of the seventh embodiment of the present invention.

FIG. 46 shows an interpolation frame generation device 801 as a modification of the seventh embodiment. The interpolation frame generation device 801 is a device that generates an interpolation frame for interpolating image frames from image frames that form an image signal in a television set, a personal computer (PC), a cellular phone, or other devices that display an image signal.

The interpolation frame generation device 801 includes a frame memory 802, an interpolation inadequate area detecting unit 803, a motion vector detecting unit 804, an interpolation frame generating unit 805, an outer frame area compensation unit 806, a signal switching unit 807, and a control unit 808.

The frame memory 802 stores an input image signal 810 for each image frame.

The interpolation inadequate area detecting unit 803 performs the detection of an interpolation inadequate area in every predetermined number for images frame stored in the frame memory 802. An operation of the detection is similar to that described in the section titled "(1-1) Operation of the Interpolation inadequate Area Detecting Unit 703", so a description thereof will be omitted.

Here, the predetermined number can be set freely. In addition, if the input image signal 810 is a signal obtained by decoding a coded image signal, for example, it can be performed in every image frame that is intra-picture coded.

Hereinafter, the image frame in which the detection of an interpolation inadequate area is performed is called a "detection target frame", while the image frame in which the detection is not performed is called a "non-detection frame".

In addition, the interpolation inadequate area detecting unit 803 informs the motion vector detecting unit 804 and the outer frame area compensation unit 806 of an interpolation inadequate area detected for the detection target frame.

The motion vector detecting unit 804 performs an operation that is similar to that of the motion vector detecting unit 704 described above in Section (4-2-1). More specifically, an interpolation adequate area in the detection target frame and the non-detection frame are newly divided into image blocks, so that a motion vector of each image block is detected.

Here, the interpolation adequate area is decided in accordance with an interpolation inadequate area obtained from the interpolation inadequate area detecting unit 803. More specifically, for the non-detection frame, an interpolation inadequate area that is obtained for a detection target frame is used so that the interpolation adequate area is decided.

The interpolation frame generating unit 805 generates an interpolation pixel area in the interpolation frame, which is located at the same position as the interpolation adequate area of the detection target frame in accordance with the interpolation adequate area of the detection target frame or the interpolation adequate area of the non-detection frame and a motion vector detected for each of the same.

In addition, interpolation frame generating unit 805 performs the area compensation of an interpolation pixel area in the interpolation frame that is located at the same position as the interpolation inadequate area in the detection target frame by a predetermined pixel value (for example, a pixel value indicating black color).

The outer frame area compensation unit 806 performs the area compensation of a pixel area in the image frame stored in the frame memory 802 that is located at the same position as the interpolation inadequate area in the detection target frame by a predetermined pixel value (for example, a pixel value indicating black color).

The signal switching unit 807 switches between an image frame that is area-compensated by the outer frame area compensation unit 806 and an interpolation frame generated by the interpolation frame generating unit 805 so as to make an output image signal 811. The control unit 707 delivers control signals that are necessary for operating the interpolation inadequate area detecting unit 803, a motion vector detecting unit 804, an interpolation frame generating unit 805, an outer frame area compensation unit 806 and a signal switching unit 706.

(2) Effect of the Interpolation Frame Generation Device 801

Figure 47A:
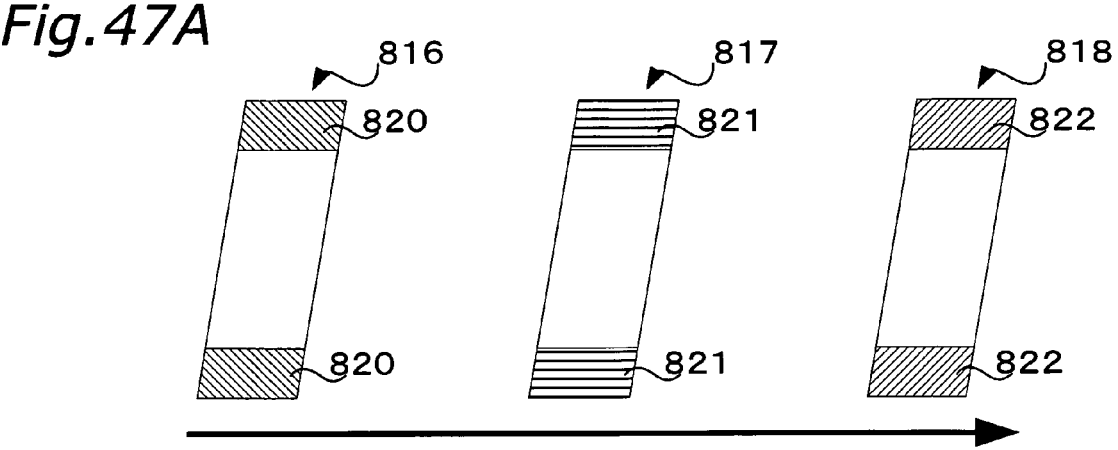
FIGS. 47A and 47B describe an effect of the interpolation frame generation device.
Figure 47B:
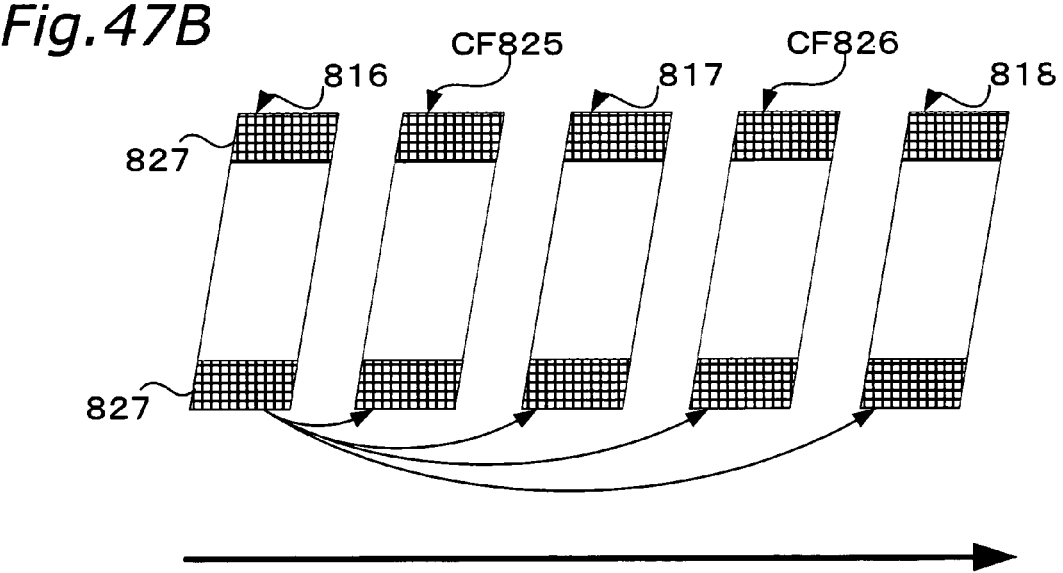

With reference to FIGS. 47A and 47B, effect of the interpolation frame generation device 801 will be described.

FIG. 47A shows image frames 816-818 that form the input image signal 810 that is supplied to the interpolation frame generation device 801. The input image signal 810 is an image whose aspect ratio is converted by the letter box method and has upper and lower band-like areas 820-822.

FIG. 47B shows image frames 816-818 that form the output image signal 811 and interpolation frames CF825 and CF826 obtained by the interpolation frame generation device 801.

For the image frame 816, the band-like area 820 is detected as an interpolation inadequate area 827. More specifically, the image frame 816 corresponds to the above-mentioned "detection target frame", while the image frames 817 and 818 correspond to the above-mentioned "non-detection frame".

In the image frames 816-818 and the interpolation frames CF825 and CF826, the pixel area that is located at the same position as the interpolation inadequate area 827 of the image frame 816 is area-compensated by a predetermined pixel value (for example, a pixel value indicating black color). More specifically, in the output image signal 811, the area compensation of the pixel area is performed not only for the interpolation frames CF825 and CF826 but also for the image frames 816-818.

For this reason, in the interpolation frame generation device 801, even if there is a probability of fluctuations in the detection of an interpolation inadequate area of each image frame that forms the input image signal 810, the area compensation can be performed by a uniform pixel value including an interpolation frame. In addition, the pixel area to be area-compensated has a uniform size. Thus, a visual impression of the output image signal 811 is improved.

Eighth Embodiment

In an eighth embodiment of the present invention, applied examples of an interpolation frame generation method, an interpolation frame generation program, an interpolation frame generation device and a system using the same will be described with reference to FIG. 48-FIG. 51.

Figure 48:
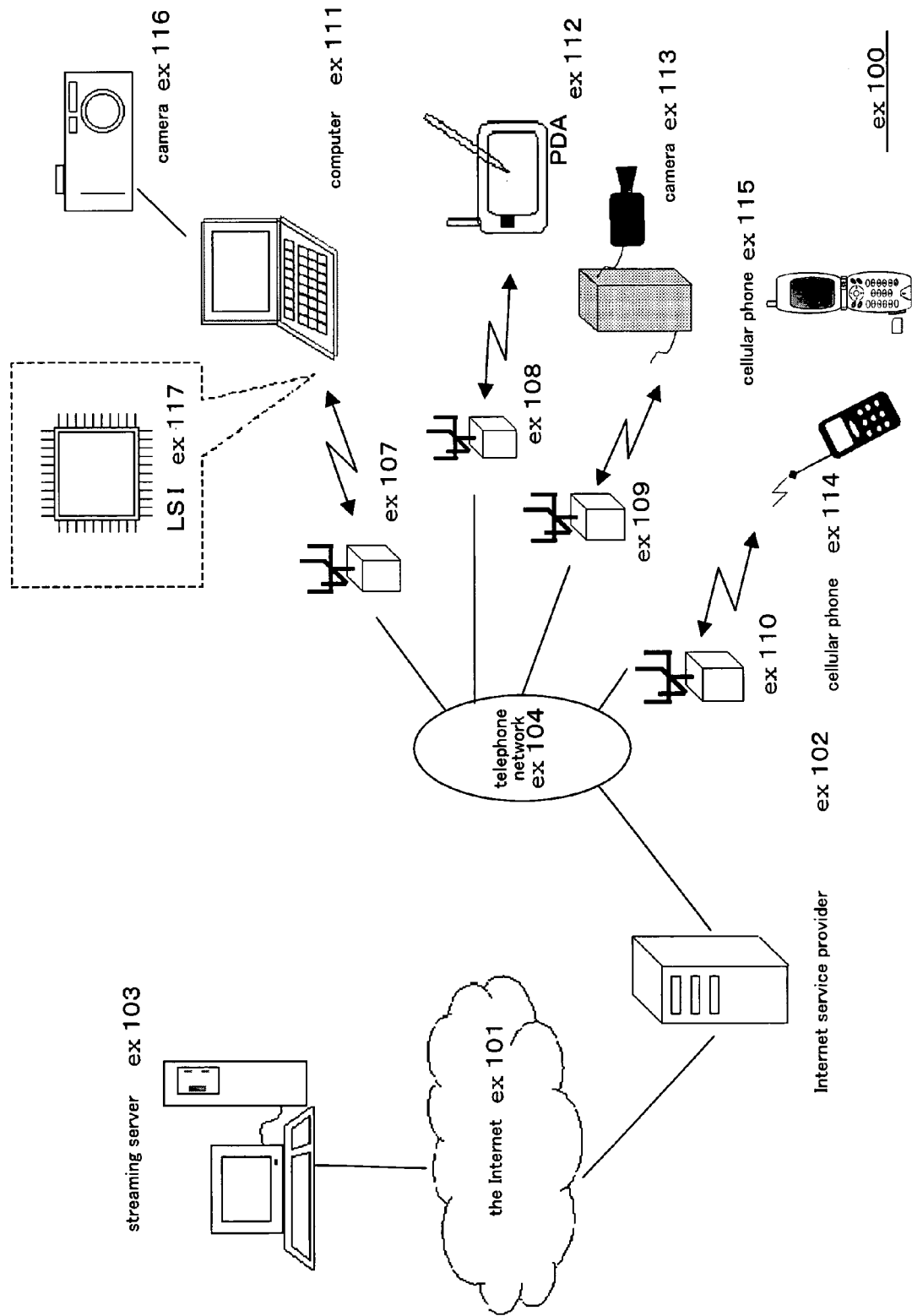
FIG. 48 is a block diagram showing the entire configuration of a content supplying system.

FIG. 48 is a block diagram showing the overall configuration of a content supply system ex100 that effectuates a content delivery service. An area where a communication service is provided is divided into cells of a desired size, and base stations ex107-ex110 (that are fixed radio stations) are installed in the cells, respectively.

In this content supply system ex100, devices such as a computer ex111, a personal digital assistant (PDA) ex112, a camera ex113, a cellular phone ex114, a cellular phone with camera ex115 are connected to the Internet ex101 via an Internet service provider ex102, a telephone network ex104 and base stations ex107-ex110, for example.

However, the content supply system ex100 is not limited to the combination as shown in FIG. 48, but any of them can be combined to connect with each other. In addition, each of the devices may be connected to the telephone network ex104 directly without using the base stations ex107-ex110 that are fixed radio stations.

The camera ex113 is a device such as a digital video camera that can take a moving picture. In addition, the cellular phone may be any one of communication modes including a PDC (Personal Digital Communications) mode, a CDMA (Code Division Multiple Access) mode, a W-CDMA (Wideband-Code Division Multiple Access) mode, a GSM (Global System for Mobile Communications) mode, and a PHS (Personal Handyphone System) mode.

In addition, a streaming server ex103 is connected to the camera ex113 via the base station ex109 and the telephone network ex104, so that a live broadcast can be performed by using the camera ex113 in accordance with coded data transmitted by a user. The coding process of data of a taken picture can be performed either by the camera ex113 or by the server that transmits the data. In addition, data of a moving picture taken by the camera ex116 may be transmitted to the streaming server ex103 via the computer ex111. The camera ex116 is a device such as a digital camera that can take a still picture and a moving picture. In this case, coding of the data of the moving picture can be performed by the camera ex116 or by the computer ex111. In addition, the coding process is performed by an LSI ex117 included in the computer ex111 or the camera ex116. Furthermore, image coding and decoding software may be installed in a storage medium that is a recording medium that the computer ex111 can read (such as a CD-ROM, a flexible disk, and a hard disk). In addition, a cellular phone with camera ex115 may be used for transmitting a moving picture. In this case, the data of the moving picture are coded by an LSI included in the cellular phone ex115.

In this content supply system ex100, a user creates content (for example, a picture of a music live) by the camera ex113 or the camera ex116 and transmits the content to the streaming server ex103 after coding process, while the streaming server ex103 delivers the contents data as a stream to a client that requested the delivery. The client can be the computer ex111, the PDA ex112, the camera ex113, the cellular phone ex114 or others that can decode the coded data. In this way, the content supply system ex100 enables the client to receive coded data and to reproduce the same. It also enables the client to receive, to decode and reproduce in real time, so that a personal broadcasting can be effectuated. In addition, when reproducing the contents, the interpolation frame generation program can be used that can effectuate the interpolation frame generation device, the interpolation frame generation method or the interpolation frame generation method described above as each embodiment. For example, the computer ex111, the PDA ex112, the camera ex113, the cellular phone ex114 and others can include the interpolation frame generation program for effectuating the interpolation frame generation method described in the above embodiments.

An example regarding a cellular phone will now be described.

Figure 49:
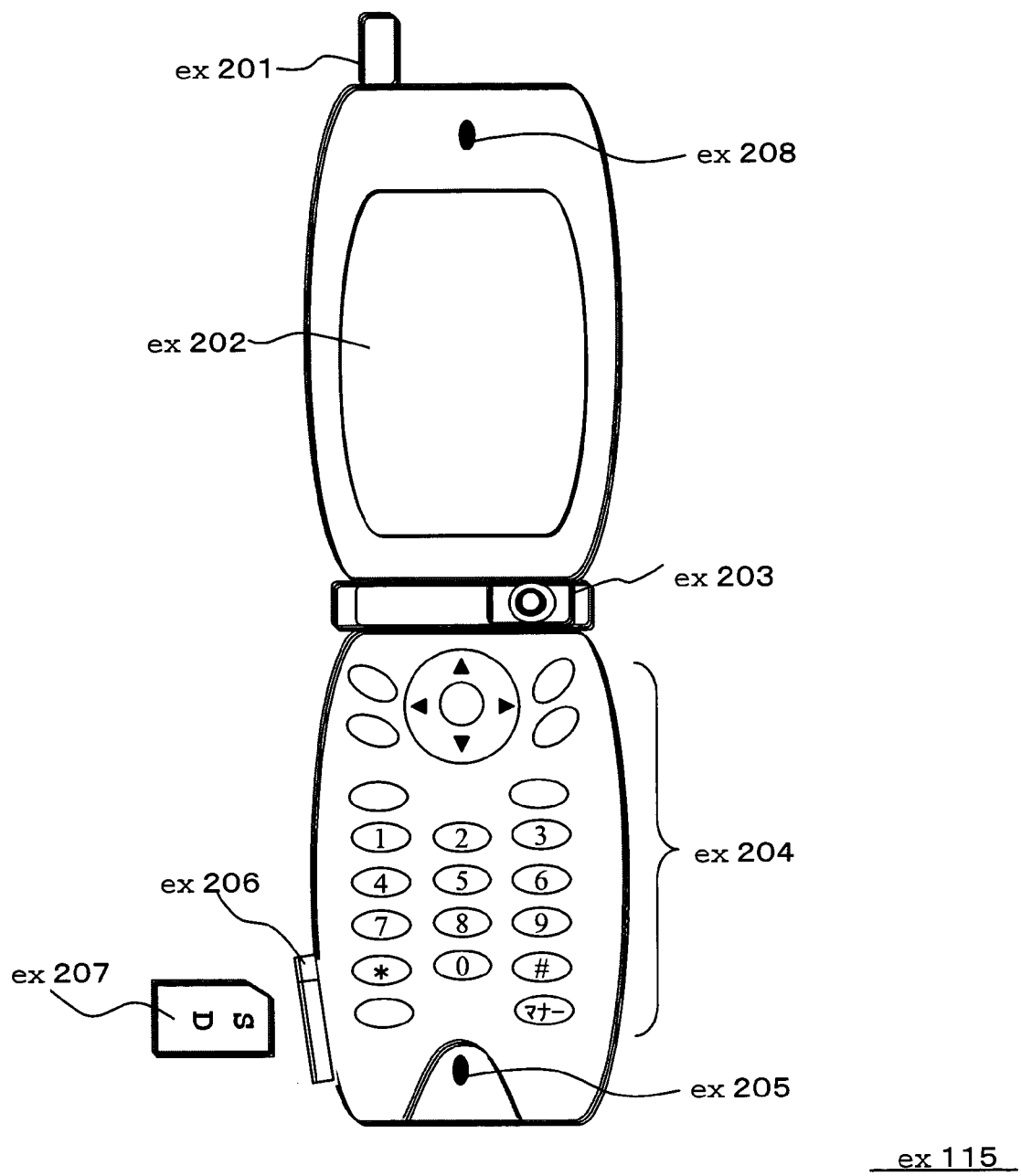
FIG. 49 shows an example of a cellular phone that includes an interpolation frame generation device according to the present invention.

FIG. 49 shows a cellular phone ex115 that uses the interpolation frame generation device of each of the above embodiments. The cellular phone ex115 includes an antenna ex201 for sending and receiving radio waves to and from the base station ex110, a camera unit ex203 such as a CCD camera that can take a still picture, a display unit ex202 such as a liquid crystal display that displays data obtained by decoding images taken by the camera unit ex203 or images received by the antenna ex201, a main body including a group of operation keys ex204, a sound producing unit ex208 such as a speaker for producing sounds, a sound input unit ex205 such as a microphone for inputting sounds, a storage medium ex207 for storing coded or decoded data such as data of moving or still images that were taken, data of e-mail that were received, data of moving pictures or still pictures, and a slot unit ex206 for enabling the storage medium ex207 to be inserted in the cellular phone ex115. The storage medium ex207 is e.g., an SD card that includes a flash memory, one type of nonvolatile memory, i.e., an EEPROM (Electrically Erasable and Programmable Read Only Memory) that can be rewritten or erased electrically housed in a plastic case.

In addition, the cellular phone ex115 will be described with reference to FIG. 50. In the cellular phone ex115, a mail control unit ex311 that controls integrally each unit of the main body unit including a display unit ex202 and operation keys ex204 is connected via a synchronizing bus ex313 to a power source circuit unit ex310, an operational input control unit ex304, an image coding unit ex312, a camera interface unit ex303, an LCD (Liquid Crystal Display) control unit ex302, an interpolation frame generating unit ex314, an image decoding unit ex309, a demultiplexing unit ex308, a recording and reproducing unit ex307, a modulation demodulation circuit unit ex306 and a sound processing unit ex305.

The power source circuit unit ex310 activates the digital cellular phone with camera ex115 to the working state by supplying electric power from a battery pack to each unit when the user turns on an end call/power key.

The cellular phone ex115 converts a sound signal collected by the sound input unit ex205 during a sound communication mode into digital sound data by the sound processing unit ex305 in accordance with the control by the mail control unit ex311 including a CPU, a ROM and a RAM, performs a spread spectrum process of the data by the modulation demodulation circuit unit ex306, performing a digital-to-analog conversion process and a frequency conversion process by a transmission and reception circuit unit ex301 and then transmits the data via the antenna ex201. In addition, the cellular phone ex115 amplifies a received signal that is received by the antenna ex201 during the sound communication mode, performs a frequency conversion process and an analog-to-digital conversion process, performing an inverse spread spectrum process by the modulation demodulation circuit unit ex306, converts the data into an analog sound signal by the sound processing unit ex305, and then produce the sound by the sound producing unit ex208.

In addition, if electronic mail is transmitted in the data communication mode, text data of the electronic mail that is entered by operation of the operation key ex204 of the main body unit are delivered via the operational input control unit ex304 to the mail control unit ex311. The mail control unit ex311 performs the spread spectrum process of the text data by the modulation demodulation circuit unit ex306, performs the digital-to-analog conversion process and the frequency conversion process by the transmission and reception circuit unit ex301, and then transmits the signal to the base station ex110 via the antenna ex201.

When the image data is transmitted in the data communication mode, the image data that are taken by the camera unit ex203 are supplied to the image coding unit ex312 via the camera interface unit ex303. In addition, if the image data are not transmitted, the image data that are taken by the camera unit ex203 can be displayed directly by the display unit ex202 via the camera interface unit ex303 and the LCD control unit ex302.

The image coding unit ex312 converts the image data supplied from the camera unit ex203 into coded image data by compression coding thereof and deliver the data to the demultiplexing unit ex308. In addition, at the same time, the cellular phone ex115 transmits the sound collected by the sound input unit ex205 when a picture is taken by the camera unit ex203 via the sound processing unit ex305 to the demultiplexing unit ex308 as digital sound data.

The demultiplexing unit ex308 performs the spread spectrum process of the multiplexed data, which is obtained by multiplexing coded image data supplied from the image coding unit ex312 and sound data supplied from the sound processing unit ex305 by a predetermined method, by the modulation demodulation circuit unit ex306, performs the digital-to-analog conversion process and the frequency conversion process by the transmission and reception circuit unit ex301, and then transmits the signal via the antenna ex201.

When data of a moving image file that is linked to web pages are received in the data communication mode, a received signal that is received from the base station ex110 via the antenna ex201 is processed by the inverse spread spectrum process in the modulation demodulation circuit unit ex306, so that the multiplexed data obtained by the process is delivered to the demultiplexing unit ex308.

In addition, in order to decode the multiplexed data received via the antenna ex201, the demultiplexing unit ex308 separates and divides the multiplexed data into a coded bit stream of image data and a coded bit stream of sound data, and supplies the coded image data to the image decoding unit ex309 via the synchronizing bus ex313 while it supplies the sound data to the sound processing unit ex305.

Next, the image decoding unit ex309 decodes the coded bit stream of image data so as to generate reproduction moving image data, which are supplied to the display unit ex202 via the LCD control unit ex302. Thus, moving image data included in a moving image file that is linked to a web page is displayed, for example. In addition, the interpolation frame generating unit ex314 generates data for interpolating reproduction moving image data by the interpolation frame generation method of each embodiment described above, so as to reproduce the reproduction moving image data. At the same time, the sound processing unit ex305 converts the sound data into an analog sound signal, and supplied the signal to the sound producing unit ex208. Thus, sound data included in a moving image file that is linked to a web page can be reproduced.

Figure 51:
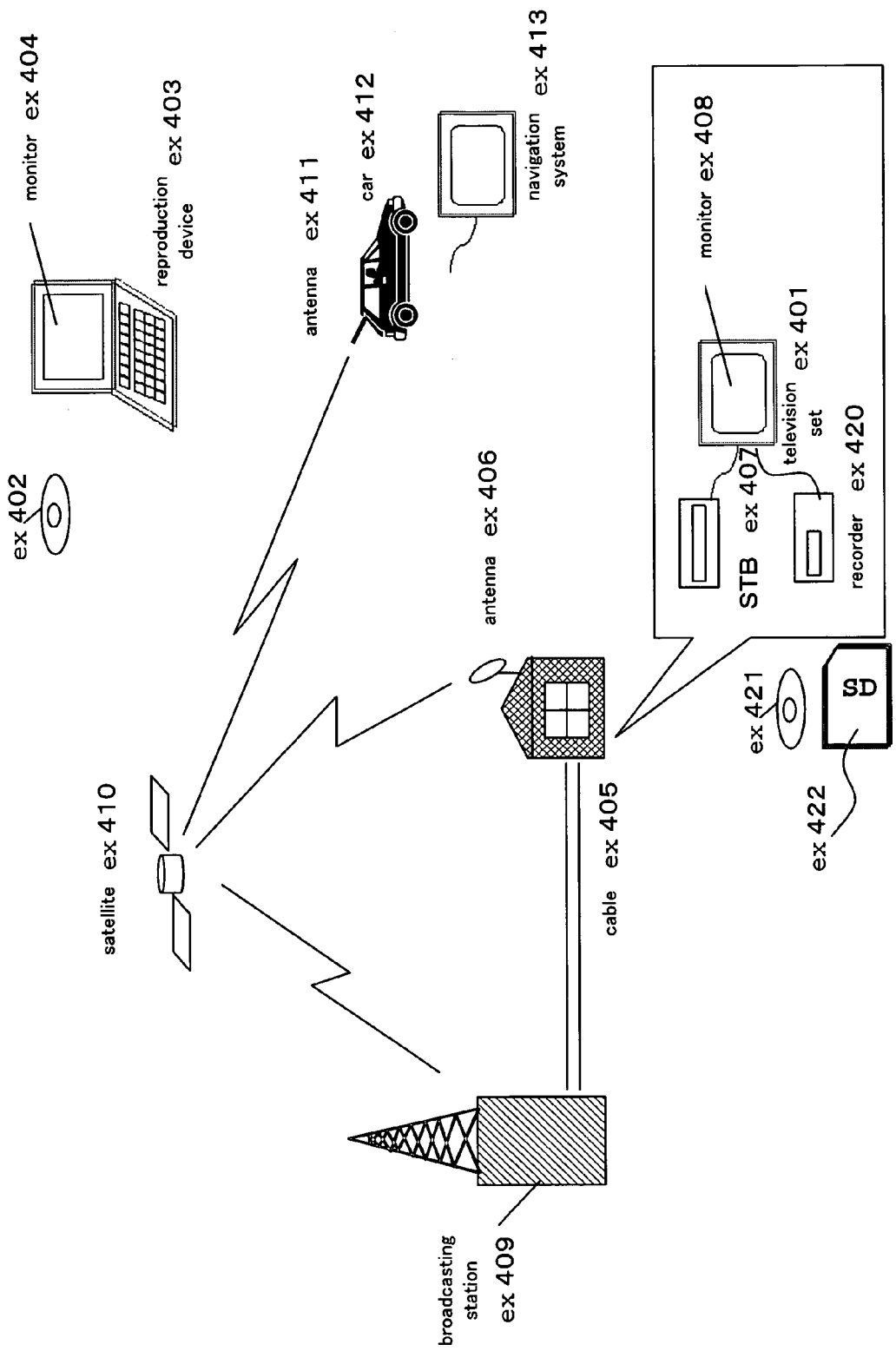
FIG. 51 shows an example of a digital broadcasting system.
Figure 52:
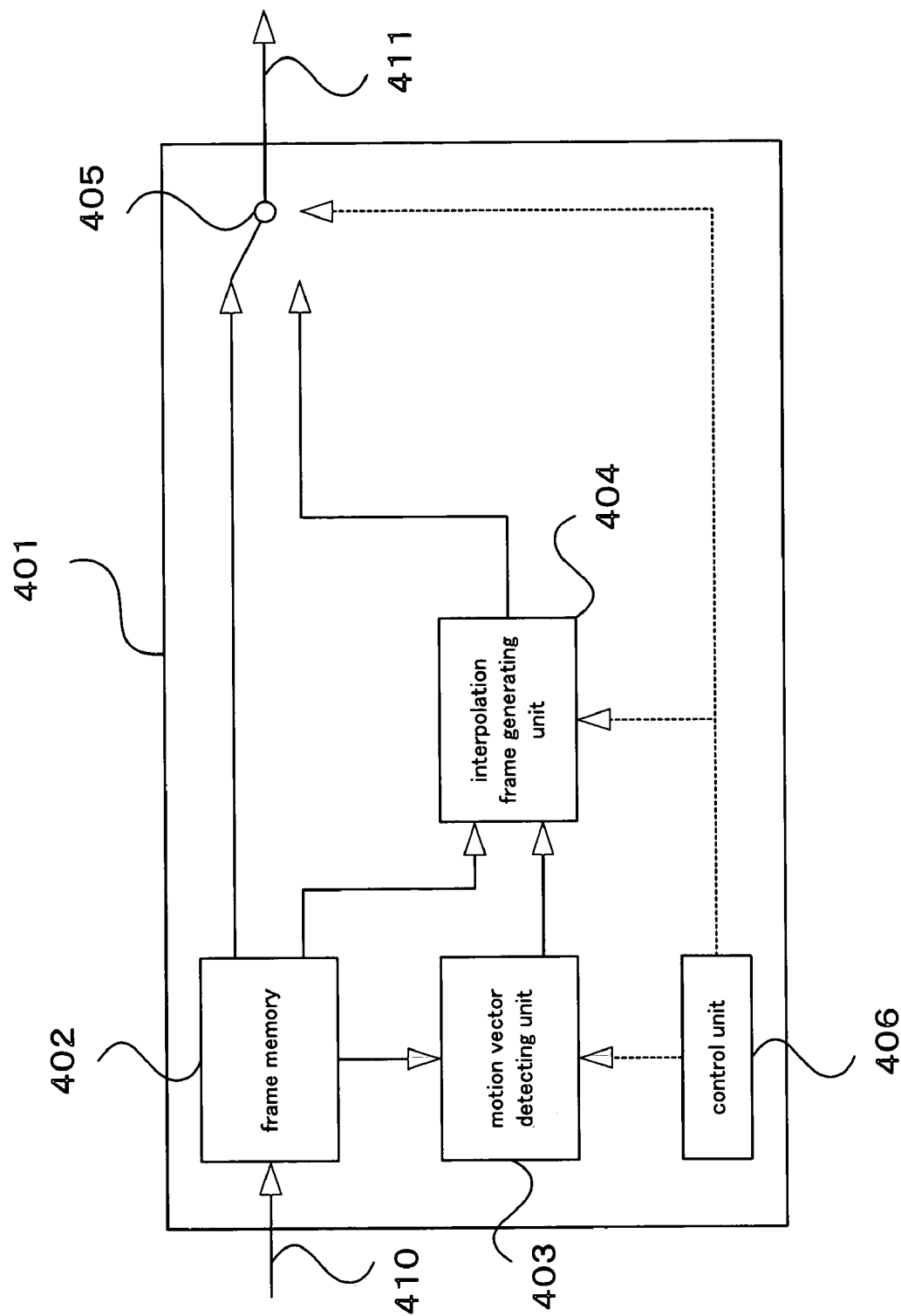
FIG. 52 is a block diagram showing the configuration of a conventional interpolation frame generation device.
Figure 53A:
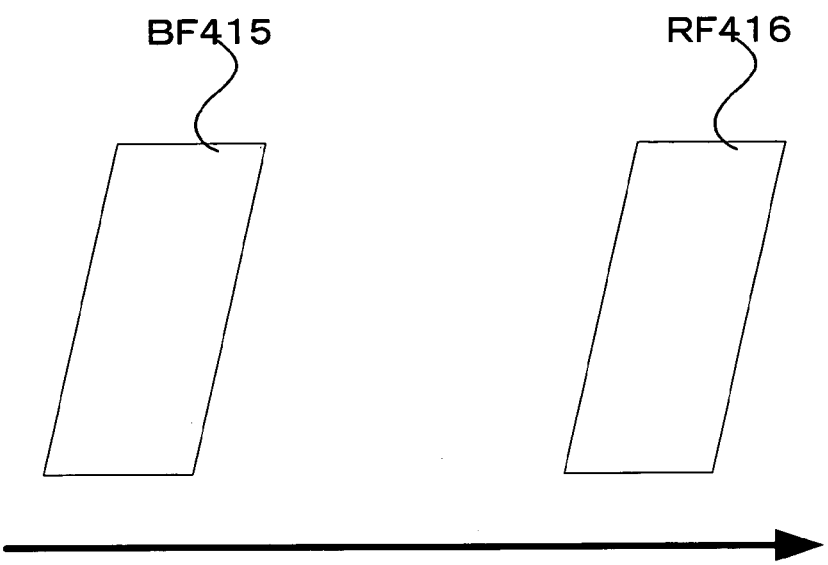
FIGS. 53A and 53B describe the conventional generation of an interpolation frame.
Figure 53B:
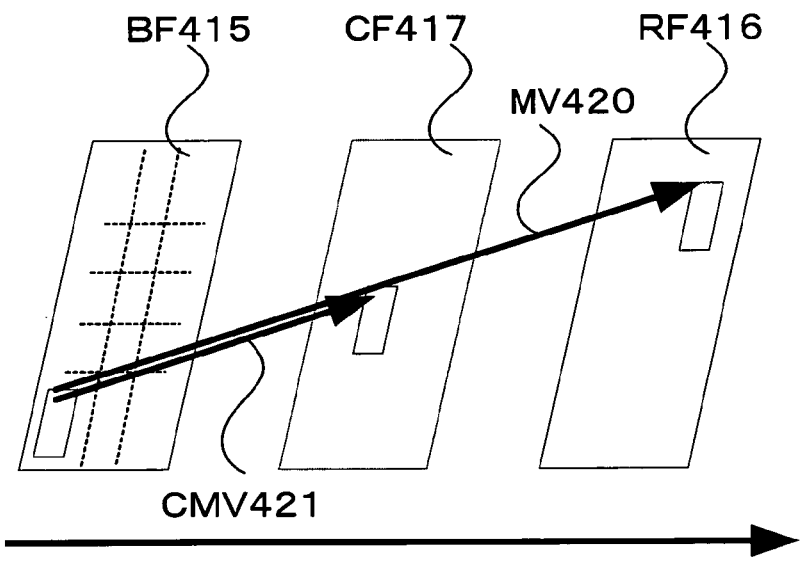

Furthermore, without being limited to the example of the above system, digital broadcasting by using a satellite or surface waves has been a recent topic of interest. As shown in FIG. 51, the interpolation frame generation device, the interpolation frame generation method or the interpolation frame generation method of each of the above embodiments can be also installed in the digital broadcasting system. More specifically, in a broadcasting station ex409, a coded bit stream of image information is transmitted to a communication or a broadcast satellite ex410 via a radio wave. Receiving this, the broadcast satellite ex410 transmits a radio wave for broadcasting. This radio wave is received by an antenna ex406 at home where a satellite broadcast reception facility is installed, and a device such as a television set (a receiver) ex401 or a set-top box (STB) ex407 decodes the coded bit stream for reproduction. Here, the device such as a television set (a receiver) ex401 or a set-top box (STB) ex407 may include the interpolation frame generation device described in the above embodiments. In addition, it may be the one that uses the interpolation frame generation method described in the above embodiments. In addition, it may include the interpolation frame generation program for effectuating the interpolation frame generation method described in the above embodiments. In addition, the reproduction device ex403 for reading and decoding the coded bit stream stored in a storage medium ex402 that is a recording medium such as a CD or a DVD may also includes the interpolation frame generation device, the interpolation frame generation method or the interpolation frame generation program for effectuating the interpolation frame generation method described in the above embodiments. In this case, the reproduced image signal is displayed on a monitor ex404. In addition, it is possible to install the interpolation frame generation device describe in the above embodiments in a set-top box ex407 that is connected to a cable ex405 for a cable television set or to an antenna ex406 for satellite/surface broadcasting, and to reproduce the signal by a monitor ex408 of the television set. In this case, it is possible to install the interpolation frame generation device not in the set-top box but in the television set. In addition, it is possible that a car ex412 having an antenna ex411 receives the signal from the satellite ex410 or the base station ex107, and the moving picture can be reproduced by a display device such as a navigation system ex413 that is provided to the car ex412.

In addition, the image signal may be coded and stored in the recording medium. As a specific example, there is a recorder ex420 such as a DVD recorder for recording an image signal on a DVD ex421 or a disk recorder for recording on a hard disk. In addition it is possible to record on the SD card ex422. If the recorder ex420 includes the interpolation frame generation device described in the above embodiments, an image signal recorded on the DVD ex421 or the SD card ex422 can be interpolated for reproduction and can be displayed on the monitor ex408.

Figure 50:
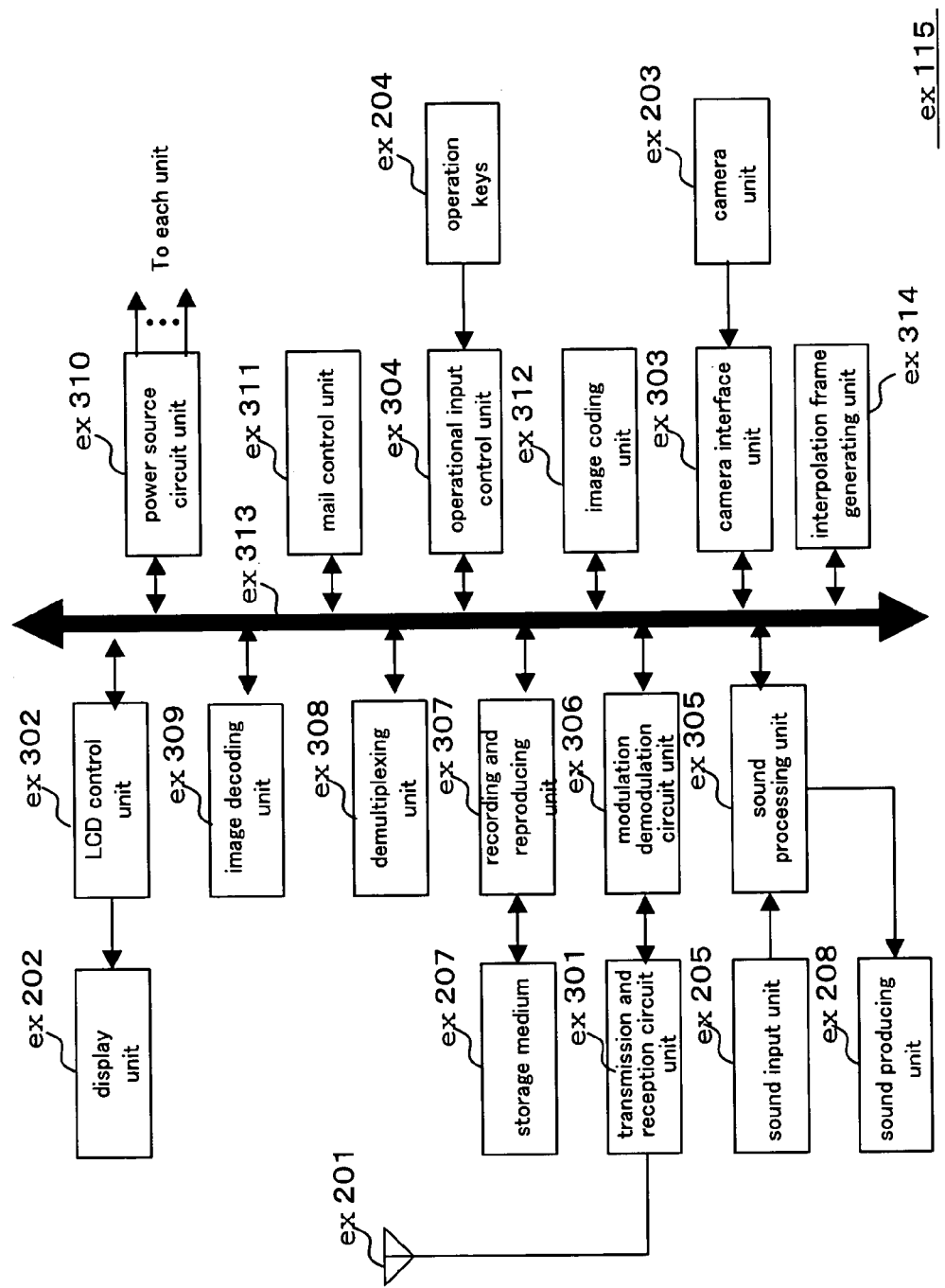
FIG. 50 is a block diagram of a cellular phone.

Furthermore, the structure of the navigation system ex413 can be a structure obtained by removing the camera unit ex203, the camera interface unit ex303 and the image coding unit ex312 from the structure as shown in FIG. 50, for example. A similar structure can be applied to the computer ex111 and the television set (receiver) ex401.

In addition, the terminal such as the above-mentioned cellular phone ex114 can be three types including a transmission and reception type having both a coder and a decoder, a transmission type having only a coder, and a reception type having only a decoder.

In this way, it is possible to use the interpolation frame generation device, the interpolation frame generation method or the interpolation frame generation program for effectuating the interpolation frame generation method described in the above embodiments in any of the above-mentioned devices or systems, so as to obtain the effect described in the above embodiments.

[Others]

The interpolation frame generation devices 101, 201, 601, 301, 621, 651, 701, 751 or 801 described in the first to eighth embodiments can be a device that is included in or attached to the decoding device so as to work as a part of the decoding device.

For example, the interpolation frame generation device 701 as shown in FIG. 36 can be included in the decoding device 215 as shown in FIG. 20 and can be a device that acquires the decoded image signal 212 decoded by the decoding device 215 as the input image signal 710. This can be applied to the interpolation frame generation device 101, 751 or 801 as shown in FIG. 1, 41 or 46, respectively. Here, the decoding device including the interpolation frame generation device 751 acquires the interpolation inadequate area information 755 externally.

In addition, the interpolation frame generation device 201, 601, 301, 621 or 651 as shown in FIG. 15, 21, 25, 29 or 34 can be a device that is integrated with the decoding device 215 as shown in each figure.

Furthermore, each unit that forms the interpolation frame generation devices 101, 201, 601, 301, 621, 651, 701, 751 or 801 can be a integrated circuit, such as an LSI. Each frame memory can be a memory device, such as a DRAM or a SRAM.

[Other Aspects of the Present Invention]

(1)

1. The interpolation frame generation device according to any one of claims 23-27, wherein the interpolation frame generation unit can generate each of interpolation pixel areas that form the interpolation frame in accordance with motion vectors detected by different combinations of the base frames and the reference frames.

2. An interpolation frame generation device for generating an interpolation frame for interpolating image frames, the device comprising:

movement associated information acquisition unit operable to acquire movement associated information about movements of image blocks that form the image frame; and interpolation frame generation unit operable to generate the interpolation frame in accordance with corrected movement associated information that is obtained by correction process of the movement associated information using movement associated information of adjacent image blocks.

3. The interpolation frame generation device according to the second aspect, wherein the correction process is a smoothing process.

4. The interpolation frame generation device according to the third aspect, further comprising image block selection unit operable to select certain image blocks from the entire image blocks forming the image frame, wherein the corrected movement associated information is movement associated information after the smoothing process for the movement associated information of the image blocks except the certain image blocks.

5. The interpolation frame generation device according to the second aspect further comprising image block selection unit operable to select certain image blocks from the entire image blocks forming the image frame, wherein the interpolation frame generation unit generates the interpolation frame in accordance with movement associated information of the certain image blocks corrected by the movement associated information and movement associated information of image blocks except the certain image blocks.

6. The interpolation frame generation device according to the fifth aspect, wherein movement associated information about movements of image blocks that form the image frame is motion compensation vectors of coded blocks that form a coded image signal for decoding the image frame.

7. The interpolation frame generation device according to the sixth aspect, wherein the certain image blocks include an image block that is determined not to have the motion compensation vector.

8. The interpolation frame generation device according to the fifth aspect, wherein movement associated information about a movement of an image block that forms the image frame is a motion vector detected for the image blocks that form the image frame.

9. The interpolation frame generation device according to the fifth aspect, wherein the certain image blocks include an image block having movement associated information which is determined to fail to represent true motion correctly.

10. An interpolation frame generation method for generating an interpolation frame for interpolating image frames, the method comprising:

a movement associated information acquisition step for acquiring movement associated information about a movement of an image block that forms the image frame; and an interpolation frame generation step for generating the interpolation frame in accordance with corrected movement associated information that is obtained by correction process of the movement associated information using movement associated information of a neighboring image block.

11. The interpolation frame generation method according to the tenth aspect, wherein the correction process is a smoothing process.

12. The interpolation frame generation method according to the tenth aspect, further comprising an image block selection step for selecting a predetermined image block from the entire image blocks forming the image frame, wherein the interpolation frame generation step is for generating the interpolation frame in accordance with movement associated information of the predetermined image block corrected by the movement associated information and movement associated information of an image block except the predetermined image block.

13. The interpolation frame generation method according to the twelfth aspect, wherein the predetermined image block includes an image block having movement associated information which is determined to fail to represent true motion correctly.

14. An interpolation frame generation program for performing an interpolation frame generation method for generating an interpolation frame for interpolating image frames by using a computer, the interpolation frame generation program making the computer execute the interpolation frame generation method comprising:

a movement associated information acquisition step for acquiring movement associated information about a movement of an image block that forms the image frame; and an interpolation frame generation step for generating the interpolation frame in accordance with corrected movement associated information that is obtained by correction process of the movement associated information using movement associated information of a neighboring image block.

15. The interpolation frame generation program according to the fourteenth aspect, wherein the correction process is a smoothing process.

16. The interpolation frame generation program according to the fourteenth aspect, wherein the interpolation frame generation method further comprises an image block selection step for selecting a predetermined image block from the entire image blocks forming the image frame, and the interpolation frame generation step generate the interpolation frame in accordance with movement associated information of the predetermined image block corrected by the movement associated information and movement associated information of an image block except the predetermined image block.

17. The interpolation frame generation program according to the sixteenth aspect, wherein the predetermined image block includes an image block having movement associated information that is decided to fail in representing true motion correctly.

(2)

According to a first aspect of the present invention, in the interpolation frame generation device according to any one of claims 23-27, the interpolation frame generation unit can generate each of interpolation pixel areas that form the interpolation frame in accordance with motion vectors detected by different combinations of the base frames and the reference frames.

In this interpolation frame generation device, each of interpolation pixel areas that form the interpolation frame is generated from a motion vector that is adequate for generating the interpolation pixel area among the detected motion vectors. As a result, the accuracy with which an interpolation frame will be generated can be further improved.

According to a second aspect of the present invention, there is provided an interpolation frame generation device for generating an interpolation frame for interpolating image frames. The device comprises movement associated information acquisition unit and interpolation frame generation unit. The movement associated information acquisition unit acquires movement associated information about movements of image blocks that form the image frame. The interpolation frame generation unit generates the interpolation frame in accordance with corrected movement associated information that is obtained by correcting the movement associated information using movement associated information of adjacent image blocks.

Here, the movement associated information is, for example, a motion compensation vector of a coded block that forms a coded image signal for decoding an image frame, or a detected motion vector for an image block that forms an image frame.

In this interpolation frame generation device, the correction process of the movement associated information is performed using movement associated information of neighboring image blocks. Therefore, correlation within an image frame of the movement associated information can be enhanced so that image quality of the interpolation frame can be improved.

According to a third aspect of the present invention, in the interpolation frame generation device according to the second aspect, the correction process is a smoothing process.

Here, the smoothing process is such as a process of replacing movement associated information to be an object of the correction with movement associated information of neighboring image blocks or a process using a smoothing filter. The smoothing filter can be a linear smoothing filter having a predetermined weight coefficient, an adaptive smoothing filter in which the weight coefficient is changed adaptively with the movement associated information that is used for correction, or other nonlinear filter (such as a median filter), for example.

In this interpolation frame generation device, correlation within an image frame of the movement associated information can be enhanced so that image quality of the interpolation frame can be improved.

According to a fourth aspect of the present invention, in the interpolation frame generation device according to the third aspect, image block selection unit are further provided. The image block selection unit selects certain image blocks from the entire image blocks forming the image frame. The corrected movement associated information is movement associated information after the smoothing process for the movement associated information of the image block except the certain image block.

In this interpolation frame generation device, the smoothing process is performed after thinning out certain image blocks. Therefore, the effect of the smoothing process as a low-pass filter is further enhanced. In addition, the movement associated information that is used for the smoothing process can be reduced so that the volume of calculation can be decreased.

According to a fifth aspect of the present invention, in the interpolation frame generation device according to the second aspect, image block selection unit are further provided. The image block selection unit selects certain image blocks from the entire image blocks forming the image frame. The interpolation frame generation unit generates the interpolation frame in accordance with movement associated information of the certain image block corrected by the movement associated information and movement associated information of image blocks except the certain image blocks.

Here, the certain image block is, for example, an image block in which it is decided that the movement associated information fails to represent true motion correctly or an image block which is determined not to have a motion compensation vector of a coded block that forms a coded image signal for decoding the image frame.

In this interpolation frame generation device, movement associated information of a certain image block is corrected. By means of this correction process, reliability of movement associated information of a certain image block can be enhanced, so that image quality of an interpolation frame can be improved.

According to a sixth aspect of the present invention, in the interpolation frame generation device according to the fifth aspect, movement associated information about movements of image blocks that form the image frame is motion compensation vectors of coded blocks that form a coded image signal for decoding the image frame.

In this interpolation frame generation device, a motion compensation vector of certain image blocks are corrected. In the correction process, motion compensation vectors of neighboring image blocks can be used, so that the interpolation frame can be generated in accordance with motion compensation vectors having an enhanced correlation within an image frame. Therefore, image quality of the interpolation frame can be improved.

According to a seventh aspect of the present invention, in the interpolation frame generation device according to the sixth aspect, the certain image block includes an image block which is determined not to have the motion compensation vector.

Here, the image block which is determined not to have the motion compensation vector is an image block that is intra coded or an image block to which data is not transmitted as a skipped image block, for example.

In this interpolation frame generation device, the correction process can be performed for the image block which is determined not to have the motion compensation vector by using motion compensation vectors of neighboring image blocks. Therefore, the image block which is determined not to have the motion compensation vector can be also used for generating an interpolation frame.

According to an eighth aspect of the present invention, in the interpolation frame generation device according to the fifth aspect, movement associated information about a movement of an image block that forms the image frame is a motion vector detected for the image blocks that forms the image frame.

In this interpolation frame generation device, the detected motion vector is corrected by motion vectors of neighboring image blocks. Therefore, correlation of the motion vector within the image frame can be enhanced, so that image quality of the interpolation frame can be improved.

According to a ninth aspect of the present invention, in the interpolation frame generation device according to the fifth aspect, the certain image blocks include an image block having movement associated information which is determined to incorrectly represent true motion.

Here, the image block having a movement associated information which is determined to incorrectly represent true motion is, for example, an image block having a low correlation between the acquired movement associated information and movement associated information of image blocks located at a periphery thereof, an image block in which a sum of DCT coefficients of coded blocks that form the coded image signal for decoding the image frame is larger than a certain threshold level, or an image block in which a sum of absolute differences (SAD) of the image block that was calculated when detecting a motion vector is larger than a certain threshold level.

In this interpolation frame generation device, correction of the movement associated information can be performed for an image block having movement associated information which is determined to incorrectly represent true motion, so that image quality of the interpolation frame can be improved.

According to a tenth aspect of the present invention, there is provided an interpolation frame generation method for generating an interpolation frame for interpolating image frames. The method comprises a movement associated information acquisition step and an interpolation frame generation step. The movement associated information acquisition step is for acquiring movement associated information about a movement of an image block that forms the image frame. The interpolation frame generation step is for generating the interpolation frame in accordance with corrected movement associated information that is obtained by correction process of the movement associated information using movement associated information of a neighboring image block.

Here, the movement associated information is, for example, a motion compensation vector of a coded block that forms a coded image signal for decoding an image frame, or a detected motion vector for an image block that forms an image frame.

In this interpolation frame generation method, the correction process of the movement associated information is performed using movement associated information of a neighboring image block. Therefore, correlation within an image frame of the movement associated information can be enhanced so that image quality of the interpolation frame can be improved.

According to an eleventh aspect of the present invention, in the interpolation frame generation method according to the tenth aspect, the correction process is a smoothing process.

Here, the smoothing process is such as a process of replacing movement associated information to be an object of the correction with movement associated information of a neighboring image block or a process using a smoothing filter. The smoothing filter can be a linear smoothing filter having a predetermined weight coefficient, an adaptive smoothing filter in which the weight coefficient is changed adaptively with the movement associated information that is used for correction, or other nonlinear filter (such as a median filter), for example.

In this interpolation frame generation method, correlation of the movement associated information within the image frame can be enhanced, so that image quality of the interpolation frame can be improved.

According to a twelfth aspect of the present invention, in the interpolation frame generation method according to the tenth aspect, a image block selection step is further included. The image block selection step is for selecting a predetermined image block from the entire image blocks forming the image frame. The interpolation frame generation step is for generating the interpolation frame in accordance with movement associated information of the predetermined image block corrected by the movement associated information and movement associated information of an image block except the predetermined image block.

Here, the predetermined image block is, for example, an image block in which it is determined that the movement associated information fails to represent true motion correctly or an image block that is determined not to have a motion compensation vector of a coded block that forms a coded image signal for decoding the image frame.

In this interpolation frame generation method, movement associated information of a predetermined image block is corrected. By means of this correction process, the reliability of movement associated information of a predetermined image block can be enhanced, so that image quality of an interpolation frame can be improved.

According to a thirteenth aspect of the present invention, in the interpolation frame generation method according to the twelfth aspect, the predetermined image block includes an image block having movement associated information which is determined to incorrectly represent true motion.

Here, the image block having a movement associated information that is determined to incorrectly represent true motion is, for example, an image block having a low correlation between the acquired movement associated information and movement associated information of an image block located at a periphery thereof, an image block in which a sum of DCT coefficients of coded blocks that form the coded image signal for decoding the image frame is larger than a certain threshold level, or an image block in which a sum of absolute differences (SAD) of the image block that was calculated when detecting a motion vector is larger than a certain threshold level.

In this interpolation frame generation method, correction of the movement associated information can be performed for an image block having movement associated information that is determined to incorrectly represent true motion, so that image quality of the interpolation frame can be improved.

According to a fourteenth aspect of the present invention, there is provided an interpolation frame generation program for performing an interpolation frame generation method for generating an interpolation frame for interpolating image frames by using a computer. The interpolation frame generation program makes the computer execute the interpolation frame generation method comprising a movement associated information acquisition step and an interpolation frame generation step. The movement associated information acquisition step is for acquiring movement associated information about a movement of an image block that forms the image frame. The interpolation frame generation step is for generating the interpolation frame in accordance with corrected movement associated information that is obtained by correction process of the movement associated information using movement associated information of a neighboring image block.

Here, the movement associated information is, for example, a motion compensation vector of a coded block that forms a coded image signal for decoding an image frame, or a detected motion vector for an image block that forms an image frame.

In this interpolation frame generation program, the correction process of the movement associated information is performed using movement associated information of a neighboring image block. Therefore, correlation within an image frame of the movement associated information can be enhanced so that image quality of the interpolation frame can be improved.

According to a fifteenth aspect of the present invention, in the interpolation frame generation program according to the fourteenth aspect, the correction process is a smoothing process.

Here, the smoothing process is such as a process of replacing movement associated information to be an object of the correction with movement associated information of a neighboring image block or a process using a smoothing filter. The smoothing filter can be a linear smoothing filter having a predetermined weight coefficient, an adaptive smoothing filter in which the weight coefficient is changed adaptively with the movement associated information that is used for correction, or other nonlinear filter (such as a median filter), for example.

In this interpolation frame generation program, correlation of the movement associated information within the image frame can be enhanced, so that image quality of the interpolation frame can be improved.

According to a sixteenth aspect of the present invention, in the interpolation frame generation program according to the fourteenth aspect, the interpolation frame generation method further comprises an image block selection step for selecting a predetermined image block from the entire image blocks forming the image frame. The interpolation frame generation step is for generating the interpolation frame in accordance with movement associated information of the predetermined image block corrected by the movement associated information and movement associated information of an image block except the predetermined image block.

Here, the predetermined image block is, for example, an image block in which it is determined that the movement associated information fails to represent true motion correctly or an image block that is determined not to have a motion compensation vector of a coded block that forms a coded image signal for decoding the image frame.

In this interpolation frame generation program, movement associated information of a predetermined image block is corrected. By this correction process, reliability of movement associated information of a predetermined image block can be enhanced, so that image quality of an interpolation frame can be improved.

According to a seventeenth aspect of the present invention, in the interpolation frame generation program according to the sixteenth aspect, the predetermined image block includes an image block having movement associated information in which it is determined that true motion will not be represented correctly.

Here, the image block having a movement associated information in which it is determined that true motion will not be represented correctly is, for example, an image block having a low correlation between the acquired movement associated information and movement associated information of an image block located at a periphery thereof, an image block in which a sum of DCT coefficients of coded blocks that form the coded image signal for decoding the image frame is larger than a certain threshold level, or an image block in which a sum of absolute differences (SAD) of the image block that was calculated when detecting a motion vector is larger than a certain threshold level.

In this interpolation frame generation program, correction of the movement associated information can be performed for an image block having movement associated information that is decided to fail in representing true motion correctly, so that image quality of the interpolation frame can be improved.

What is claimed is:

1. An interpolation frame generation device for generating an interpolation frame for interpolating image frames that are obtained by decoding a coded image signal that is coded by motion compensation, the device comprising:
   a motion compensation vector acquisition unit operable to acquire a motion compensation vector of a coded block that forms the coded image signal by decoding the coded image signal; and
   an interpolation frame generation unit operable to generate:
   the interpolation frame in accordance with at least a motion vector of an image block that forms an image frame by using the motion compensation vector of the coded block as the motion vector of the image block;
   the interpolation frame for an image block that is not included in one image frame located sequentially after the interpolation frame in a display order, based upon a motion vector detected by using an image frame that is located temporally further from the interpolation frame than the one image frame, wherein the image frame located temporally further from the interpolation frame includes the image block that is not included in the one image frame; and
   the interpolation frame for an image block that is included in at least one image frame located sequentially after the interpolation frame in a display order, based upon a motion vector detected by using an image frame that is located temporally closest to the interpolation frame among at least one image frame including the image block.

2. An interpolation frame generation device for generating an interpolation frame for interpolating image frames that are obtained by decoding a coded image signal that is coded by motion compensation, the device comprising:
   a motion compensation vector acquisition unit operable to acquire motion compensation vectors of coded blocks that form the coded image signal by decoding the coded image signal;
   a motion vector detection unit operable to detect at least a motion vector between a base frame and a reference frame, and operable to detect the motion vector of an image block forming the base frame in an area of the reference frame that is determined in accordance with the motion compensation vectors; and
   an interpolation frame generation unit operable to generate:
   the interpolation frame in accordance with the detected motion vector;
   the interpolation frame for an image block that is not included in one image frame located sequentially after the interpolation frame in a display order, based upon a motion vector detected by using an image frame that is located temporally further from the interpolation frame than the one image frame, wherein the image frame located temporally further from the interpolation frame includes the image block that is not included in the one image frame; and
   the interpolation frame for an image block that is included in at least one image frame located sequentially after the interpolation frame in a display order, based upon a motion vector detected by using an image frame that is located temporally closest to the interpolation frame among at least one image frame including the image block.

3. An interpolation frame generation device for generating an interpolation frame for interpolating image frames that are obtained by decoding a coded image signal that is coded by motion compensation, the device comprising:
   an image signal information acquisition unit operable to acquire image signal information of the coded image signal;
   a motion vector detection unit operable to partially select at least an image block among the entire image blocks that form a base frame and to detect a motion vector of the partially selected image block between the base frame and a reference frame; and an interpolation frame generation unit operable to generate:

the interpolation frame in accordance with the image signal information and the motion vector;

the interpolation frame for an image block that is not included in one image frame located sequentially after the interpolation frame in a display order, based upon a motion vector detected by using an image frame that is located temporally further from the interpolation frame than the one image frame, wherein the image frame located temporally further from the interpolation frame includes the image block that is not included in the one image frame; and the interpolation frame for an image block that is included in at least one image frame located sequentially after the interpolation frame in a display order, based upon a motion vector detected by using an image frame that is located temporally closest to the interpolation frame among at least one image frame including the image block.

4. The interpolation frame generation device according to claim 3, wherein the image signal information includes a motion compensation vector or a coding mode of a coded block that forms the coded image signal, and the partially selected image block is an image block that is determined to be stationary from the image signal information or an image block that is decided to have a movement having low correlation with adjacent image blocks from the image signal information.

5. The interpolation frame generation device according to claim 3, wherein the image signal information includes a coding mode of a coded block that forms the coded image signal, and the partially selected image block is an intra block.

6. An interpolation frame generation device for generating an interpolation frame for interpolating image frames, the device comprising:

a generation process ability decision unit operable to decide generation process ability for generating the interpolation frame; and an interpolation frame generation unit operable to generate:

the interpolation frame in accordance with a decision of the generation process ability decision unit;

the interpolation frame for an image block that is not included in one image frame located sequentially after the interpolation frame in a display order, based upon a motion vector detected by using an image frame that is located temporally further from the interpolation frame than the one image frame, wherein the image frame located temporally further from the interpolation frame includes the image block that is not included in the one image frame; and the interpolation frame for an image block that is included in at least one image frame located sequentially after the interpolation frame in a display image order, based upon a motion vector detected by using an image frame that is located temporally closest to the interpolation frame among at least one image frame including the image block.

7. The interpolation frame generation device according to claim 6, wherein the interpolation frame generation unit is operable to change a number of interpolation frames in accordance with a decision of the generation process ability decision unit.

8. The interpolation frame generation device according to claim 6, wherein the interpolation frame generation unit is operable to change a number of image blocks that form an image frame in which the motion vectors are detected in accordance with a decision of the generation process ability decision unit.

9. The interpolation frame generation device according to claim 6, wherein the interpolation frame generation unit is operable to change a range in which a motion vector of an image block that forms an image frame is detected in accordance with a decision of the generation process ability decision unit.

10. The interpolation frame generation device according to claim 6, wherein the generation process ability decision unit is operable to decide an attribution of an image signal made of the image frame.

11. An interpolation frame generation device for generating an interpolation frame for interpolating image frames, the device comprising:

a motion vector detection unit operable to detect motion vectors by utilizing a plurality of first image frames that are located either before or after the interpolation frame in the display order; and an interpolation frame generation unit operable to generate:

the interpolation frame in accordance with the motion vectors;

the interpolation frame for an image block that is not included in one image frame located sequentially after the interpolation frame in a display order, based upon a motion vector detected by using an image frame that is located temporally further from the interpolation frame than the one image frame, wherein the image frame located temporally further from the interpolation frame includes the image block that is not included in the one image frame; and the interpolation frame for an image block that is included in at least one image frame located sequentially after the interpolation frame in a display order, based upon a motion vector detected by using an image frame that is located temporally closest to the interpolation frame among at least one image frame including the image block.

12. The interpolation frame generation device according to claim 11, wherein the plurality of first image frames are located on one side of the interpolation frame in the display order and include a plurality of base frames that serve as bases for detecting the motion vectors;

at least one second image frame being located on another side of the interpolation frame in the display order that includes a reference frame that serves as an object for detecting the motion vectors; and the motion vector detection unit is operable to detect the motion vectors between the base frames and the reference frame.

13. The interpolation frame generation device according to claim 11, wherein the plurality of first image frames are located on one side of the interpolation frame in the display order and include a plurality of reference frames that serve as references for detecting the motion vectors;

one or a plurality of second image frames are located on another side of the interpolation frame in the display order and include a base frame that serves as a base for detecting the motion vectors; and the motion vector detection unit is operable to detect the motion vectors between the base frame and the reference frames.

14. The interpolation frame generation device according to claim 11, wherein the plurality of first image frames includes a base frame that serves as a base for detecting the motion vectors and a reference frame that serves as an object for detecting the motion vectors; and the motion vector detection unit is operable to detect the motion vectors between the base frame and the reference frame.

15. The interpolation frame generation device according to claim 11, wherein the motion vector detection unit is operable to detect a first motion vector between a first base frame that serves as a base for detecting the first motion vector and a first reference frame that is located before the first base frame in the display order, and is operable to detect a second motion vector between a second base frame that serves as a base for detecting the second motion vector and a second reference frame that is located after the second base frame in the display order, and the interpolation frame generation unit is operable to generate the interpolation frame in accordance with the first motion vector and the second motion vector.

16. The interpolation frame generation device according to claim 11, wherein:

the motion vectors include a motion vector for generating an interpolation block that forms the interpolation frame, and is detected from a base pixel area that forms a base frame that serves as a base for detecting the motion vector and a reference pixel area that forms a reference frame that serves as an object for detecting the motion vector;

the position of the reference pixel area in the reference frame is defined as a position indicated by a vector that is obtained by internal division or external division of the vector that is connected between the position of the base pixel area in the base frame and the position of the interpolation block in the interpolation frame; and the interpolation frame generation unit is operable to generate the interpolation frame by filling with the reference pixel area based on the motion vector, and for a pixel area that cannot be filled with the reference pixel area, the interpolation frame generation unit is operable to generate the interpolation frame by filling with a pixel area of the base frame or the reference frame.

17. An interpolation frame generation method, which is used with an interpolation frame generation device, for generating an interpolation frame for interpolating image frames that are obtained by decoding a coded image signal that is coded by motion compensation, the method comprising:

acquiring, using an image signal acquisition unit, image signal information of the coded image signal;

partially selecting, using a motion vector detection unit, at least an image block among the entire image blocks that form a base frame and detecting a motion vector of the partially selected image block between the base frame and a reference frame;

generating, using an interpolation frame generation unit, the interpolation frame in accordance with the image signal information and the motion vector;

generating the interpolation frame for an image block that is not included in one image frame located sequentially after the interpolation frame in a display order, based upon a motion vector detected by using an image frame that is located temporally further from the interpolation frame than the one image frame, wherein the image frame located temporally further from the interpolation frame includes the image block that is not included in the one image frame; and generating, using the interpolation frame generation unit, the interpolation frame for an image block that is included in at least one image frame located sequentially after the interpolation frame in a display order, based upon a motion vector detected by using an image frame that is located temporally closest to the interpolation frame among at least one image frame including the image block.

18. An interpolation frame generation method, which is used with an interpolation frame generation device, for generating an interpolation frame for interpolating image frames, the method comprising:

deciding, using a generation process ability decision unit, the generation process ability for generating the interpolation frame; and generating, using an interpolation frame generation unit, the interpolation frame in accordance with a decision from said deciding the generation process ability, wherein said generating the interpolation frame generates:

the interpolation frame for an image block that is not included in one image frame located sequentially after the interpolation frame in a display order, based upon a motion vector detected by using an image frame that is located temporally further from the interpolation frame than the one image frame, wherein the image frame located temporally further from the interpolation frame includes the image block that is not included in the one image frame; and the interpolation frame for an image block that is included in at least one image frame located sequentially after the interpolation frame in a display order, based upon a motion vector detected by using an image frame that is located temporally closest to the interpolation frame among at least one image frame including the image block.

19. An interpolation frame generation method, which is used with an interpolation frame generation device, for generating an interpolation frame for interpolating image frames, the method comprising:

detecting, using a motion vector detection unit, motion vectors by utilizing a plurality of first image frames that are located either before or after the interpolation frame in the display order; and generating, using an interpolation frame generation unit, the interpolation frame in accordance with the motion vectors, wherein said generating the interpolation frame generates:

the interpolation frame for an image block that is not included in one image frame located sequentially after the interpolation frame in a display order, based upon a motion vector detected by using an image frame that is located temporally further from the interpolation frame than the one image frame, wherein the image frame located temporally further from the interpolation frame includes the image block that is not included in the one image frame; and the interpolation frame for an image block that is included in at least one image frame located sequentially after the interpolation frame in a display order, based upon a motion vector detected by using an image frame that is located temporally closest to the interpolation frame among at least one image frame including the image block.

20. An interpolation frame generation computer program recorded on a computer-readable recording medium for performing an interpolation frame generation method, which is used for an interpolation frame generation device, for generating an interpolation frame for interpolating image frames that are obtained by decoding a coded image signal that is coded by motion compensation by using a computer, the interpolation frame generation program for causing the computer to execute the interpolation frame generation method comprising:

acquiring, using an image signal acquisition unit, image signal information of the coded image signal;

partially selecting, using a motion vector detection unit, at least an image block among the entire image blocks that form a base frame and for detecting a motion vector of the partially selected image block between the base frame and a reference frame; and generating, using an interpolation frame generation unit, the interpolation frame in accordance with the image signal information and the motion vector, wherein said generating the interpolation frame generates:

the interpolation frame for an image block that is not included in one image frame located sequentially after the interpolation frame in a display order, based upon a motion vector detected by using an image frame that is located temporally further from the interpolation frame than the one image frame, wherein the image frame located temporally further from the interpolation frame includes the image block that is not included in the one image frame; and the interpolation frame for an image block that is included in at least one image frame located sequentially after the interpolation frame in a display order, based upon a motion vector detected by using an image frame that is located temporally closest to the interpolation frame among at least one image frame including the image block.

21. An interpolation frame generation computer program recorded on a computer-readable recording medium for performing an interpolation frame generation method, which is used for an interpolation frame generation device, for generating an interpolation frame for interpolating image frames by using a computer, the interpolation frame generation program for causing the computer to execute the interpolation frame generation method comprising:

deciding, using a generation process ability decision unit, generation process ability for generating the interpolation frame; and generating, using an interpolation frame generation unit, the interpolation frame in accordance with a decision in said deciding generation process ability, wherein said generating the interpolation frame generates:

the interpolation frame for an image block that is not included in one image frame located sequentially after the interpolation frame in a display order, based upon a motion vector detected by using an image frame that is located temporally further from the interpolation frame than the one image frame, wherein the image frame located temporally further from the interpolation frame includes the image block that is not included in the one image frame; and the interpolation frame for an image block that is included in at least one image frame located sequentially after the interpolation frame in a display order, based upon a motion vector detected by using an image frame that is located temporally closest to the interpolation frame among at least one image frame including the image block.

22. An interpolation frame generation computer program recorded on a computer-readable recording medium for performing an interpolation frame generation method, which is used for an interpolation frame generation device, for generating an interpolation frame for interpolating image frames by using a computer, the interpolation frame generation program for causing the computer to execute the interpolation frame generation method comprising:

detecting, using a motion vector detection unit, motion vectors by utilizing a plurality of first image frames that are located either before or after the interpolation frame in the display order; and generating, using an interpolation frame generation unit, the interpolation frame in accordance with the motion vectors, wherein said generating the interpolation frame generates:

the interpolation frame for an image block that is not included in one image frame located sequentially after the interpolation frame in a display order, based upon a motion vector detected by using an image frame that is located temporally further from the interpolation frame than the one image frame, wherein the image frame located temporally further from the interpolation frame includes the image block that is not included in the one image frame; and the interpolation frame for an image block that is included in at least one image frame located sequentially after the interpolation frame in a display order, based upon a motion vector detected by using an image frame that is located temporally closest to the interpolation frame among at least one image frame including the image block.

23. The interpolation frame generation device according to claim 1, wherein the motion vector is detected for a reference frame that is in a same scene as a base frame.

24. The interpolation frame generation device according to claim 1, wherein the motion vector is corrected by a smoothing filter.

25. The interpolation frame generation device according to claim 2, wherein the motion vector is detected for the reference frame that is in a same scene as the base frame.

26. The interpolation frame generation device according to claim 2, wherein the motion vector is corrected by a smoothing filter.

27. The interpolation frame generation device according to claim 16, wherein the motion vector is detected for the reference frame that is in a same scene as the base frame.

28. The interpolation frame generation device according to claim 16, wherein the motion vector is corrected by a smoothing filter.

* * * * *